US012795760B2

(12) United States Patent
Wu

(10) Patent No.: US 12,795,760 B2
(45) Date of Patent: Nov. 10, 2026

(54) MANAGING UE CONNECTIVITY WITH MASTER NODE AND SECONDARY NODE

(71) Applicant: GOOGLE LLC, Mountain View, CA (US)

(72) Inventor: Chih-Hsiang Wu, Taoyuan City (TW)

(73) Assignee: GOOGLE LLC, Mountain View, CA (US)

( * ) Notice: Subject to any disclaimer, the term of this patent is extended or adjusted under 35 U.S.C. 154(b) by 415 days.

(21) Appl. No.: 18/039,347

(22) PCT Filed: Dec. 6, 2021

(86) PCT No.: PCT/US2021/061979
§ 371 (c)(1),
(2) Date: May 30, 2023

(87) PCT Pub. No.: WO2022/125426
PCT Pub. Date: Jun. 16, 2022

(65) Prior Publication Data
US 2024/0008115 A1 Jan. 4, 2024

Related U.S. Application Data

(60) Provisional application No. 63/122,930, filed on Dec. 8, 2020.

(51) Int. Cl.
*H04W 76/15* (2018.01)
*H04W 76/19* (2018.01)
*H04W 76/20* (2018.01)

(52) U.S. Cl.
CPC ........... *H04W 76/15* (2018.02); *H04W 76/19* (2018.02); *H04W 76/20* (2018.02)

(58) Field of Classification Search
CPC ..... H04W 76/15; H04W 76/19; H04W 76/20; H04W 76/27; H04W 8/24; H04W 76/22
See application file for complete search history.

(56) References Cited

U.S. PATENT DOCUMENTS 12,238,801 B2 * 2/2025 Wang .................... H04W 76/27
2020/0245390 A1 * 7/2020 Ali .................. H04W 36/00698
(Continued)

FOREIGN PATENT DOCUMENTS

JP 2016-192783 A 11/2016
KR 20190143782 A 12/2019
(Continued)

OTHER PUBLICATIONS

Japanese Patent Application No. 2023-534023, Notice of Refusal, dated Dec. 23, 2024.
(Continued)

*Primary Examiner* — Will W Lin
(74) *Attorney, Agent, or Firm* — MARSHALL, GERSTEIN & BORUN LLP

(57) ABSTRACT

A network node operates as a master node, MN, for a user equipment, UE, communicating in dual connectivity, DC, with the MN and a secondary node, SN. To manage deactivation of a secondary cell group, SCG, the network node determines that the SCG is deactivated (2202), determines, when the SCG is deactivated, that a radio connection between the MN and the UE should be suspended (2206), and suspends the radio connection (2208).

17 Claims, 34 Drawing Sheets

(56) References Cited

U.S. PATENT DOCUMENTS

| | | | | |
|---|---|---|---|---|
| 2020/0267631 A1 | 8/2020 | Yilmaz et al. | | |
| 2022/0264686 A1* | 8/2022 | Tsai | H04W 74/0833 | |
| 2023/0254866 A1* | 8/2023 | Wang | H04W 72/21 | 370/328 |
| 2023/0269607 A1* | 8/2023 | Wang | H04W 52/0245 | 370/328 |
| 2023/0397273 A1* | 12/2023 | Xu | H04W 76/27 | |
| 2024/0008144 A1* | 1/2024 | Van Der Velde | H04W 76/15 | |
| 2024/0032135 A1* | 1/2024 | Cheng | H04W 76/27 | |
| 2024/0129991 A1* | 4/2024 | Kim | H04W 24/08 | |

FOREIGN PATENT DOCUMENTS

| | | |
|---|---|---|
| WO | WO-2019/245305 A1 | 12/2019 |
| WO | WO-2020/008574 A1 | 1/2020 |
| WO | WO-2020/151735 A1 | 7/2020 |
| WO | WO-2020/167170 A1 | 8/2020 |
| WO | WO-2020/199882 A1 | 10/2020 |
| WO | WO-2020/222681 A1 | 11/2020 |
| WO | WO-2021/027752 A1 | 2/2021 |
| WO | WO-2021/092337 A1 | 5/2021 |

OTHER PUBLICATIONS

ZTE, Draft CR37340 for SCG deactivation and activation, 3GPP TSG RAN WG3 #110-e, R3-205991 (Nov. 2020).

International Search Report and Written Opinion for Application No. PCT/US2021/061979, dated Mar. 23, 2022.

"3rd Generation Partnership Project; Technical Specification Group Radio Access Network; Evolved Universal Terrestrial Radio Access (E-UTRA) and NR; Multi-Connectivity; Stage 2 (Release 16)," 3GPP Draft (2020).

Intel Corporation, "Signalling for Rel-17 Efficient SCG De-activation/Re-activation," 3GPP Draft (2020).

Intel Corporation, "Enhancements for Rel-17 Efficient Activation/De-activation," 3GPP Draft (2020).

CATT, "Discussion on efficient Activation/Deactivation Mechanism for SCG", 3GPP TSG RAN WG3 #110-e R3-206355 (Oct. 23, 2020).

Ericsson, "Support of SCG activation/de-activation mechanism", 3GPP TSG RAN WG3 #110-e R3-206497 (Oct. 23, 2020).

Lenovo et al., "On support for SCG deactivation and activation", 3GPP TSG RAN WG3 #110-e R3-206480 (Oct. 23, 2020).

Notice of Reasons for Rejection for Japanese Application No. 2023-534023, dated Jun. 17, 2024.

Samsung, "Discussion on MN coordinated SGC (de-)activation", 3GPP TSG RAN WG3 #110-e R3-206828 (Oct. 23, 2020).

"5G; NR; Packet Data Convergence Protocol (PDCP) Specification," 3GPP TS 38.323 version 16.20.0 Release 16 (2020).

"5G; NR; Radio Link Control (RLC) Protocol Specification," 3GPP TS 38.322 version 16.1.0 Release 16 (2020).

"5G; NR; Radio Resource Control (RRC); Protocol Specification," 3GPP TS 38.331 version 16.2.0 Release 16 (2020).

"LTE; Evolved Universal Terrestrial Radio Access (E-UTRA); Radio Link Control (RLC) Protocol Specification," 3GPP TS 36.322 version 16.0.0 Release 16 (2020).

"LTE; Evolved Universal Terrestrial Radio Access (E-UTRA); Radio Resource Control (RRC); Protocol Specification," 3GPP TS 36.331 version 16.2.1 Release 16 (2020).

Office Action for Korean Application No. 10-2023-7020665, dated Feb. 9, 2026.

ZTE, "Summary of Offline Discussion on SCG release for UE power saving," 3GPP TSG-RAN WG3 #110-e (2020).

CATT, "Efficient Activation/Deactivation Mechanism for SCG", 3GPP Draft (2020).

Office Action for European Application No. 21835526.4, dated Mar. 31, 2026.

Vivo, Activation and Deactivation Mechanism for SCG and SCells, 3GPP Draft (2020).

Ericsson, "Support of SCG activation/de-activation mechanism MR-DC", 3GPP TSG RAN WG3 #110 R3-206498 (2020).

Office Action for Chinese Application No. 202180082692.7, dated Aug. 1, 2026.

* cited by examiner

MANAGING UE CONNECTIVITY WITH MASTER NODE AND SECONDARY NODE

TECHNICAL FIELD

This disclosure relates generally to wireless communications and, more particularly, to managing UE connectivity with different nodes such as master node (MN) and secondary node (SN) in accordance with UE data activity and inactivity.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A user device (or user equipment, commonly denoted by the acronym "UE") in some cases can concurrently utilize resources of multiple network nodes, e.g., base stations, interconnected by a backhaul. When these network nodes support the same radio access technology (RAT) or different RATs, this type of connectivity is referred to as Dual Connectivity (DC) or Multi-Radio DC (MR-DC), respectively. Typically, when a UE operates in DC or MR-DC, one base station operates as a master node (MN), and the other base station operates as a secondary node (SN). The backhaul can support an X2 or Xn interface, for example.

The MN can provide a control-plane connection and a user-plane connection to a core network (CN), whereas the SN generally provides only a user-plane connection. The cells associated with the MN define a master cell group (MCG), and the cells associated with the SN define a secondary cell group (SCG). The UE and the base stations MN and SN can use signaling radio bearers (SRBs) to exchange radio resource control (RRC) messages, as well as non-access stratum (NAS) messages.

There are several types of SRBs that a UE can use when operating in DC. SRB1 and SRB2 resources allow the UE and the MN to exchange RRC messages related to the MN and to embed RRC messages related to the SN, and can be referred to as MCG SRBs. SRB3 resources allow the UE and the SN to exchange RRC messages related to the SN, and can be referred to as an SCG SRB. Split SRBs allow the UE to exchange RRC messages directly with the MN by using radio resources of the MN, the SN, or both the MN and SN. Further, the UE and the base stations (e.g., MN and SN) use data radio bearers (DRBs) to transport data on a user plane. DRBs terminated at the MN and using the lower-layer resources of only the MN can be referred to as MCG DRBs, DRBs terminated at the SN and using the lower-layer resources of only the SN can be referred to as SCG DRBs, and DRBs terminated at the MCG but using the lower-layer resources of both the MN and the SN can be referred to as split DRBs. DRBs terminated at the MN but using the lower-layer resources of only the SN can be referred to as MN-terminated SCG DRBs. DRBs terminated at the SN but using the lower-layer resources of only the MN can be referred to as SN-terminated MCG DRBs.

In some scenarios, a UE may transition to the inactive state or the idle state of the RRC protocol with a suspended configuration. In view of inbound or outbound data traffic, in other scenarios, the UE and/or the SN may determine that the UE does not require the SN connection. It is unclear how the RAN and the UE should manage MCG and SCG connections in these situations.

SUMMARY

A network node and/or a UE implement the techniques of this disclosure to manage the deactivation and activation of an SCG. When the SCG is to be deactivated, one or more of the MN, the SN, and the UE can determine whether the UE should retain some or all of the SN configuration. Further, the MN can determine whether the radio connection between the UE and the MN on the MCG should be suspended. The MN can notify the UE regarding SCG deactivation and, in some cases, suspension of the radio connection, so that the UE can transition to the inactive state or the idle state with suspended configuration. Upon reactivation of the SCG, the MN can determine whether the radio connection between the MN and the UE should remain suspended.

In various implementations or scenarios, when the SCG is deactivated and the radio connection with the MN is suspended, the UE can release some of the MN configuration and retain the remaining MN configuration. The UE in these situations similarly can release some or all of the SN configuration, and in some cases release the lower layers of the SCG connection while keeping the higher layers of the SCG connection alive.

One example embodiment of these techniques is a method in a network node, operating as an MN for a UE communicating in DC with the MN and an SN, for managing deactivation of an SCG. The method includes determining, by processing hardware of the network node, that the SCG is deactivated; notifying, by the processing hardware, the UE that the SCG is deactivated; determining, by the processing hardware and when the SCG is deactivated, that a radio connection between the MN and the UE should be suspended; and suspending, by the processing hardware, the radio connection.

Another example embodiment of these techniques is a network node operating in a RAN, the network node comprising processing hardware and configured to implement the method above.

Another example embodiment of these techniques is a method in a UE communicating in DC with an MN in accordance with an MN configuration and an SN in accordance with an SN configuration, for managing deactivation of an SCG. The method includes determining, by processing hardware, that the SCG is to be deactivated; determining, by the processing hardware, that a radio connection between the UE and the MN should be suspended; and in response to determining that the radio connection should be suspended, suspending or releasing at least a portion of the MN configuration.

Another example embodiment of these techniques is a UE comprising processing hardware and configured to implement the method above.

DETAILED DESCRIPTION OF THE DRAWINGS

As discussed in detail below, network nodes of a radio access network (RAN) in communication with a UE operating in DC can implement the techniques disclosed herein to manage multi-radio dual connectivity (MR-DC) deactivation and, in some cases, reactivation of an SCG along with suspension of a radio connection between the UE and the MN. Prior to discussing these techniques, example communication systems which can implement these techniques are considered with reference to FIGS. 1A &1B.

Figure 1A:
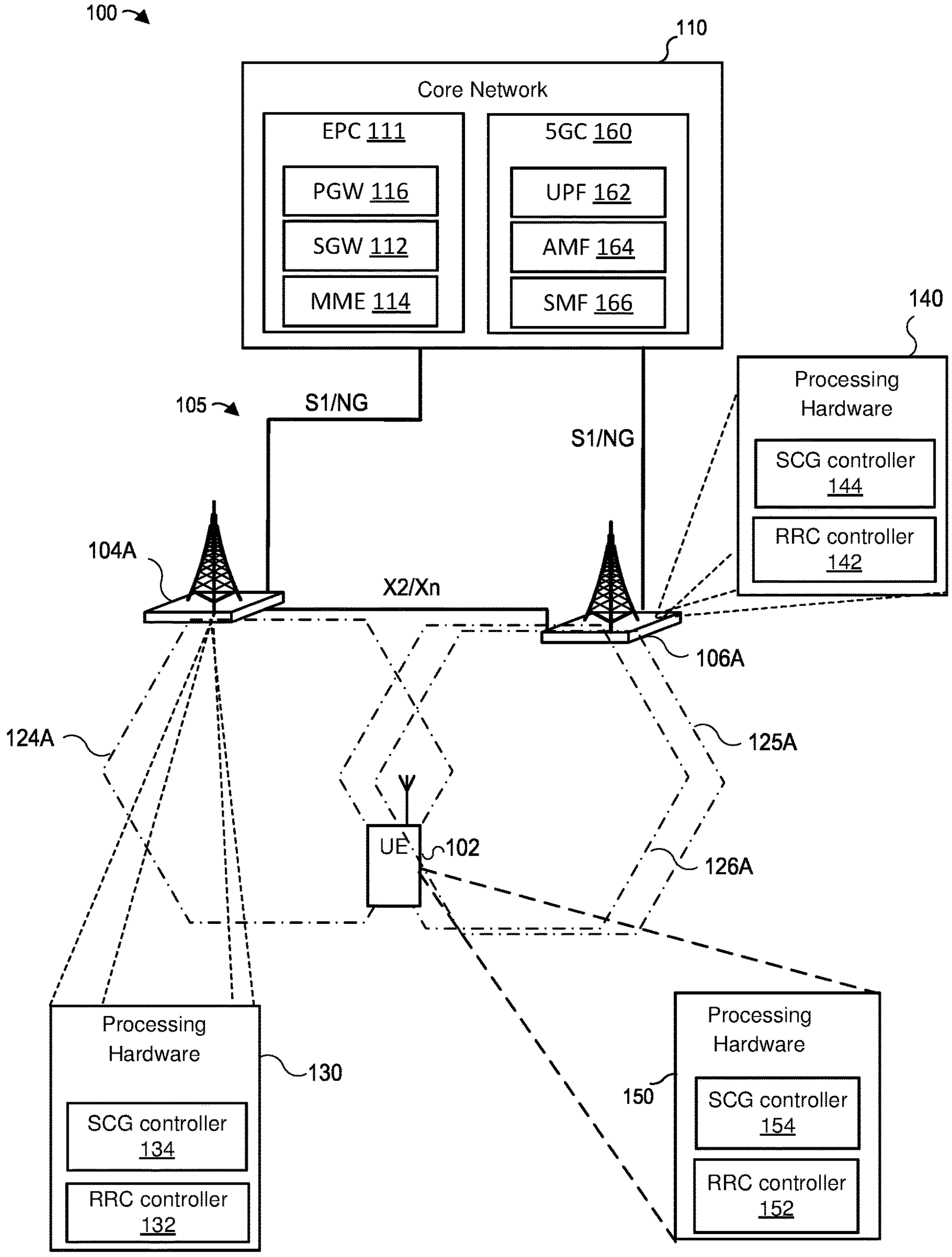
FIG. 1A is a block diagram of an example system in which one or more base stations and/or a user equipment (UE) can implement the techniques of this disclosure for resuming suspended multi-RAT dual connectivity (MR-DC) between the UE and a radio access network (RAN)

FIG. 1A depicts an example wireless communication system 100 that includes a UE 102, a base station (BS) 104A, a base station 106A, and a core network (CN) 110. The base stations 104A and 106A can operate in a RAN 105 connected to the same core network (CN) 110. The CN 110 can be implemented as an evolved packet core (EPC) 111 or a fifth generation (5G) core (5GC) 160, for example.

Among other components, the EPC 111 can include a Serving Gateway (SGW) 112, a Mobility Management Entity (MME) 114, and a Packet Data Network Gateway (PGW) 116. The SGW 112 in general is configured to transfer user-plane packets related to audio calls, video calls, Internet traffic, etc., and the MME 114 is configured to manage authentication, registration, paging, and other related functions. The PGW 116 provides connectivity from the UE to one or more external packet data networks, e.g., an Internet network and/or an Internet Protocol (IP) Multimedia Subsystem (IMS) network. The 5GC 160 includes a User Plane Function (UPF) 162 and an Access and Mobility Management (AMF) 164, and/or Session Management Function (SMF) 166. Generally speaking, the UPF 162 is configured to transfer user-plane packets related to audio calls, video calls, Internet traffic, etc., the AMF 164 is configured to manage authentication, registration, paging, and other related functions, and the SMF 166 is configured to manage PDU sessions.

As illustrated in FIG. 1A, the base station 104A supports a cell 124A, and the base station 106A supports a cell 126A. The base station 106A may additionally support a cell 125A. The cells 124A and 126A can partially overlap, so that the UE 102 can communicate in DC with the base station 104A and the base station 106A operating as a master node (MN) and a secondary node (SN), respectively. The cells 125A and 126A can partially overlap, so that the UE 102 can communicate in CA or DC with the base station 106A operating as a master node (MN) and a secondary node (SN), respectively. To directly exchange messages during DC scenarios and other scenarios discussed below, the base station 104A (also referred to herein as MN 104A) and the base station 106A (also referred to herein as SN 106A) can support an X2 or Xn interface. In general, the CN 110 can connect to any suitable number of base stations supporting 5G new radio (NR) cells and/or EUTRA cells.

As illustrated in FIG. 1A, the base station 104A supports a cell 124A, and the base station 106A supports a cell 126A. The cells 124A and 126A can partially overlap, so that the UE 102 can communicate in DC with the base station 104A and the base station 106A operating as a master node (MN) and a secondary node (SN), respectively. To directly exchange messages during DC scenarios and other scenarios discussed below, the MN 104A and the SN 106A can support an X2 or Xn interface. In general, the CN 110 can connect to any suitable number of base stations supporting NR cells and/or EUTRA cells.

The base station 104A is equipped with processing hardware 130 that can include one or more general-purpose processors such as CPUs and non-transitory computer-readable memory storing machine-readable instructions executable on the one or more general-purpose processors, and/or special-purpose processing units (e.g., an application-specific integrated circuit (ASIC) or a digital signal processor (DSP)). The processing hardware 130 in the example implementation in FIG. 1A includes an MN RRC controller 132 that is configured to manage or control RRC configurations and RRC procedures. For example, the base station RRC controller 132 can be configured to support RRC messaging associated with RRC connection establishment procedures, RRC connection resume procedures, RRC connection reestablishment procedures, RRC reconfiguration procedures, procedures for MR-DC, CA, or other suitable functionalities, and/or to support the necessary operations when the base station 104A operates as an MN, as described below. The processing hardware 130 can include an SCG controller 134 configured to manage or control deactivation and/or activation of an SCG between the UE 102 and an SN.

The base station 106A is equipped with processing hardware 140 that can also include one or more general-purpose processors such as CPUs and non-transitory computer-readable memory storing machine-readable instructions executable on the one or more general-purpose processors, and/or special-purpose processing units (e.g., an ASIC or a DSP). The processing hardware 140 in an example implementation includes an SN RRC controller 142 configured to manage or control RRC configurations and RRC procedures. The processing hardware 140 can include an SCG controller 144 configured to manage, control or perform deactivation and/or activation of an SCG between the UE 102 and an SN. In general, because a base station can operate as an MN or an SN in different scenarios, the RRC controllers 132 and 142 can implement similar sets of functions and each support both MN and SN operations.

Still referring to FIG. 1A, the UE 102 is equipped with processing hardware 150 that can include one or more general-purpose processors such as CPUs and non-transitory computer-readable memory storing machine-readable instructions executable on the one or more general-purpose processors, and/or special-purpose processing units. The processing hardware 150 in the example implementation of FIG. 1A includes a UE RRC controller 152 that is configured to manage or control RRC configurations and/or RRC procedures. For example, the UE RRC controller 152 can be configured to support RRC messaging associated with RRC connection establishment procedures, RRC connection resume procedures, RRC connection reestablishment procedures, and/or procedures for MR-DC, CA, or other suitable functionalities, in accordance with any of the implementations described below. The processing hardware 150 can include an SCG controller 154 configured to manage, control or perform deactivation and/or activation of an SCG between the UE 102 and an SN.

More particularly, the RRC controllers 132, 142, and 152 can implement at least some of the techniques discussed below (with reference to various messaging and flow diagrams) to manage RRC configurations. The SCG controllers 134, 144, and 154 can implement at least some of the techniques discussed below (with reference to various messaging and flow diagrams) to manage SCG deactivation and/or activation.

In operation, the UE 102 can use a radio bearer (e.g., a DRB or an SRB) that at different times terminates at the MN 104A or the SN 106A. The UE 102 can receive a radio bearer configuration configuring the radio bearer from the MN 104A or the SN 106A. The UE 102 can apply one or more security keys when communicating on the radio bearer, in the uplink (from the UE 102 to a base station) and/or downlink (from a base station to the UE 102) direction. The UE 102 in some cases can use different RATs to communicate with the base stations 104A and 106A. Although the examples below may refer to specific RAT types, 5G NR or EUTRA, in general the techniques of this disclosure also can apply to other suitable radio access and/or core network technologies.

Figure 1B:
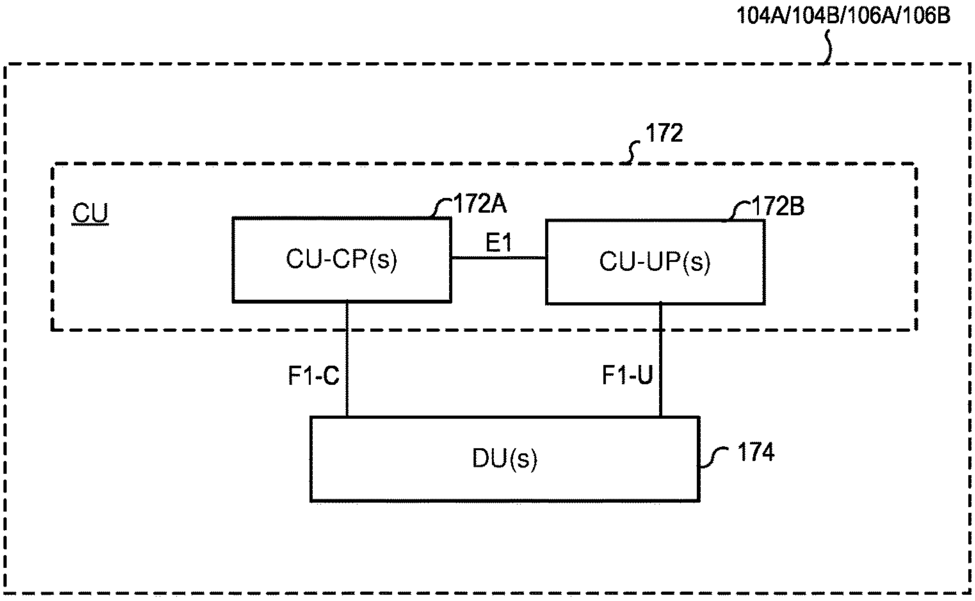
FIG. 1B is a block diagram of an example base station including a central unit (CU) and a distributed unit (DU) that can operate in the system of FIG. 1A.

FIG. 1B depicts an example, distributed or disaggregated implementation of any one or more of the base stations 104A, 106A. In this implementation, the base station 104A or 106A includes a central unit (CU) 172 and one or more DUs 174. The CU 172 includes processing hardware, such as one or more general-purpose processors (e.g., CPUs) and a computer-readable memory storing machine-readable instructions executable on the general-purpose processor(s), and/or special-purpose processing units. For example, the CU 172 can include the processing hardware 130 or 140 of FIG. 1A.

Each of the DUs 174 also includes processing hardware that can include one or more general-purpose processors (e.g., CPUs) and computer-readable memory storing machine-readable instructions executable on the one or more general-purpose processors, and/or special-purpose processing units. For example, the processing hardware can include a medium access control (MAC) controller configured to manage or control one or more MAC operations or procedures (e.g., a random access procedure), and a radio link control (RLC) controller configured to manage or control one or more RLC operations or procedures when the base station (e.g., base station 106A) operates as an MN or an SN. The process hardware can also include a physical layer controller configured to manage or control one or more physical layer operations or procedures.

In some implementations, the CU 172 can include a logical node CU-CP 172A that hosts the control plane part of the Packet Data Convergence Protocol (PDCP) protocol of the CU 172. The CU 172 can also include logical node(s) CU-UP 172B that hosts the user plane part of the PDCP protocol and/or Service Data Adaptation Protocol (SDAP) protocol of the CU 172. The CU-CP 172A can transmit control information (e.g., RRC messages, F1 application protocol messages), and the CU-UP 172B can transmit the data packets (e.g., SDAP PDUs or Internet Protocol packets).

The CU-CP 172A can be connected to multiple CU-UP 172B through the E1 interface. The CU-CP 172A selects the appropriate CU-UP 172B for the requested services for the UE 102. In some implementations, a single CU-UP 172B can be connected to multiple CU-CP 172A through the E1 interface. The CU-CP 172A can be connected to one or more DU 174s through an F1-C interface. The CU-UP 172B can be connected to one or more DU 174 through the F1-U interface under the control of the same CU-CP 172A. In some implementations, one DU 174 can be connected to multiple CU-UP 172B under the control of the same CU-CP 172A. In such implementations, the connectivity between a CU-UP 172B and a DU 174 is established by the CU-CP 172A using Bearer Context Management functions.

Figure 2:
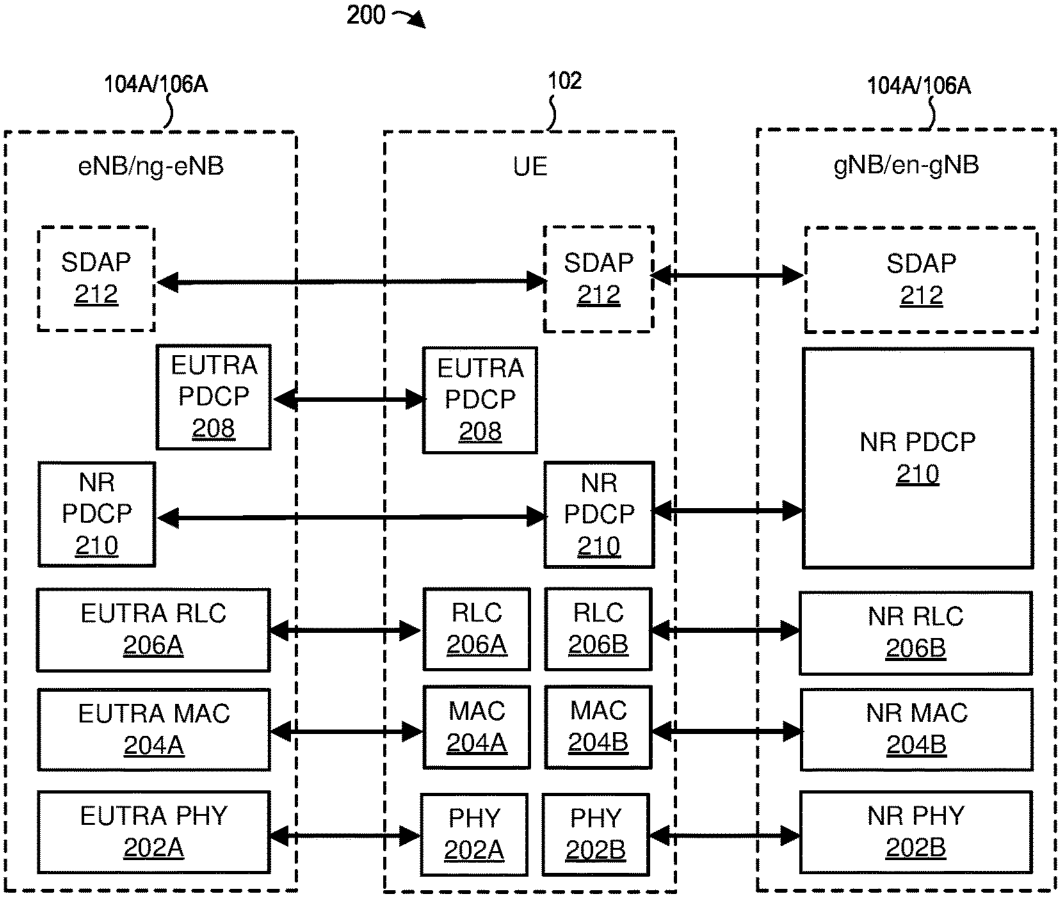
FIG. 2 is a block diagram of an example protocol stack according to which the UE of FIGS. 1A-B can communicate with base stations.

FIG. 2 illustrates, in a simplified manner, an example protocol stack 200 according to which the UE 102 can communicate with an eNB/ng-eNB or a gNB (e.g., one or more of the base stations 104A, 106A).

In the example stack 200, a physical layer (PHY) 202A of EUTRA provides transport channels to the EUTRA MAC sublayer 204A, which in turn provides logical channels to the EUTRA RLC sublayer 206A. The EUTRA RLC sublayer 206A in turn provides RLC channels to an EUTRA PDCP sublayer 208 and, in some cases, to an NR PDCP sublayer 210. Similarly, the NR PHY 202B provides transport channels to the NR MAC sublayer 204B, which in turn provides logical channels to the NR RLC sublayer 206B. The NR RLC sublayer 206B in turn provides data transfer services to the NR PDCP sublayer 210. The NR PDCP sublayer 210 in turn can provide data transfer services to Service Data Adaptation Protocol (SDAP) 212 or a radio resource control (RRC) sublayer (not shown in FIG. 2). The UE 102, in some implementations, supports both the EUTRA and the NR stack as shown in FIG. 2, to support handover between EUTRA and NR base stations and/or to support DC over EUTRA and NR interfaces. Further, as illustrated in FIG. 2, the UE 102 can support layering of NR PDCP 210 over EUTRA RLC 206A, and SDAP sublayer 212 over the NR PDCP sublayer 210.

The EUTRA PDCP sublayer 208 and the NR PDCP sublayer 210 receive packets (e.g., from an Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 can provide SRBs to exchange RRC messages or non-access-stratum (NAS) messages, for example. On a user plane, the EUTRA PDCP sublayer 208 and the NR PDCP sublayer 210 can provide DRBs to support data exchange. Data exchanged on the NR PDCP sublayer 210 can be SDAP PDUs, Internet Protocol (IP) packets or Ethernet packets.

In scenarios where the UE 102 operates in EN-DC with the base station 104A operating as an MeNB and the base station 106A operating as an SgNB, the wireless communication system 100 can provide the UE 102 with an MN-terminated bearer that uses EUTRA PDCP sublayer 208, or an MN-terminated bearer that uses NR PDCP sublayer 210. The wireless communication system 100 in various scenarios can also provide the UE 102 with an SN-terminated bearer, which uses only the NR PDCP sublayer 210. The MN-terminated bearer can be an MCG bearer or a split bearer. The SN-terminated bearer can be an SCG bearer or a split bearer. The MN-terminated bearer can be an SRB (e.g., SRB1 or SRB2) or a DRB. The SN-terminated bearer can be an SRB (e.g., SRB3) or a DRB.

Below the PDCP layer, any of the PHY, MAC, and RLC layers may be generically referenced as a lower layer or lower layers (e.g., PHY 202A/202B, MAC 204A/204B, and/or RLC 206A/206B). While managing connectivity between a base station 104A, 106A and a UE 102, one or more of these lower layers may be suspended, released, resumed, reset, or re-established.

Next, several example scenarios in which the base stations operating in the system of FIG. 1A deactivate an SCG and/or re-activate a previously deactivated SCG are discussed with reference to FIGS. 3A-6B. Generally speaking, events in FIGS. 3A-D and 5A&B that are similar are labeled with similar reference numbers (e.g., event 316A is similar to events 316B-D and 516A&B), with differences discussed below where appropriate. Events in FIGS. 4A-C and 6A&B that are similar are labeled with similar reference numbers (e.g., event 404A is similar to events 404B-C and 604A-B), with differences discussed below where appropriate.

Figure 3A:
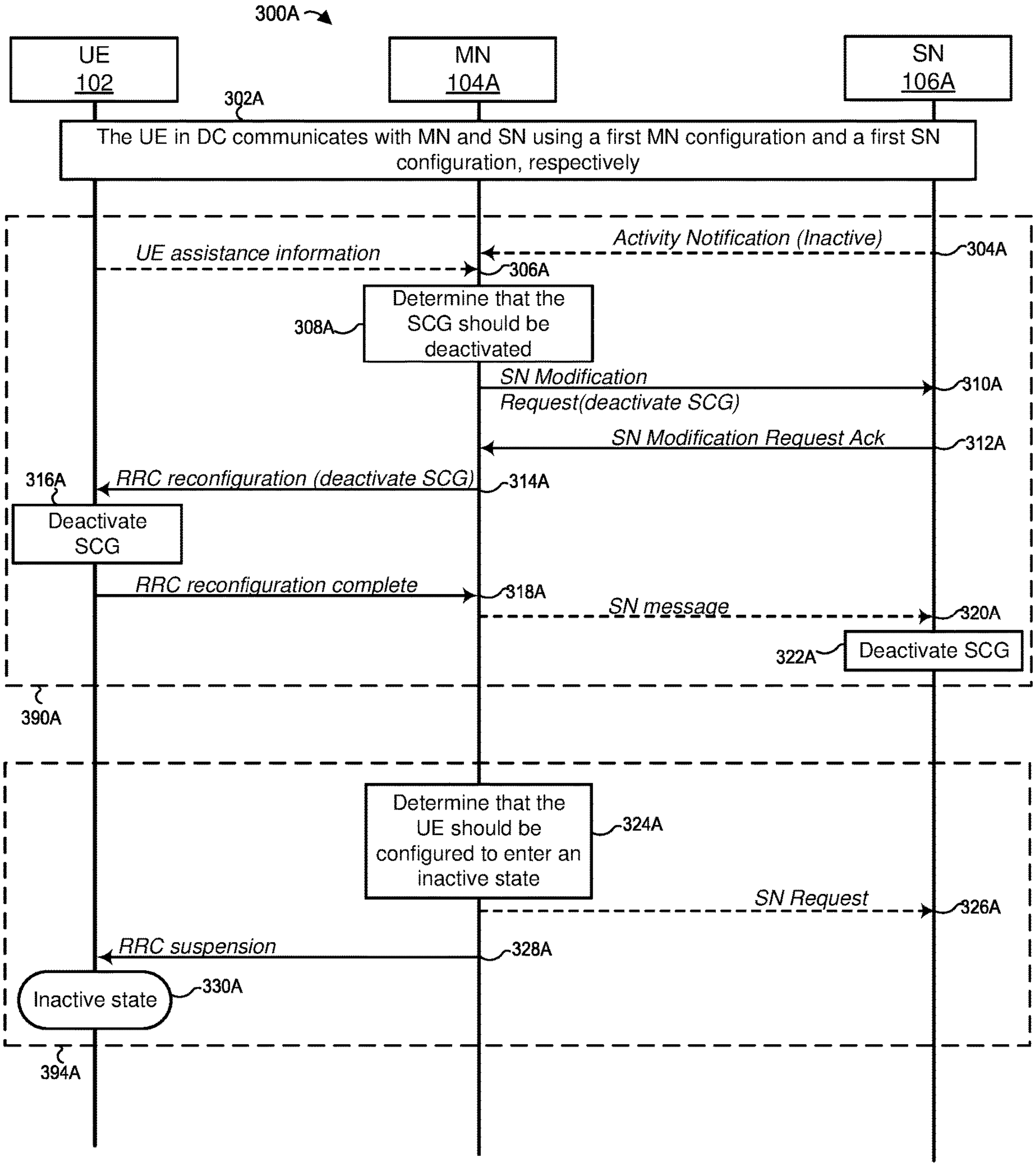
FIG. 3A is an example message sequence in which an MN determines that the SCG should be deactivated for the UE based on an inactivity notification, and subsequently causes the UE to transition to an inactive state.

Referring first to FIG. 3A, in a scenario 300A, the base station 104A operates as an MN, and the base station 106A operates as an SN. Initially, the UE 102 in DC communicates 302A uplink (UL) PDUs and/or downlink (DL) PDUs with the MN 104A and with SN 106A in accordance with a first MN configuration and a first SN configuration, respectively. In some implementations, the UE 102 in DC can communicate 302A UL PDUs and/or DL PDUs via radio bearers which can include SRBs and/or DRBs. The MN 104A and/or the SN 106A can configure the radio bearers to the UE 102. The UE 102 in DC communicates with the MN 104A on an MCG and with the SN 106A on an SCG. As a part of the first MN configuration, the MN 104A configures the MCG, which includes at least one serving cell of the MN 104A. As a part of the first SN configuration, the SN 106A configures the SCG, which includes at least one serving cell of the SN 106A. In some implementations, the first MN configuration includes multiple configuration parameters, and the UE 102 receives the configuration parameters in one or more RRC messages from the MN 104A. In other implementations, the first SN configuration includes multiple configuration parameters, and the UE 102 receives the configuration parameters in one or more RRC messages from the SN 106A, e.g., via the MN 104A or on an SRB (e.g., SRB3) that the MN 104A or SN 106A configures to exchange RRC messages between the UE 102 and the SN 106A.

At a later time, the MN 104A determines 308A to deactivate the SCG for communication with the UE 102. In some implementations, the MN 104A detects data inactivity on the SCG and, in response, determine 308A to deactivate the SCG for the UE 102. In one implementation, the MN 104A detects data inactivity on the SCG based on a message for the UE 102 that the MN 104A receives from the SN 106A. For example, the SN 106A may detect data inactivity for the UE 102 or data volume for the UE 102 is small volume, and in response send 304A an Activity Notification message with an inactive indication for the UE 102 to the MN 104A. The MN 104A can then determine 308A to deactivate the SCG for the UE 102 based on the received Activity Notification message. In another implementation, the MN 104A does not receive from the CN 110 (shown in FIG. 1A) any data packets for sending to the UE 102 via the SN 106A during a predetermined time period, and thus detects data inactivity exists on the SCG.

In other implementations, the MN 104A determines to deactivate the SCG for the UE 102 based on a UE preference that the MN 104A receives from the UE 102. For example, the UE 102 can transmit 306A UE assistance information (e.g., a UEAssistanceInformation message) to the MN 104A, indicating the UE presently prefers single connectivity for power saving or due to overheating. The MN 104A determines 308A to deactivate the SCG for the UE 102 in response to the UE assistance information received at event 306A.

In response to the determination 308A, the MN 104A sends 310A to the SN 106A an SN Modification Request message that deactivates the SCG for the UE 102. In some implementations, the MN 104A includes an indication (e.g., a field or an information element (IE)) to deactivate the SCG in the SN Modification Request message of event 310A to cause the SN 106A to deactivate the SCG. In response to the SN Modification Request message, the SN 106A sends 312A an SN Modification Request Acknowledge message to the MN 104A.

In response to the determination 308A, after the MN 104A transmits 308A the SN Modification Request message or after the MN 104A receives 312A the SN Modification Request Acknowledge message, the MN 104A transmits 314A an RRC reconfiguration message to cause the UE 102 to deactivate the SCG. In response to the RRC reconfiguration message, the UE 102 deactivates 316A the SCG for communication with the SN 106A and transmits 318A an RRC reconfiguration complete message to the MN 104A. After deactivating the SCG, the UE 102 retains the radio connection with the MN 104A. After receiving the RRC reconfiguration complete message, the MN 104A can send 320A an SN message (e.g., SN Reconfiguration Complete message) to the SN 106A to indicate that the UE 102 has deactivated the SCG.

In some implementations, the SN 106A includes an additional SN configuration in the SN Modification Request Acknowledge message 312A, and the MN 104A includes the additional SN configuration in the RRC reconfiguration message 314A to deactivate all or a portion of the SCG configurations at the UE. In some implementations, the SN 106A generates the additional SN configuration as a delta SN configuration which deactivates the SCG at the UE by augmenting only a portion of the first SN configuration at the UE. Accordingly, the UE 102 augments or modifies only a portion of the first SN configuration with the delta SN configuration and retains the portion of the first SN configuration that is not augmented by the delta SN configuration. In other implementations, the SN 106A generates the additional SN configuration as a complete and self-contained configuration (i.e. a full SN configuration). The UE 102 replaces the first SN configuration with the additional SN configuration. In yet other implementations, the SN 106A does not include an SN configuration in the SN Modification Request Acknowledge message 312A and thus, the MN 104A does not include a SN configuration in RRC reconfiguration message 314A.

In some implementations, the MN 104A can also include a second MN configuration in the RRC reconfiguration message the MN 104A transmits 314A, in which case, the UE 102 communicates with the MN 104A using the second MN configuration after receiving 314A the RRC reconfiguration message. In some implementations, the MN 104A generates the second MN configuration as a delta MN configuration which augments only a portion of the first MN configuration. Accordingly, the UE 102 communicates with the MN 104A using the delta MN configuration and the portion of the first MN configuration that is not augmented by the delta MN configuration. In other implementations, the MN 104A does not include an MN configuration in the RRC reconfiguration message the MN 104A transmits 314A.

The SN 106A can deactivate 322A the SCG for communication with the UE 102 in response to receiving 310A the SN Modification Request message, after transmitting 312A the SN Modification Request Acknowledge message, or after receiving 320A the SN message. The events 304A, 306A, 308A, 310A, 312A, 314A, 316A, 318A, 320A and 322A are collectively referred to in FIG. 3A as an SCG deactivation procedure 390A.

In some implementations, the SN 106A suspends one or more lower layers of the radio connection between the SN 106A and the UE 102 after deactivating the SCG. While the lower layers are suspended, the SN 106A in one implementation does not transmit downlink transmissions to the UE 102 using the lower layers. The SN 106A in another implementation does not receive uplink transmissions from the UE 102 via the suspended lower layers. In some implementations, the SN 106A includes a CU (e.g., CU 172) and a DU (e.g., DU 174). The CU can send to the DU a UE Context Request message (e.g., a UE Context Modification Request message) including an instruction to suspend lower layers after or in response to deactivating 322A the SCG, receiving 310A the SN Modification Request message or 320A the SN message or transmitting 320A the SN Modification Request Acknowledge message. In response to the UE Context Request message or the instruction to suspend lower layers, the DU suspends lower layers for communication with the UE 102 and sends a UE Context Response message (e.g., a UE Context Modification Response message) to the CU. Similarly, the UE 102 in some implementations suspends lower layers for communication with the SN 106A to deactivate the SCG. While the lower layers are suspended, the UE 102 in one implementation does not transmit uplink transmissions to the SN 106A via the lower layers. While the lower layers are suspended, the UE 102 in another implementation does not receive downlink transmissions from the SN 106A via the lower layers. For example, the downlink transmissions can include PDUs (e.g., MAC PDUs or RLC PDUs), downlink control information (DCI) with a cyclic redundancy check (CRC) scrambled with a cell radio network temporary identifier (C-RNTI), and/or reference signals (e.g., channel state information reference signal (CSI-RS)). In another example, the uplink transmissions can include PDUs (e.g., MAC PDUs or RLC PDUs), channel state information (CSI), physical uplink control channel (PUCCH), and/or sounding reference signal (SRS).

In other implementations, the SN 106A releases one or more lower layers of the radio connection between the SN 106A and the UE 102 after deactivating the SCG. More specifically, the SN 106A in this case releases lower layer resources for communicating with the UE 102. These resources can include software, firmware, memory resources, and/or processing power that the SN 106A uses to implement functions of the PHY 202A/202B, MAC 204A/204B, and/or RLC 206A/206B layers for communicating with the UE. If the SN 106A includes a CU and DU, the CU sends to the DU a UE Context Release Command message, which causes the DU to release lower layers for communicating with the UE 102. In response to the UE Context Release Command message, the DU releases lower layer resources for communicating with the UE 102.

In some implementations, the MN 104A can include an indication that the SN 106A should deactivate the SCG, in the SN Modification Request message of event 310A. In other implementations, the MN 104A can include, in the SN Modification Request message of event 310A, an indication that the SN 106A should suspend lower layers. In the latter case, the MN 104A can include this indication in addition to, or instead of, the indication that the SN 106A should deactivate the SCG.

In some implementations, the UE 102 starts a time alignment timer associated to a timing advance value or uplink synchronization before deactivating the SCG. The UE 102 maintains the time alignment timer running in response to deactivating the SCG, so that the UE 102 determines it is synchronized with the SN 106A in uplink on the SCG. Similarly, the SN 106A or DU of the SN (not shown in FIG. 3A) starts a corresponding time alignment timer for the UE 102 to determine whether the UE 102 is synchronized with the SN 106A in uplink on the SCG before activating the SCG and maintains the corresponding time alignment timer running in response to deactivating the SCG.

In some implementations, the UE 102 starts one or more timers associated to the SCG before deactivating the SCG, and the UE 102 stops the timer(s) in response to deactivating the SCG. For example, the timer(s) include timers T310, T312, T321, T322, T342, T345, T346a, T346b, T346c, T346d, T346e and/or T346f as specified in 3GPP specification 38.331 or 36.331 v16.3.0. In response to deactivating the SCG, the UE 102 in other implementations maintains a first subset of the timer(s) running and stops a second, non-overlapping subset of the timer(s). In yet other implementations, the UE 102 may detect SCG failure before receiving 314A the RRC reconfiguration message. If the UE 102 has not notified the MN 104A of the SCG failure after receiving 314A the RRC reconfiguration message, the UE 102 in some implementations stops or refrains from transmitting to the MN 104A a SCG failure information message to indicate the SCG failure. Alternatively, the UE 102 still transmits to the MN 104A a SCG failure information message to indicate the SCG failure irrespective of receiving 314A the RRC message. In some implementations, in response to or after receiving the SCG failure information message, the MN 104A refrains from transmitting a second RRC reconfiguration message to the UE 102 to activate the SCG (in order to recover the SCG failure) after making 308A the determination to deactivate the SCG. In other implementations, the MN 104A activates the SCG as described in event 370E or 380E in FIG. 3E, in order to recover the SCG failure in response to or after receiving the SCG failure information message.

With continued reference to FIG. 3A, upon receiving 314A the RRC reconfiguration message or after deactivating 316A the SCG, the UE 102 may retain the first SN configuration (or retain some configuration elements of the first SN configuration). The SN 106A may also retain the first SN configuration (or retain some configuration elements of the first SN configuration). In some implementations, the UE 102 may release a configuration in the first SN configuration after receiving 314A the RRC reconfiguration message or deactivating 316A the SCG. Correspondingly, the SN 106A may also release the configuration in the first SN configuration after deactivating 322A the SCG.

In some implementations, the UE 102 may release a first portion of the first SN configuration and retain a second portion of the first SN configuration, after or in response to receiving 314A the RRC reconfiguration message or deactivating 316A the SCG. The SN 106A may also release the corresponding portion of the first SN configuration and retain the second portion of the first SN configuration, after or in response to determining that the SCG should be deactivated (event 310A or 312A) or deactivating the SCG (event 320A or 322A), for example.

In other implementations, the UE 102 may retain a first portion of the first MN configuration and retain a second portion of the first MN configuration, after or in response to receiving 314A the RRC reconfiguration message or deactivating the SCG. Correspondingly, the MN 104A may also retain the first portion of the first MN configuration and the second portion of the first MN configuration, after or in response to determining 308A that the SCG should be deactivated, deactivating 310A the SCG, transmitting 314A the RRC reconfiguration message, or receiving 318A the RRC reconfiguration complete message. After deactivating the SCG, the UE 102 uses the second portion of the first MN configuration to communicate with the MN 104A, and does not use the first portion of the first MN configuration to communicate with the MN 104A.

Returning to FIG. 3A, the events 324A, 326A, and 330A are collectively referenced as an RRC suspension procedure 394A. At a later time relative to SCG deactivation procedure 390A, the MN 104A can detect further data inactivity for the UE 102 and, in response, determines 324A to configure the UE 102 to enter an inactive state (e.g., RRC_INACTIVE state). In some implementations, the MN 104A can start a data inactivity timer to monitor further data activity after the MN 104A receives the message at event 304A. If the data inactivity timer expires and the MN 104A neither transmits data to and/or receives data from the UE 102 nor receives an Activity Notification message with an active indication for the UE 102 from the SN 106A while the data inactivity timer is running, then the MN 104A detects further data inactivity for the UE 102. Conversely, if the MN 104A has data to be transmitted to the UE 102 or receives data from the UE 102, or receives an Activity Notification message with an inactive indication for the UE 102, while the data inactivity timer is running, then the MN 104A can restart the data inactivity timer. In response to detecting further data inactivity for the UE 102 (e.g., expiry of the data inactivity timer), the MN 104A determines to configure the UE 102 to enter the inactive state.

In response to the determination 324A, the MN 104A in some implementations can send 326A to the SN 106A an SN Request message (e.g., SN Modification Request message) that includes an instruction to release lower layers for the UE 102. In response to or after receiving the SN Request message, the SN 106A releases the lower layers and can send an SN Request Acknowledge message (e.g., SN Modification Request Acknowledge message) to the MN 104A. In some implementations, the SN 106A can release lower layer resources that are allocated to communicate with the UE 102 in response to the SN Request message or the instruction to release the lower layers. These resources can include, for example, software, firmware, memory resources (e.g., memory hardware or storage space within memory hardware), and/or processing power that the SN 106A uses to implement functions of the PHY 202A/202B, MAC 204A/204B, and/or RLC 206A/206B layers for communicating with the UE 102. For example, the SN 106A can allocate processing power from an ASIC, DSP, and/or CPU of the SN 106A for communicating with the UE 102, and may release the allocated processing power in response to the instruction to release lower layers. In other implementations, the SN 106A can release the first SN configuration or a portion of the first SN configuration in response to the instruction to release lower layers. In some implementations, the SN 106A can retain at least one interface identifier (ID) of the UE 102 for exchanging interface messages between the MN 104A and the SN 106A in response to the instruction to release lower layers. For example, if the interface between the MN 104A and the SN 106A is an Xn interface (e.g., the Xn interface shown in FIG. 1A), the at least one interface ID can include a first UE XnAP ID allocated by the SN 106A, and a second UE XnAP ID allocated by the MN 104A. In another example, if the interface between the MN 104A and the SN 106A is an X2 interface, the at least one interface ID can include a first UE X2AP ID allocated by the SN 106A, and a second UE X2AP ID allocated by the MN 104A.

In response to the determination 324A, the MN 104A in other implementations sends 326A to the SN 106A an SN Request message (e.g., an SN Modification Request message) including an instruction to suspend lower layers for communicating with the UE 102. In response to or after receiving the SN Request message (e.g., an SN Modification Request Acknowledge message), the SN 106A suspends the lower layers and sends an SN Request Acknowledge message (e.g., an SN Modification Request Acknowledge message) to the MN 104A. In some implementations, the SN 106A releases resources of lower layers allocated to communicate with the UE 102 in response to the instruction to suspend lower layers. These resources can include software, firmware, memory resources, and/or processing power that the SN 106A uses to implement functions of the PHY 202A/202B, MAC 204A/204B, and/or RLC 206A/206B layers for communicating with the UE 102. For example, the SN 106A can allocate processing power from an ASIC, DSP and/or CPU of the SN 106A for communicating with the UE 102, and release the allocated processing power in response to the instruction to suspend lower layers. In other implementations, the SN 106A retains the resources of lower layers allocated to communicate with the UE 102 despite receiving the instruction to suspend lower layers, and despite suspending operation of the PHY 202A/202B, MAC 204A/204B, and/or RLC 206A/206B layers (i.e., despite suspending communication with the UE 102).

In yet other implementations, the SN 106A may retain or release the first SN configuration or a portion of the first SN configuration in response to the instruction 326A to suspend lower layers. In some implementations, the SN 106A can retain at least one interface ID of the UE 102 for exchanging interface messages between the MN 104A and the SN 106A in response to the instruction to suspend lower layers. For example, if the interface between the MN 104A and the SN 106A is an Xn interface (e.g., as shown in FIG. 1A), the interface ID(s) can include a first UE XnAP ID allocated by the SN 106A, and a second UE XnAP ID allocated by the MN 104A. In another example, if the interface between the MN 104A and the SN 106A is an X2 interface, the at least one interface ID can include a first UE X2AP ID allocated by the SN 106A, and a second UE X2AP ID allocated by the MN 104A.

In some implementations, the MN 104A does not trigger on determination 324A to send an SN Request message to the SN 106A. That is, the MN 104A determines to leave the SCG deactivated for the UE 102 even though the MN 104A makes the determination 324A. In other implementations the MN 104A sends 326A the SN 106A an SN Release Request message to the SN 106A in response to the determination, and in response, the SN 106A can send an SN Release Request Acknowledge message to the MN 104A (not shown).

In response to the determination 324A, after the MN 104A optionally transmits 326A the SN Request message or after the MN 104A receives the SN Request Acknowledge message (not shown), the MN 104A transmits 328A an RRC suspension message to cause the UE 102 to transition to the inactive state. In response to the RRC suspension message, the UE 102 transitions 330A to the inactive state. In some implementations, the UE 102 stops or clears the time alignment timer to invalidate uplink synchronization in response to the RRC suspension message. Similarly, the SN 106A stops the corresponding time alignment timer for the UE 102 to invalidate uplink synchronization in response to or after receiving the SN Request message 326A. In other implementations, the UE 102 determines the time alignment timer is invalid or no longer synchronized with the SN 106A in uplink on the SCG in response to the RRC suspension message. Similarly, the SN 106A determines the corresponding time alignment timer is invalid or the UE 102 is no longer synchronized with the SN 106A in uplink on the SCG in response to in response to or after receiving the SN Request message 326A.

In some alternative implementations, the MN 104A can determine 324A that the MN 104A should configure the UE 102 to enter an idle state with a suspended radio connection, rather than an inactive state. In the RRC suspension message, the MN 104A can command the UE 102 to enter an idle state with a suspended radio connection. The UE 102 then enters an idle state, instead of entering 330A an inactive state, with a suspended radio connection in response to the RRC suspension message. In other alternative implementations, the MN 104A can determine 324A that the MN 104A should configure the UE 102 to enter an idle state without a suspended radio connection. In this case, the MN 104A can send an RRC release message to the UE 102, instead of sending 328A the RRC suspension message, to command the UE 102 to enter an idle state without a suspended radio connection. In response to the RRC release message (not shown), the UE 102 enters an idle state without a suspended radio connection and releases the first MN configuration and the first SN configuration. The MN 104A may send an SN Release Request message and/or a Context Release message to the SN 106A in response to determining to configure the UE 102 to enter an idle state without a suspended radio connection.

In the inactive state or the idle state with a suspended RRC connection, the UE 102 suspends the radio connection with the MN 104A but retains the first MN configuration (or at least retains some configuration elements of the first MN configuration). In some implementations, the MN 104A stores a UE context for the UE 102 in the inactive or the idle state with a suspended radio connection (e.g., the UE Access Stratum (AS) Context or the UE Inactive AS Context as defined by the 3GPP specifications, a portion of the UE AS Context, or a portion of the UE Inactive AS Context). The MN 104A communicates with the UE 102 according to the UE context while the UE 102 is in a connected state. The UE context can include a security key, a configuration for an MCG (e.g., including one or more cells of the MN 104A, the first MN configuration or a portion of the first MN configuration), and radio bearer configuration(s) configuring one or more MN-terminated bearers and/or one or more SN-terminated bearers, for example. The one or more MN-terminated bearers and/or the one or more SN-terminated bearers can include SRB(s) and/or DRB(s). Correspondingly, the UE 102 in the inactive or the idle state with a suspended radio connection stores a UE context similar to the UE context stored by the MN 104A.

With continued reference to FIG. 3A, upon receiving 328A the RRC suspension message, the UE 102 may retain the (augmented) first SN configuration (or retain some configuration elements of the (augmented) first SN configuration) and/or retain the SCG deactivated configuration. As discussed below, however, the UE 102 in some implementations does not retain the first SN configuration long enough to re-activate the SCG with the SN 106A as described in FIGS. 4A-C. In other implementations, the UE 102 does not retain the first SN configuration at all after suspending 328A the radio connection and releases the deactivated SCG.

In some implementations, the RRC suspension message is an RRCConnectionRelease or RRCRelease message to configure the UE 102 to enter the inactive state or the idle state with a suspended radio connection. The RRC suspension message can include SuspendConfig IE, an RRC-InactiveConfig-r15 IE, a ResumeIdentity-r13 IE, fullI-RNTI-r16 field or shortI-RNTI-r16 field. In other implementations, the RRC release message is an RRCConnectionRelease or RRCRelease message.

The MN configuration (e.g., the first MN configuration and/or the second MN configuration) can include multiple configuration parameters that configure radio resources for the UE 102 to communicate with the MN 104A via a PCell (e.g., the cell 124A or a cell other than cell 124A) and zero, one, or more secondary cells (SCells) of the MN 104A. For example, the first MN configuration can include PHY configuration(s), MAC configuration(s), and/or RLC configuration(s). In another example, the MN configuration can include one or more measurement configurations. The MN configuration can include one or more radio bearer configurations configuring one or more radio bearers. The UE 102 may receive the multiple configuration parameters in one or more RRC messages from the MN 104A.

In some implementations, the MN configuration includes configuration parameters in an RRCReconfiguration message, RRCReconfiguration-IEs, or the CellGroupConfig information element (IE) conforming to 3GPP TS 38.331. In one implementation, the MN configuration can be an RRCReconfiguration message, RRCReconfiguration-IEs, or the CellGroupConfig IE conforming to 3GPP TS 38.331. In other implementations, the MN configuration can include configuration parameters in a RadioResourceConfigDedicated IE, RRCConnectionReconfiguration message, or RRCConnectionReconfiguration-IEs. In one implementation, the MN configuration can be a RadioResourceConfigDedicated IE, an RRCConnectionReconfiguration message, or an RRCConnectionReconfiguration-IEs conforming to 3GPP TS 36.331.

The SN configuration (i.e., first SN configuration or additional SN configuration) can include multiple configuration parameters that configure radio resources for the UE 102 to communicate with the SN 106A via a PSCell (e.g., the cell 125A) and zero, one, or more SCells of the SN 106A. For example, the SN configuration can include PHY configuration(s), MAC configuration(s), and/or RLC configuration(s). The SN configuration may or may not include measurement configuration(s). In some implementations, the SN configuration may or may not include one or more radio bearer configurations (e.g., RadioBearerConfig, SRB-ToAddMod, or DRB-ToAddMod) configuring one or more radio bearers.

In some implementations, the SN configuration includes configuration parameters in an RRCReconfiguration message, RRCReconfiguration-IEs, or a CellGroupConfig IE conforming to 3GPP TS 38.331. In one implementation, the SN configuration can be an RRCReconfiguration message, RRCReconfiguration-IEs, or a CellGroupConfig IE conforming to 3GPP TS 38.331. In other implementations, the SN configuration can include configuration parameters in an SCG-ConfigPartSCG-r12 IE. In some implementations, the SN configuration can be an RRCConnectionReconfiguration message, RRCConnectionReconfiguration-IEs, or a ConfigPartSCG-r12 IE in accordance with 3GPP TS 36.331.

If the MN 104A is a gNB, the RRC reconfiguration message and the RRC reconfiguration complete message are an RRCReconfiguration message and an RRCReconfigurationComplete message, respectively. If the MN 104A is an eNB or ng-eNB, the RRC reconfiguration message and the RRC reconfiguration complete message are an RRCConnectionReconfiguration message and an RRCConnectionReconfigurationComplete message, respectively.

Figure 3B:
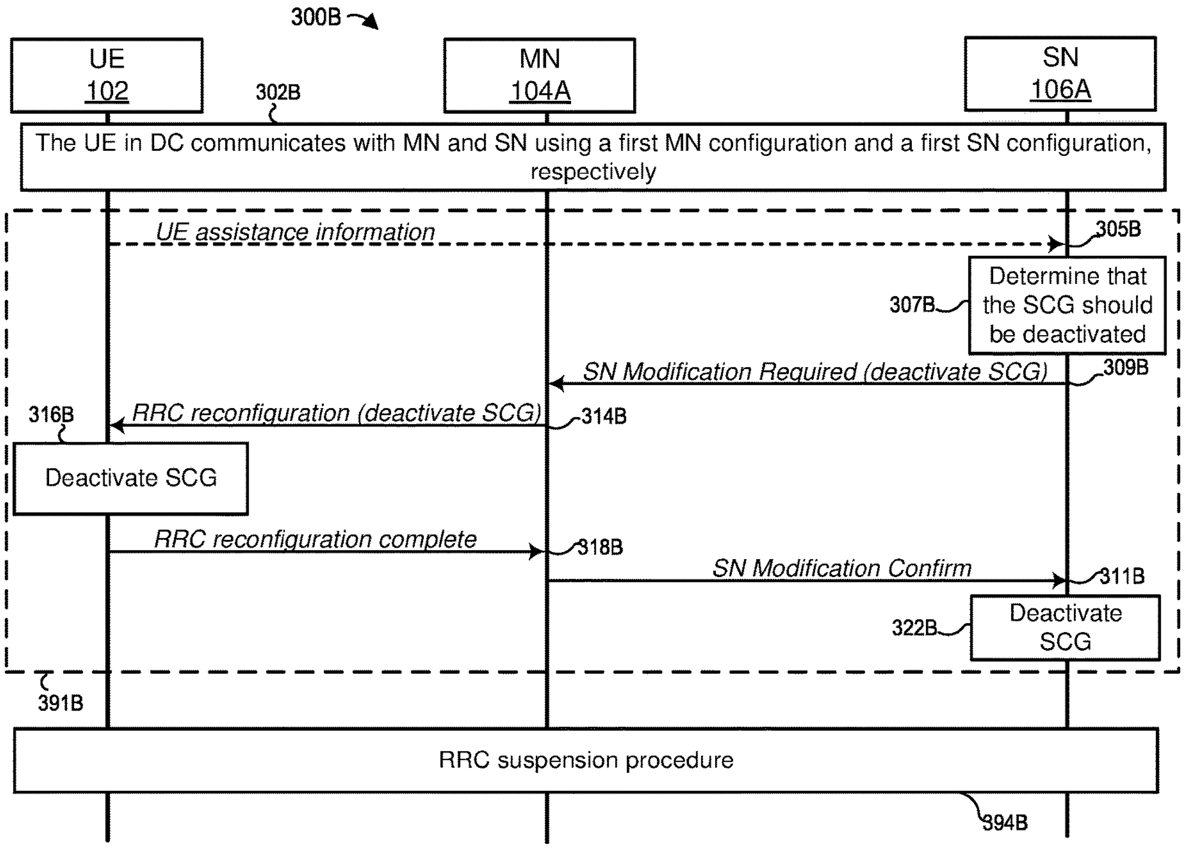
FIG. 3B illustrates a scenario similar to that of FIG. 3A, but with the SN determining that the SCG should be deactivated and notifying the MN accordingly.

Referring next to FIG. 3B, a scenario 300B is generally similar to the scenario 300A, but with the SN 106A, rather than the MN 104A, determining to deactivate the SCG and (in some cases) subsequently re-activate the SCG. As mentioned above, events in the scenario 300B similar to those discussed above with respect to the scenario 300A are labeled with similar reference numbers (e.g., with event 302A of FIG. 3A corresponding to event 302B of FIG. 3B). With the exception of the differences shown in FIG. 3B and the differences described below, any of the alternative implementations discussed above with respect to the scenario 300A (e.g., for messaging and processing) may apply to the scenario 300B.

After event 302B, the SN 106A determines 307B that the SN 106A should deactivate the SCG for communication with the UE 102. In some implementations, the SN 106A can determine that data inactivity on the SCG exists for the UE 102 and, in response, determine 307B that the SN 106A should deactivate the SCG for the UE 102. In one implementation, the SN 106A has neither received data packets to be sent to the UE 102 from the CN 110 nor received data packets from the UE 102 for a predetermined time period, so that the SN 106A may detect data inactivity exists for the UE 102.

In other implementations, the SN 106A determines 307B that the SN 106A should deactivate the SCG for the UE 102 based on a UE preference that the SN 106A receives from the UE 102 e.g., via the MN 104A or on an SRB (e.g., SRB3) that the MN 104A or SN 106A configures to exchange RRC messages between the UE 102 and the SN 106A. For example, the UE 102 sends 305B UE assistance information (e.g., UEAssistanceInformation message) to the SN 106A, indicating the UE presently prefers single connectivity to save power or due to overheating. The SN 106A determines 307B that the SN 106A should deactivate the SCG for the UE 102 in response to the UE assistance information received at event 305B. In some implementations, the SN 106A receives 305B the UE assistance information from the UE 102 via the MN 104A.

In response to the determination 307B, the SN 106A sends 309B to the SN 106A an SN Modification Required message that requests the deactivation of the SCG for the UE 102. In response to the request to deactivate the SCG, the MN 104A transmits 314B an RRC reconfiguration message to the UE 102, similar to event 314A. The UE 102 deactivates 316B the SCG and transmits 318B an RRC reconfiguration complete message to the MN 104A in response to the RRC reconfiguration message the UE 102 receives 314B, similar to events 316A and 318A respectively. After receiving 318B the RRC reconfiguration complete message, the MN 104A sends 311B an SN Modification Confirm message to the SN 106A to indicate that the UE 102 has deactivated the SCG, in response to the SN Modification Required message.

In some implementations, the SN 106A includes an indication (e.g., a field or an information element (IE)) to deactivate the SCG in the 309B SN Modification Required message to cause the MN 104A to transmit 314B the RRC reconfiguration message to the UE 102. The SN 106A deactivates 322B the SCG after determining 307B it should deactivate the SCG. In some implementations, the SN 106A deactivates 322B the SCG after receiving 311B the SN Modification Confirm message to reduce chances of a reactivation when the UE 102 detects SCG failure during or before deactivating the SCG. The events 305B, 307B, 309B, 311B, 314B, 316B, 318B, and 322B are collectively referred to in FIG. 3B as an SCG deactivation procedure 391B.

After the SCG deactivation procedure 391B, receiving the RRC reconfiguration complete message 318B, or sending the SN Modification Confirm message 311B, the MN 104A can perform 394B an RRC suspension procedure with the UE 102, similar to the RRC suspension procedure 394A.

Figure 3C:
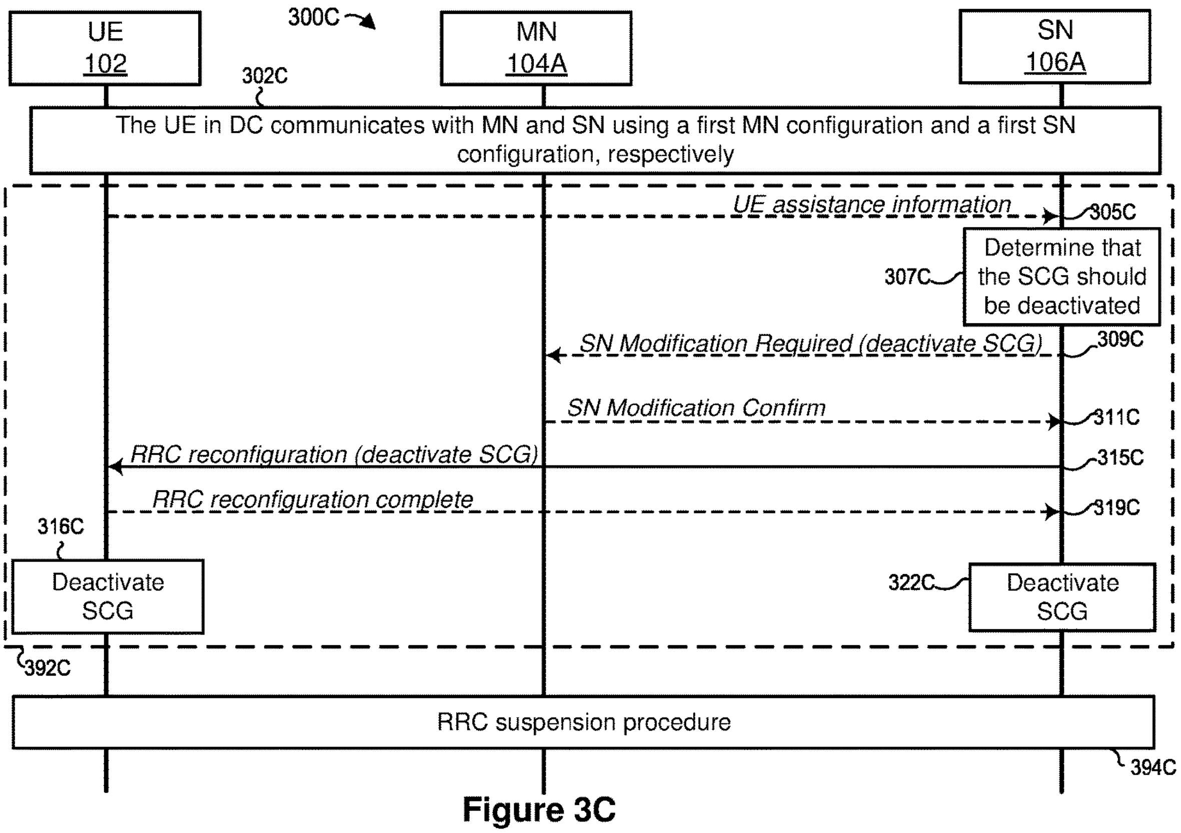
FIG. 3C illustrates a scenario similar to that of FIG. 3A, but with the SN determining that the SCG should be deactivated and directly notifying the UE of the SCG deactivation.

Referring next to FIG. 3C, a scenario 300C is generally similar to the scenarios 300A and 300B, except that here the UE 102 communicates directly with the SN 106A regarding deactivation of the SCG. With the exception of the differences shown in FIG. 3C and the differences described below, any of the alternative implementations discussed above with respect to the scenarios 300A and 300B (e.g., for messaging and processing) may apply to the scenario 300C.

In response to determining 307C it should deactivate the SCG, the SN 106A generates an RRC message to deactivate the SCG and transmits 315C the RRC reconfiguration message to the UE 102 on an SRB (e.g., SRB3) that the MN 104A or SN 106A configures to exchange RRC messages between the UE 102 and the SN 106A. In response, the UE 102 deactivates 316C the SCG. The UE 102 can optionally transmit 319C an RRC reconfiguration complete message to the SN 106A on the SRB in response to the RRC reconfiguration message. Alternatively, the SN 106A transmits 315C the RRC reconfiguration message to the UE 102 via the MN 104A. The UE 102 can transmit 319C the RRC reconfiguration complete message to the SN 106A via the MN 104A.

In some implementations, if the UE 102 is required to transmit the RRC reconfiguration complete message, the UE 102 can transmit 319C the RRC reconfiguration complete message before or after deactivating 316C the SCG. In other implementations, the SN 106A deactivates 322C the SCG after determining 307C to deactivate the SCG or after transmitting 315C the RRC reconfiguration message. In yet other implementations, if the UE 102 transmits 319C the RRC reconfiguration complete message, the SN 106A deactivates 322C the SCG after receiving 319C the RRC reconfiguration complete message. In yet other implementations, the SN 106A deactivates 322C the SCG after receiving an acknowledgement message from the UE 102, acknowledging that the UE 102 received PDU(s) including the RRC reconfiguration message. For example, the acknowledgement message can be an RLC acknowledgement PDU or a Hybrid Automatic Repeat Request (HARQ) acknowledgement.

In some implementations, the SN 106A can send 309C to the MN 104A an SN Modification Required message to obtain permission from the MN 104A to deactivate the SCG after determining 307C it should deactivate the SCG. The MN 104A can send 311C to the SN 106A an SN Modification Confirm message indicating the MN 104A permits the SN 106A to deactivate the SCG. After obtaining the permission, the SN 106A transmits 315C the RRC reconfiguration message to the UE 102.

In other implementations, the SN 106A does not require a permission to deactivate the SCG from the MN 104A. The SN 106A can send to the MN 104A an SN message (e.g., SN Modification Required message, SN Deactivation Notification message, or an X2 or Xn interface message) indicating that the SCG is deactivated after determining 307C to deactivate the SCG. In one implementation, the SN 106A can send the SN message before or after transmitting 315C the RRC reconfiguration message. In another implementation, the SN 106A can send 309C the SN message before or after receiving 319C the RRC reconfiguration complete message.

In some implementations, the SN 106A can send 315C to the UE 102 a MAC control element (CE) to command the UE 102 to deactivate the SCG instead of the RRC reconfiguration message. In such implementations, the UE 102 in one implementation may not transmit a MAC CE to the SN 106A in response to the MAC CE that the UE 102 receives at event 315C. In another implementation, the UE 102 transmits 319C another MAC CE to the SN 106A in response to the MAC CE that the UE 102 receives at event 315C. It is often faster to deactivate the SCG using a MAC CE, rather than the RRC reconfiguration message, because of fewer protocol layers involved.

The events 305C, 307C, 309C, 311C, 315C, 316C, 319C, and 322C are collectively referred to in FIG. 3C as an SCG deactivation procedure 392C.

After the SCG deactivation procedure 392C or receiving the SN message 309C or sending the SN Modification Confirm message 311C, the MN 104A can perform 394C an RRC suspension procedure with the UE 102, similar to the RRC suspension procedure 394A.

Figure 3D:
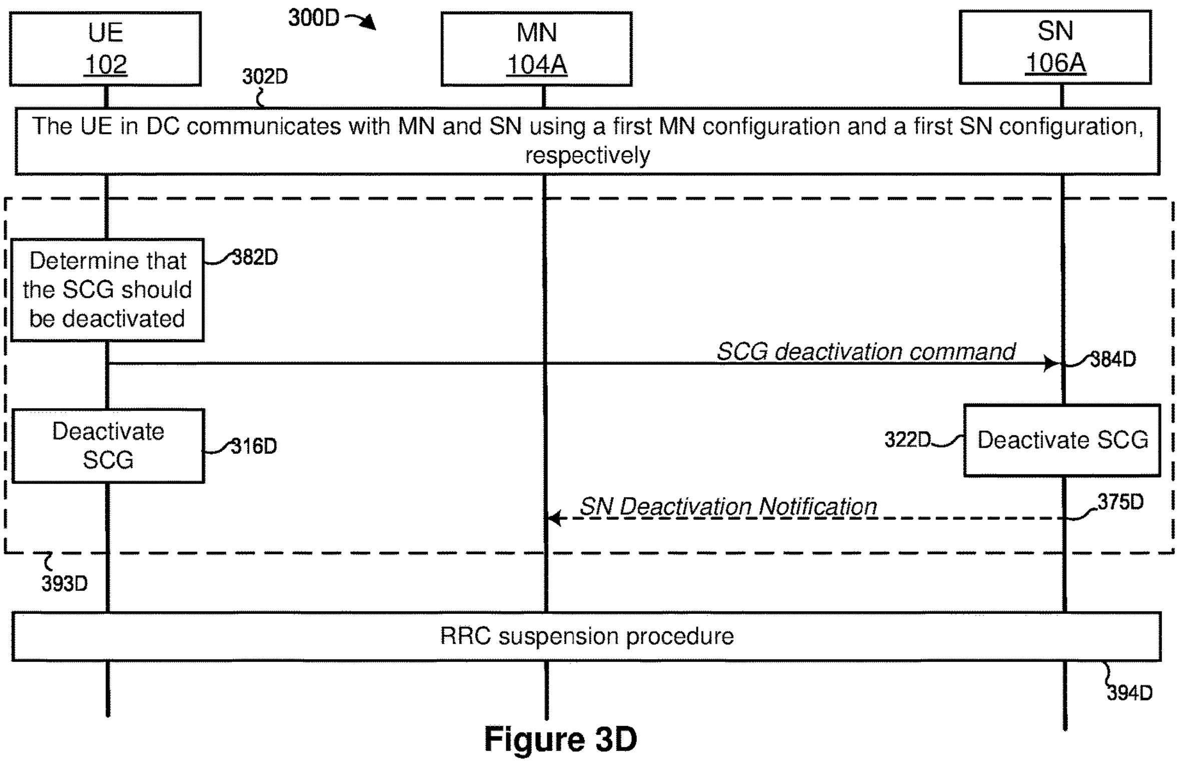
FIG. 3D is an example message sequence in which the UE sends a notification to the SN to deactivate the SCG before initiating the suspension procedure in FIG. 3A.

Referring next to FIG. 3D, a scenario 300D is generally similar to the scenarios 300A-C, but with the UE 102 determining it should deactivate the SCG. With the exception of the differences shown in FIG. 3D and the differences described below, any of the alternative implementations discussed above with respect to the scenarios 300A-C (e.g., for messaging and processing) may apply to the scenario 300D.

The UE 102 in DC determines 382D that the UE 102 should deactivate the SCG. For example, the UE 102 can determine 382D that the UE 102 should deactivate the SCG based on a power level or thermal level at the UE, or based on whether the UE 102 has data to transmit via the SCG or expects to receive data via the SCG. In response to the determination, the UE 102 transmits 384D an SCG deactivation command to the SN 106A on an SRB (e.g., SRB3) that the MN 104A or SN 106A configures to exchange RRC messages between the UE 102 and the SN 106A. Alternatively, the UE 102 transmits the SCG deactivation command to the SN 106A via the MN 104A. The SN 106A deactivates 322D the SCG in response to the SCG deactivation command. The SN 106A may send 375D to the MN 104A an SN message (e.g., SN Modification Required message, SN Deactivation Notification message, or an X2 or Xn interface message) indicating the SCG is deactivated. The events 382D, 384D, 316D, 322D, and 375D are collectively referred to in FIG. 3D as an SCG deactivation procedure 393D.

In some implementations, the UE 102 can send 384D to the SN 106A a MAC CE to deactivate the SCG instead of the SCG deactivation command message. In such implementations, the SN 106A in one implementation may not transmit a MAC CE to the UE 102 in response to the MAC CE that the SN 106A receives at event 384D. In another implementation, the SN 106A transmits another MAC CE to the UE 102 in response to the MAC CE that the SN 106A receives at event 384D. It is often faster to deactivate the SCG using a MAC CE, rather than the RRC reconfiguration message, because of fewer protocol layers involved.

After the SCG deactivation procedure 393D or receiving 375D the SN Deactivation Notification message, the MN 104A can perform 394D an RRC suspension procedure with the UE 102, similar to the RRC suspension procedure 394A.

Figure 3E:
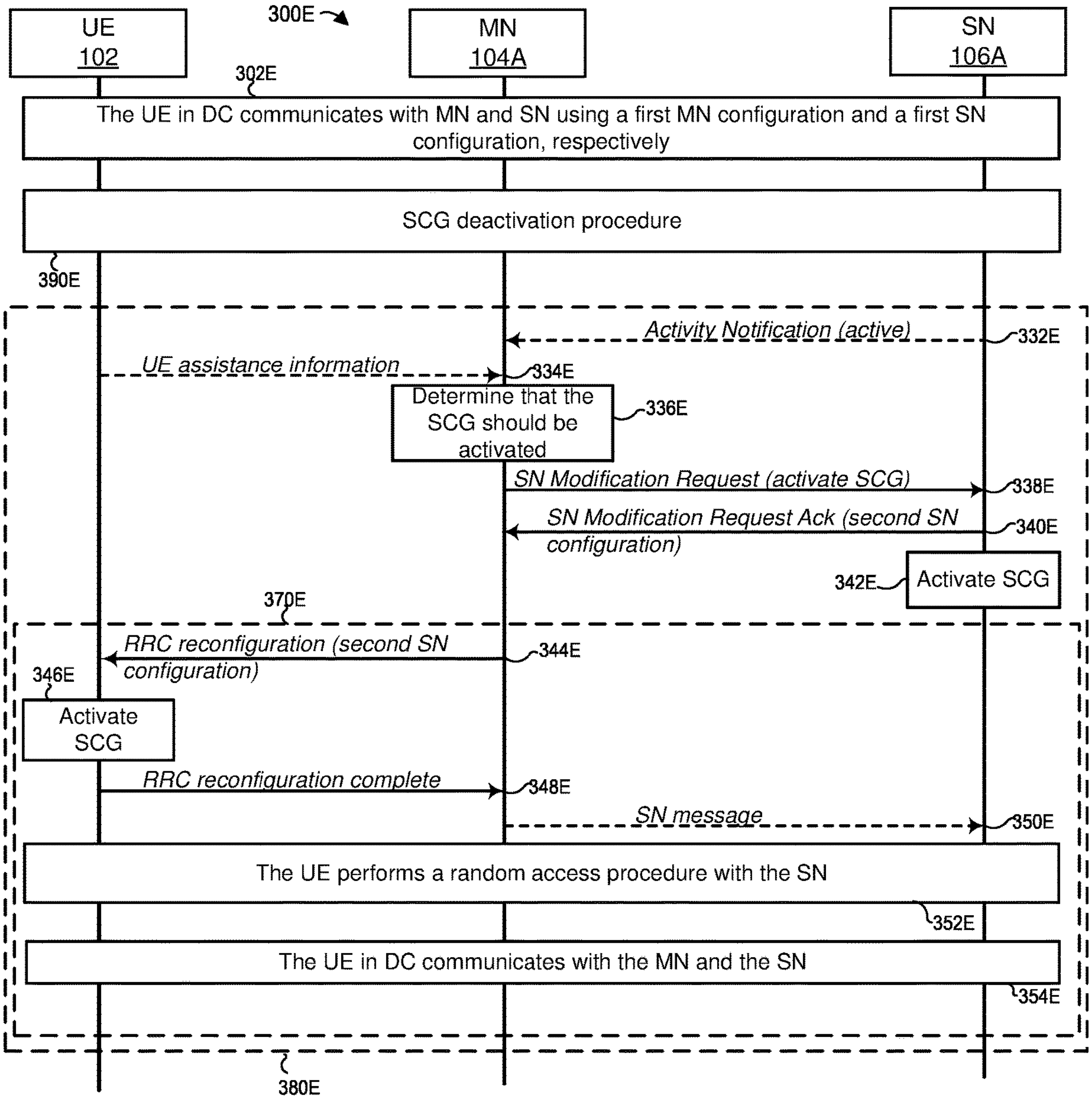
FIG. 3E is an example message sequence in which the MN, following the deactivation of the SCG, determines that the SCG should be reactivated and notifies the UE regarding the SCG reactivation.

Referring next to FIG. 3E, a scenario 300E is generally similar to the scenarios 300A-D, but with the MN 104A determining that the SCG should be re-activated rather than configuring the UE 102 to enter the inactive state per RRC suspension procedures 394A-D. With the exception of the differences shown in FIG. 3E and the differences described below, any of the alternative implementations discussed above with respect to the scenarios 300A-D (e.g., for messaging and processing) may apply to the scenario 300E.

While the UE 102 is in DC with the MN 104A and 106A at event 302E, the UE 102 can perform 390E an SCG deactivation procedure, similar to the SCG deactivation procedure 390A, 391B, 392C or 393D. After deactivating the SCG in the SCG deactivation procedure 390E, the MN 104A can determine 336E to re-activate the SCG for communication with the UE 102. In some implementations, the MN 104A can detect data activity on the SCG for the UE 102 and, in response, determine 336E to activate the SCG for the UE 102. For example, the MN 104A determines that data activity exists for the UE 102 based on a message for the UE 102 that the MN 104A receives from the SN 106A. As a more specific example, the SN 106A may detect data activity for the UE 102, and in response send 332E an Activity Notification message with an active indication for the UE 102 to the MN 104A. The MN 104A can then detect data activity for the UE 102 based on the received Activity Notification message. In some implementations, the SN 106A may detect data activity for the UE 102 upon receiving data packets addressed to the UE 102 from CN 110. In yet other implementations, the MN 104A makes the determination 336E in response to receiving a sufficiently large volume of data for the UE 102 from the CN 110 or the SN 106A. For example, if data volume the MN 104A receives from the CN 110 or SN 106A is above a certain preconfigured, predetermined, dynamic, or static threshold, the MN 104A determines the data volume is sufficiently large volume. In yet other implementations, the MN 104A makes the determination 336E in response to receiving data associated with a specific QoS (flow) or a particular PDU Session for the UE 102 from the CN 110 or the SN 106A.

In other implementations, the MN 104A receives data packets that the MN 104A will send to the UE 102 via the SN 106A, so that the MN 104A may determine to activate the SCG in response to receiving the data packets. The MN 104A can transmit the data packets to the UE 102 via the MCG. In yet other implementations, the MN 104A receives data packets for the UE 102 from the SN 106A, which causes the MN 104A to determine to activate the SCG. The MN 104A can transmit the data packets to the UE 102 via the MCG.

In yet other implementations, the MN 104A determines to activate the SCG for the UE 102 based on a UE preference that the MN 104A receives from the UE 102. For example, the UE 102 sends 334E UE assistance information (e.g., UEAssistanceInformation message) indicating the UE 102 (temporarily) prefers dual connectivity or has data to transmit on the SCG. The MN 104A determines 336E to activate the SCG for the UE 102 in response to the UE assistance information received at event 334E.

In yet other implementations, the MN 104A determines to activate the SCG for the UE 102 based on one or more measurement results received from the UE. If measurement result(s) for cell 126A are above a first threshold and/or measurement result(s) for cell 125A are below a second threshold, the MN 104A can determine to activate the SCG for the UE 102. Alternatively, the MN 104A refrains from activating the SCG even though measurement result(s) for cell 126A are above a first threshold and/or measurement result(s) for cell 125A (i.e., the current PSCell) are below a second threshold.

In response to the determination 336E, the MN 104A sends 338E to the SN 106A an SN Modification Request message which activates the SCG for the UE 102. In response to 338E the SN Modification Request message, the SN 106A sends 340E an SN Modification Request Acknowledge message to the MN 104A and activates 342E the SCG. In some implementations, the SN 106A can include a second SN configuration in the 340E SN Modification Request Acknowledge message. In one implementation, the SN 106A includes, in the second SN configuration, random access configuration(s) for the UE 102 to perform a random access procedure with the SN 106A. In another implementation, using the second SN configuration, the SN 106A instructs the UE 102 to not perform a random access procedure if the corresponding time alignment timer is still running (i.e., the corresponding time alignment timer has not expired yet). In other implementations, the SN 106A does not include an SN configuration in the SN Modification Request Acknowledge message the SN transmits 340E.

In some implementations, the SN 106A includes a CU (e.g., CU 172) and a DU (e.g., DU 174). If the DU has suspended lower layers for the UE 102 as described for FIG. 3A, the CU can send to the DU a UE Context Request message (e.g., a UE Context Modification Request message) including an instruction to resume lower layers for the UE 102 after or in response to activating 342E the SCG, receiving 338E the SN Modification Request message activating the SCG, or transmitting 340E the SN Modification Request Acknowledge message. In response to the UE Context Request message, the DU resumes the lower layers for communication with the UE 102 and sends a UE Context Response message (e.g., a UE Context Modification Response message) to the CU. In some implementations, the UE Context Request message resuming the lower layers and the UE Context Request message suspending the lower layers include the same interface ID(s) (e.g., F1AP ID(s)) assigned by the CU and/or DU. For example, the interface ID(s) include a CU F1AP ID assigned by the CU and/or include a DU F1AP ID assigned by the DU.

If the DU has released lower layers for the UE 102 as discussed with reference FIG. 3A, the CU can send to the DU a UE Context Request message (e.g., a UE Context Setup Request message) to (re-)establish lower layers for the UE 102 after or in response to activating 342E the SCG, receiving 338E the SN Modification Request message activating the SCG, or transmitting 340E the SN Modification Request Acknowledge message. In response to the UE Context Request message, the DU can (re-)establish lower layers for communicating with the UE 102 and send a UE Context Response message (e.g., a UE Context Setup Response message) to the CU. The UE Context Request message (re-)establishing the lower layers and the UE Context Request message suspending the lower layers can include the same or different interface ID(s) (e.g., F1AP ID(s)) assigned by the CU and/or DU. For example, the interface ID(s) include a CU F1AP ID assigned by the CU and/or include a DU F1AP ID assigned by the DU.

In some implementations, the MN 104A does not include an instruction to activate the SCG in the SN Modification Request message of event 338E. In other implementations, the MN 104A generates an instruction to activate the SCG and includes the indication in the SN Modification Request message of event 338E. In yet other implementations, the MN 104A generates an instruction to resume lower layers and includes the indication in the SN Modification Request message of event 338E. The MN 104A may include or omit an indication activating the SCG in the SN Modification Request message of event 338E.

In response to the determination 336E, and after the MN 104A transmits 338E the SN Modification Request message, or after the MN 104A receives 340E the SN Modification Request Acknowledge message, the MN 104A transmits 344E an RRC reconfiguration message to cause the UE 102 to activate the SCG. In response to the RRC reconfiguration message, the UE 102 activates 346E the SCG for communication with the SN 106A and transmits 348E an RRC reconfiguration complete message to the MN 104A. After receiving 348E the RRC reconfiguration complete message, the MN 104A can send 350E an SN message (e.g., SN Reconfiguration Complete message or SN Modification Confirm message) to the SN 106A to indicate that the UE 102 has activated the SCG.

In some implementations, the MN 104A can include an indication to activate the SCG in the RRC reconfiguration message the MN 104A transmits. In other implementations, the MN 104A does not include an instruction to activate the SCG in the RRC reconfiguration message the MN 104A transmits 344E because the instruction is inherent to the message.

In some implementations, the UE 102 includes, in the RRC reconfiguration complete message the UE 102 transmits 348E, a second RRC reconfiguration complete message responding to receiving the second SN configuration. The MN 104A can include the second RRC reconfiguration complete message in the SN Reconfiguration Complete message so that the SN 106A can receive the second RRC reconfiguration complete message. If the SN 106A is a gNB, the second RRC reconfiguration complete message is an RRCReconfigurationComplete message. If the SN 106A is an ng-eNB, the second RRC reconfiguration complete message is an RRCConnectionReconfigurationComplete message.

After receiving 344E the RRC reconfiguration message or in response to the 344E the RRC reconfiguration message, the UE 102 can perform 352E a random access procedure on cell 126A with the SN 106A to activate the SCG with the SN 106A. In some implementations, the UE 102 performs the random access procedure using one or more random access configurations in the second SN configuration the UE receives 344E. In other implementations, the UE 102 performs 352E the random access procedure using one or more random access configurations that the UE 102 received from the SN 106A before activating or deactivating the SCG.

After the UE 102 successfully completes 352E the random access procedure on the cell 126A with the SN 106A, the UE 102 can communicate 354E data (user-plane data and/or control-plane data) in DC with both the MN 104A and the SN 106A through the cell 124A and cell 126A respectively. Having identified the UE 102 in the random access procedure, the SN 106A can communicate 354E data (user-plane data or control-plane data) with the UE 102 in accordance with configuration parameters in the first SN configuration, additional SN configuration, and/or second SN configuration. If the RRC reconfiguration message indicates the UE 102 should not perform a random access procedure, the UE 102 skips event 352E and communicates 354E data (user-plane data and/or control-plane data) in DC with both the MN 104A and the SN 106A through the cell 124A and cell 126A respectively. In some implementations, the SN 106A can include an uplink configuration in the second SN configuration and the UE 102 can send a transmission to the SN 106A via the cell 126A in accordance with the uplink configuration. For example, the SN 106A can configure an uplink grant in the uplink configuration and the UE 102 can transmit a PUSCH transmission via the cell 126A to the SN 106A in accordance with the uplink grant.

In some implementations, the UE 102 transmits to the SN 106A a scheduling request (SR), SRS and/or CSI on the cell 126A to the SN 106A while communicating 354E in DC with the MN 104A and SN 106A. In other implementations, the SN 106A can send downlink assignments and/or uplink grants on PDCCH(s) to the UE 102 while communicating 354E in DC with the MN 104A and SN 106A. The UE 102 receives PDSCH transmissions from the SN 106A and/or transmits PUCCH transmissions to the SN 106A via the cell 126A in accordance with the downlink assignments and/or the uplink grants.

In some implementations, the SN 106A can include new configuration parameters for the SCG in the second SN configuration. The UE 102 uses the new configuration parameters to communicate 354E data (user-plane data and/or control-plane data) with the SN 106A after activating the SCG. For example, the new configuration parameters can change PSCell, modify the current PSCell or an SCell, release a SCell, or add a new SCell. In another example, the new configuration parameters can include configuration parameters for operation of PHY 202A/202B, MAC 204A/204B or RLC 206A/206B. In other implementations, the SN 106A can indicate, in the second SN configuration, to release configuration parameter(s) included in the first SN configuration or additional SN configuration. Thus, the UE 102 releases the configuration parameter(s) and does not use the released configuration parameter(s) to communicate 354E user-plane data and/or control-plane data with the SN 106A after activating the SCG. If the RRC reconfiguration message that the UE 102 receives 344E does not include an SN configuration, the UE 102 communicates 354E data with the SN 106A using configuration parameters in the first SN configuration or second SN configuration.

The events 332E, 334E, 336E, 338E, 340E, 342E, 344E, 346E, 348E, 350E, 352E, and 354E are collectively referred to in FIG. 3E as an SCG activation procedure 380E. The events 344E, 346E, 348E, 350E, 352E, and 354E are collectively referred to in FIG. 3E as an SCG activation procedure 370E.

The random access procedure can be a four-step random access procedure or a two-step random access procedure, for example. In different implementations and/or scenarios, the random access procedure may be a contention-based random access procedure or a contention-free random access procedure. In some implementations and/or scenarios, the UE 102 may include a UE identifier known by the SN 106A in a "message 3" of a four-step random access procedure, or in a message A of the two-step random access procedure, so that the SN 106A can identify the UE 102 using the UE identifier. In some implementations, the UE identifier is a radio network temporary identifier (RNTI) (e.g., a C-RNTI) allocated by the SN 106A in the first SN configuration, additional SN configuration, or second SN configuration. In other implementations, the SN 106A identifies the UE 102 based on a dedicated random access preamble that the SN 106A receives from the UE 102 during the random access procedure. The SN 106A can allocate the dedicated random access preamble in the second SN configuration.

In some implementations, the SN 106A activates 342E the SCG after or upon performing 352E the random access procedure with the UE 102. For example, the SN 106A can activate 342E the SCG in response to connecting to the UE 102 during the random access procedure. The SN 106A can determine that the UE 102 connects with the SN 106A in response to identifying the UE 102 during the random access procedure (e.g., based on a UE identifier or a dedicated random access preamble that the SN 106A receives from the UE 102 during the random access procedure). In the case that the random access procedure is skipped, the SN 106A in other implementations can determine that the UE 102 connects with the SN 106A if the SN 106A receives the PUSCH transmission(s), SR, SRS, or CSI from the UE 102.

In some implementations, the SN 106A resumes the lower layers for communication with the UE 102 after activating the SCG. After resuming the lower layers, the SN 106A in one implementation transmits downlink transmissions to the UE 102 using the lower layers. After resuming the lower layers, the SN 106A in another implementation receives uplinks transmissions from the UE 102 using the lower layers. Similarly, the UE 102 in some implementations resumes the lower layers for communication with the SN 106A after activating the SCG. After resuming the lower layers, the UE 102 in one implementation transmits uplink transmissions to the SN 106A by the lower layers. After resuming the lower layers, the UE 102 in another implementation receives downlink transmissions, which can be similar to those discussed above, from the SN 106A using the lower layers In some implementations, the SN 106A resets (or re-establishes) at least one lower layer after deactivating the SCG in the SCG deactivation procedure 390E or activating 342E the SCG. Upon resetting the PHY 202A/202B or MAC 204A/204B, the SN 106A can set NDI value(s), associated to HARQ process(es) in the PHY 202A/202B or MAC 204A/204B that the SN 106A used to communicate with the UE 102, to initial values. For example, if SN 106A used the HARQ process(es) to receive transmissions from the UE 102, the SN 106A sets the NDI value(s) to an initial value upon resetting the PHY 202A/202B or MAC 204A/204B. In another example, if SN 106A used the HARQ process(es) to transmit transmissions to the UE 102, the SN 106A sets the NDI value(s) to an initial value of 0 or 1 upon resetting the PHY 202A/202B or MAC 204A/204B. Upon resetting the PHY 202A/202B or MAC 204A/204B, the SN 106A can reset beam failure instance indication counter(s) (e.g., set the counter(s) to initial value(s) such as 0 or a static value), and/or reset listen-before-talk (LBT) counter(s) (e.g., set the counter(s) to initial value(s) such as 0 or a static value). Upon re-establishing RLC 206A/206B, the SN 106A sets RLC variables in the RLC 206A/206B to initial values (e.g., 0 or a static value).

Similarly, the UE 102 can reset (or re-establish) at least one lower layer after deactivating the SCG during the SCG deactivation procedure 390E or activating 342E the SCG. Upon resetting the PHY 202A/202B or MAC 204A/204B, the UE 102 sets NDI value(s) associated to HARQ process(es) in the PHY 202A/202B or MAC 204A/204B that the UE 102 used to communicate with the SN 106A to initial values. For example, if UE 102 used the HARQ process(es) to transmit transmissions to the SN 106A, the UE 102 sets the NDI value(s) to an initial value of 0 upon resetting the PHY 202A/202B or MAC 204A/204B. In another example, if UE 102 used the HARQ process(es) to receive transmissions from the SN 106A, the UE 102 flushes soft buffers for the HARQ process(es), and/or considers the next received transmission for a transport block as the very first transmission after activating the SCG, upon resetting the PHY 202A/202B or MAC 204A/204B. Upon resetting the PHY 202A/202B or MAC 204A/204B, the UE 102 can reset beam failure instance indication counter(s) (e.g., set the counter(s) to initial value(s) such as 0 or a static value), and/or reset listen-before-talk (LBT) counter(s) (e.g., set the counter(s) to initial value(s) such as 0 or a static value). Upon resetting MAC 204A/204B, the UE 102 can initialize the appropriate variable for logical channel(s) to zero for logical channel prioritization. Upon re-establishing RLC 206A/206B, the UE 102 sets RLC variables in the RLC 206A/206B to initial values (e.g., 0 or a static value), as specified in 3GPP TS 36.322 or 3GPP TS 38.322.

In other implementations, the SN 106A retains operating information in at least one lower layer for communication with the UE 102 after deactivating the SCG in the SCG deactivation procedure 390E. After activating 342E the SCG, the SN 106A can continue using the operating information in the at least one lower layer to communicate with the UE 102. For example, the operating information includes NDI values associated to HARQ processes in the PHY 202A/202B or MAC 204A/204B and/or RLC variables (i.e., values of the variables) in RLC 206A/206B that the SN 106A used to communicate with the UE 102. After deactivating the SCG in the SCG deactivation procedure 390E, the SN 106A can retain the NDI values and/or the RLC variables in RLC 206A/206B. The RLC variables can conform to 3GPP TS 36.322 or 3GPP TS 38.322.

Similarly, the UE 102 retains operating information in at least one lower layer for communication with the SN 106A after deactivating the SCG or suspending the lower layers in the SCG deactivation procedure 390E. After activating 346E the SCG, the UE 102 can continue using the operating information in the at least one lower layer to communicate with the SN 106A. For example, the operating information includes NDI values associated to HARQ processes in the PHY 202A/202B or MAC 204A/204B and/or RLC variables (i.e., values of the variables) in RLC 206A/206B that the UE 102 used to communicate with the SN 106A. After deactivating the SCG in the SCG deactivation procedure 390E, the UE 102 can retain the NDI values and/or the RLC variables in RLC 206A/206B.

In some implementations, the SN 106A suspends PDCP 208/210 and/or SDAP 212 for communication with the UE 102 after deactivating the SCG in the SCG deactivation procedure 390E. Similarly, the UE 102 suspends PDCP 208/210 and/or SDAP 212 for communication with the SN 106A after deactivating the SCG in the SCG deactivation procedure 390E. In other implementations the SN 106A does not suspend PDCP 208/210 or SDAP 212 after deactivating the SCG in the SCG deactivation procedure 390E. Similarly, the UE 102 does not suspend PDCP 208/210 or SDAP 212 for communication with the SN 106A after deactivating the SCG in the SCG deactivation procedure 390E.

In some implementations, the SN 106A re-establishes (or resets) PDCP 208/210 or SDAP 212 after deactivating the SCG in the SCG deactivation procedure 390E or activating 342E the SCG. In other implementations, the SN 106A refrains from re-establishing (or resetting) PDCP 208/210 or SDAP 212 after deactivating the SCG in the SCG deactivation procedure 390E or activating 342E the SCG. In some implementations, the SN 106A sets PDCP variables TX_NEXT, RX_NEXT and/or RX_DELIV to initial values (e.g., 0 or a default or static value) after deactivating the SCG in the SCG deactivation procedure 390E or activating 342E the SCG. Similarly, the UE 102 sets PDCP variables TX_NEXT, RX_NEXT and/or RX_DELIV to initial values (e.g., 0 or a default or static value) after deactivating the SCG in the SCG deactivation procedure 390E or activating

346E the SCG. In some implementations, the SN 106A resets header compression protocol/context or data compression protocol/context after deactivating the SCG in the SCG deactivation procedure 390E or activating 342E the SCG. Similarly, the UE 102 resets header compression protocol/context or data compression protocol/context after deactivating the SCG in the SCG deactivation procedure 390E or activating 346E the SCG.

In other implementations, the SN 106A retains operating information in PDCP 208/210 or SDAP 212 for communication with the UE 102 after deactivating 322A the SCG. After activating 342E the SCG, the SN 106A can continue using the operating information to communicate with the UE 102. Similarly, the UE 102 retains operating information in PDCP 208/210 or SDAP 212 for communication with the SN 106A after deactivating 316A the SCG. After activating 346E the SCG, the UE 102 can continue using the operating information to communicate with the SN 106A. In some implementations, the operating information may include (values of) PDCP variables and/or quality of service (QoS) flow information. For example, the PDCP variables includes TX_NEXT, RX_NEXT and/or RX_DELIV specified in 3GPP specification 38.323. In another example, the QoS flow information includes an identity/identifier of a QoS flow, QoS flow to DRB mapping rule, and/or service data flow (SDF) to QoS flow mapping rule. In other implementations, the operating information may include header compression protocol/context or data compression protocol/context.

In some implementations, the SN 106A stops and/or resets a reordering timer (e.g., t-Reordering) upon deactivating the SCG in the SCG deactivation procedure 390E. The SN 106A can deliver all stored PDCP SDUs to an upper layer (e.g., SDAP) or CN 110 in ascending order of associated COUNT values after performing header decompression. Similarly, the UE 102 stops and/or resets a reordering timer (e.g., t-Reordering) upon deactivating the SCG in the SCG deactivation procedure 390E. The SN 106A can deliver all stored PDCP SDUs to an upper layer (e.g., SDAP) or CN 110 in ascending order of associated COUNT values after performing header decompression.

The operating information in a protocol layer (e.g., PHY 202A/202B, MAC 204A/204B, RLC 206A/206B, PDCP 208/210 or SDAP 212) may or may not include configuration parameter(s) for operating the protocol layer in the first SN configuration or additional SN configuration.

In some implementations, the SN 106A releases one or more configuration parameters in the first SN configuration after or in response to an event in the SCG deactivation procedure 390E (e.g., receiving the SN Modification Request message 310A or the SN message 320A, transmitting the SN Modification Request Acknowledge message 312A or deactivating 322A the SCG as described in FIG. 3A). Thus, the SN 106A can allocate radio resources configured in the configuration parameter(s) to other UE(s) after releasing the configuration parameter(s). Similarly, the UE 102 releases the configuration parameter(s) after or in response to an event in the SCG deactivation procedure 390E (e.g., receiving the RRC reconfiguration message 314A, deactivating 316A the SCG or transmitting the RRC reconfiguration complete message 318A). In one implementation, the configuration parameter(s) can include field(s) or IE(s) indicating maximum uplink power that the UE 102 can use to transmit to the SN 106A. The UE 102 limits the uplink transmissions toward the SN 106A to not exceed the maximum uplink power indicated by the field(s) or IE(s). For example, the field(s) can include p-NR-FR1 configuring a maximum total transmit power that the UE 102 can use in frequency range 1 (FR1) across all serving cells (i.e., PSCell and SCell(s)) of the SN 106A. In another example, the field(s) can include p-NR-FR2 configuring a maximum total transmit power that the UE 102 can use in frequency range 2 (FR2) across all serving cells (i.e., PSCell and SCell(s)) of the SN 106A. In yet another example, the field(s) or IE(s) can include PUCCH or channel state information (CSI) resources configuration (e.g., pucch-CSI-ResourceList or PUCCH-CSI-Resource), scheduling request resource configuration (e.g., SchedulingRequestResourceConfig), and/or sounding reference signal (SRS) resources (e.g., SRS-Resources). In yet another example, the field(s) or IE(s) include parameters within a ReconfigurationWithSync IE, except a spCellConfigCommon field in the ReconfigurationWithSync IE. In yet another example, the configuration parameter can be a parameter indicating a time division multiplexing pattern, such as a tdm-PatternConfig-r15 field or a tdm-PatternConfig-r16 field in scenarios involving NE-DC or NR-DC.

In other implementations, the SN 106A retains one or more configuration parameters in the first SN configuration after or in response to an event in the SCG deactivation procedure 390E (e.g., receiving the SN Modification Request message 310A or the SN message 320A, transmitting the SN Modification Request Acknowledge message 312A or deactivating the SCG 322A as described in FIG. 3A). Similarly, the UE 102 retains the configuration parameter(s) after or in response to an event in the SCG deactivation procedure 390E (e.g., after or in response to receiving the RRC reconfiguration message 314A, deactivating 316A the SCG or transmitting the RRC reconfiguration complete message 318A). At a later time, the SN 106A and UE 102 can use the retained configuration parameter(s) to communicate with each other after activating the SCG as described for FIGS. 3E-4C. The configuration parameter(s) include multiple configuration parameters, PHY configuration(s), MAC configuration(s), RLC configuration(s), measurement configuration(s), and/or radio bearer configuration(s) described below. For example, the configuration parameter(s) can include at least one radio network temporary identifier (RNTI). The at least one RNTI includes a C-RNTI, configured scheduling RNTI (CS-RNTI), and/or modulation and coding scheme (MCS) RNTI, transmit power control (TPC) RNTI(s) for SRS, PUCCH and/or PUSCH, semi-persistent CSI RNTI, and/or a power saving RNTI. In another example, the configuration parameter(s) include the field(s) or IE(s) indicating maximum uplink power that the UE 102 can use to transmit to the SN 106A as described above. In yet another example, the configuration parameter(s) excludes the field(s) or IE(s) indicating the maximum uplink power that the UE 102 can use to transmit to the SN as described above.

In some implementations, the MN 104A releases one or more configuration parameters in the first MN configuration after or in response to an event in the SCG deactivation procedure 390E (e.g., determining 308A that the SCG should be deactivated, transmitting the SN Modification Request message 310A, RRC reconfiguration message 314A or SN message 320A, or receiving the SN Modification Request Acknowledge message 312A, RRC reconfiguration message 318A as described in FIG. 3A). Similarly, the UE 102 releases the configuration parameter(s) in the first MN configuration after or in response to an event in the SCG deactivation procedure 390E (e.g., receiving the RRC reconfiguration complete message 314A, deactivating 316A the SCG or transmitting 318A the RRC reconfiguration complete message as described in FIG. 3A). For example, the configuration parameter(s) indicates maximum uplink power that the UE 102 can use to transmit to the MN 104A and/or the SN 106A. The UE 102 limits the uplink transmissions toward the MN 104A or the SN 106A to not exceed the maximum uplink power indicated by the configuration parameter. In scenarios involving EUTRA/NR DC (EN-DC) or NG-RAN EUTRA/NR DC (NGEN-DC), the configuration parameter can be a p-MaxEUTRA field with a P-Max value. As another example, one of the configuration parameters may indicate a maximum uplink power that the UE 102 can use to transmit to the MN 104A and SN 106A across serving cells across all cell groups (e.g., across both the master cell group and the secondary cell group) for specific frequency range(s). The UE 102 restricts the uplink transmissions toward the MN 104A and the SN 106A across serving cells and across all cell groups for the specific frequency range(s) to not exceed the maximum uplink power indicated by the configuration parameter. In scenarios involving EN-DC or NGEN-DC, the configuration parameter can be a p-Max UE-FR1 field with a P-Max value. As a further example, one of the configuration parameters may indicate time instances in which the UE in MR-DC is allowed to transmit to the MN 104A or the SN 106A. The UE 102 restricts uplink transmissions toward the MN 104A or the SN 106A in accordance with the indicated time instances. For example, the configuration parameter can be a parameter indicating a time division multiplexing (TDM) pattern, such as a tdm-PattemConfig-r15 field or a tdm-PattemConfig-r16 field in scenarios involving EN-DC or NGEN-DC. Before releasing the parameter indicating the TDM pattern, the MN 104A communicates with the UE 102 according to the TDM pattern. After releasing the configuration parameter(s), the MN 104A communicates with the UE 102 without using the configuration parameter(s). Similarly, the UE 102 communicates with the MN 104A according to the configuration parameter(s) before releasing the configuration parameter(s). After releasing the configuration parameter(s), the UE 102 communicates with the MN 104A without using the configuration parameter(s).

In some implementations, the MN 104A retains one or more configuration parameters in the first MN configuration and suspends using the retained configuration parameter(s), after or in response to an event in the SCG deactivation procedure 390E (e.g., determining 308A that the SCG should be deactivated, transmitting the SN Modification Request message 310A, RRC reconfiguration message 314A or SN message 320A, or receiving the SN Modification Request Acknowledge message 312A, RRC reconfiguration message 318A as described in FIG. 3A). Similarly, the UE 102 retains the configuration parameter(s) in the first MN configuration after or in response to an event in the SCG deactivation procedure 390E (e.g., receiving the RRC reconfiguration complete message 314A, deactivating 316A the SCG or transmitting 318A the RRC reconfiguration complete message as described in FIG. 3A). At a later time, the MN 104A and UE 102 can use the retained configuration parameter(s) to communicate with each other after activating the SCG or entering the connected state as described for FIGS. 3E-4C. The configuration parameter(s) include multiple configuration parameters, PHY configuration(s), MAC configuration(s), RLC configuration(s), measurement configuration(s) and/or radio bearer configuration(s) described below. For example, the configuration parameter(s) can include at least one radio network temporary identifier (RNTI). The at least one RNTI includes a cell RNTI (C-RNTI), configured scheduling RNTI (CS-RNTI), and/or modulation and coding scheme (MCS) RNTI, transmit power control (TPC) RNTI(s) for SRS, PUCCH and/or PUSCH, semi-persistent CSI RNTI, and/or a power saving RNTI. In another example, the configuration parameter(s) include the parameter(s) indicating maximum uplink power that the UE 102 can use to transmit to the MN 104A and/or SN 106A as described above, and/or the parameter indicating a time division multiplexing pattern. In yet another example, the configuration parameter(s) excludes the parameter(s) indicating the maximum uplink power that the UE 102 can use to transmit to the MN 104A and/or SN 106A as described above, and/or the parameter indicating a time division multiplexing pattern.

The MN 104A and the SN 106A can include the at least one interface ID of the UE 102, as discussed above, in the messages transmitted between the MN 104A and the SN 106A. For example, the MN 104A can include the interface ID(s) in the SN Modification Request messages the MN 104A transmits at events 310A and 338E, in the SN message the MN 104A transmits at event 326A, in the SN Modification Required message the SN 106A transmits at events 309B and 309C, in the SN Modification Confirm message the MN 104A transmits at events 311B and 311C, in the SN Deactivation Notification message the SN 106A transmits at event 375D and/or in the SN message the MN 104A transmits at event 350E. The SN 106A can include the interface ID(s) in the SN Modification Request Acknowledge messages the SN 106A transmits at events 312A and 340E.

In some implementations, the MN 104A includes a third MN configuration in the RRC reconfiguration message the MN 104A transmits 344E, in which case, the UE 102 communicates with the MN 104A using the third MN configuration. In some implementations, the MN 104A generates the third MN configuration as a delta MN configuration which augments only a portion of the first MN configuration and/or the second MN configuration (if transmitted to the UE 102). Accordingly, the UE 102 communicates 354E with the MN 104A using the delta MN configuration and the portion of the first MN configuration and/or the second MN configuration that is not augmented by the delta MN configuration. In other implementations, the MN 104A does not include a third MN configuration in the RRC reconfiguration message the MN 104A transmits 344E. Example implementations of the third MN configuration are similar to the first and second MN configurations described for FIG. 3A.

Example implementations of the second SN configuration are similar to the first SN configuration and/or additional SN configuration. In some implementations, the SN 106A can configure the same or different serving cell(s) (i.e., PSCell and/or zero, one, or more SCells) in the second SN configuration as the first SN configuration or the additional SN configuration. In some implementations, the second SN configuration can be a complete and self-contained configuration (i.e. a full SN configuration). The UE 102 can use the full SN configuration to communicate with the SN 106A without relying on the first SN configuration and/or the additional SN configuration. In other implementations, the SN 106A generates the second SN configuration as a delta SN configuration which augments only a portion of the first SN configuration and/or the additional SN configuration. Accordingly, the UE 102 communicates 354E with the SN 106A using the delta SN configuration and the portion of the first SN configuration and/or the additional SN configuration that is/are not augmented by the delta SN configuration. In yet other implementations, the SN 106A includes only the random access configuration(s) in the second SN configuration so that the UE 102 communicates 354E with the SN 106A using the first SN configuration and/or additional SN configuration.

If the MN 104A is a gNB, the RRC reconfiguration message and the RRC reconfiguration complete message are an RRCReconfiguration message and an RRCReconfigurationComplete message, respectively. If the MN 104A is an eNB or ng-eNB, the RRC reconfiguration message and the RRC reconfiguration complete message are an RRCConnectionReconfiguration message and an RRCConnectionReconfigurationComplete message, respectively.

Figure 4A:
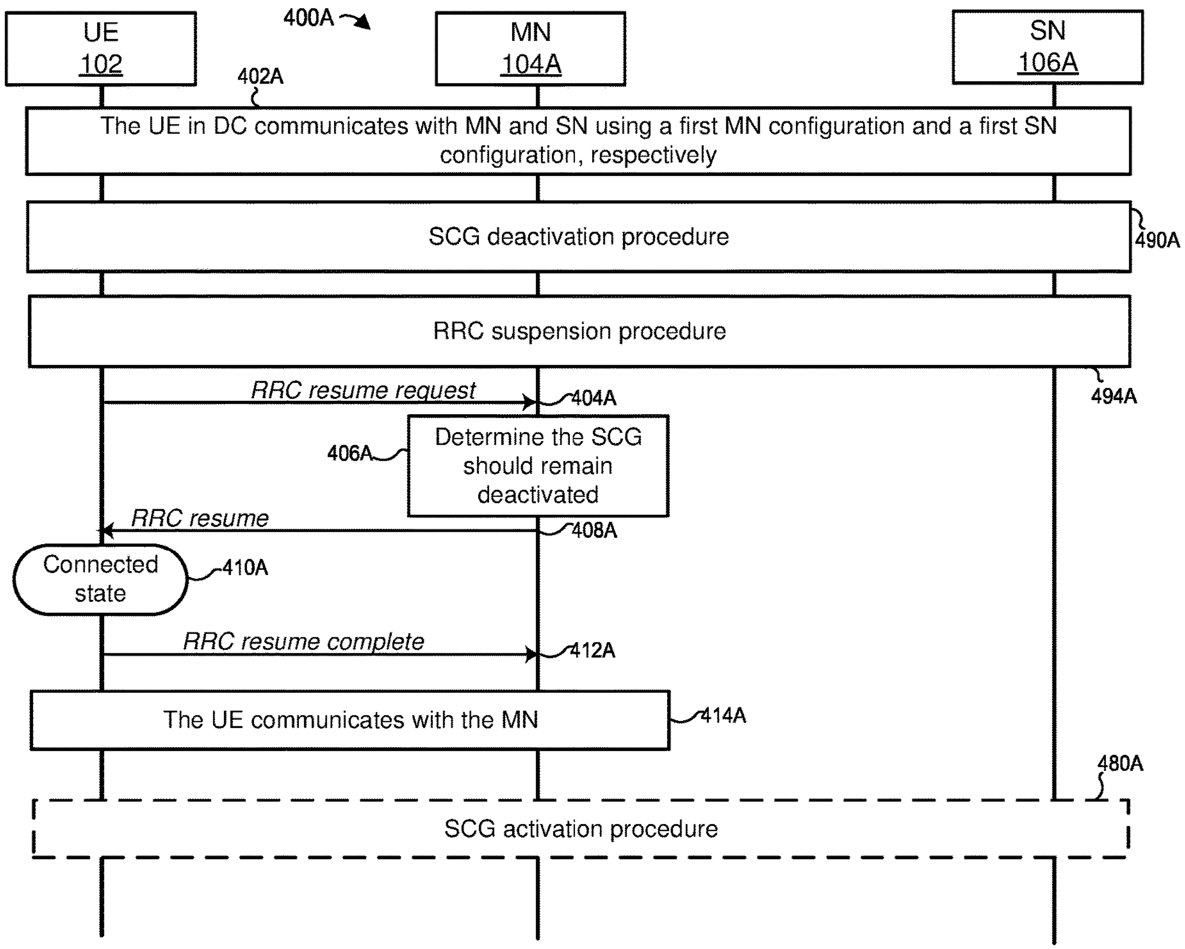
FIG. 4A is an example message sequence in which the MN, after the UE transitions to the inactive state, instructs the UE to transition to a connected state, but determines the SCG should not be reactivated.
Figure 4B:
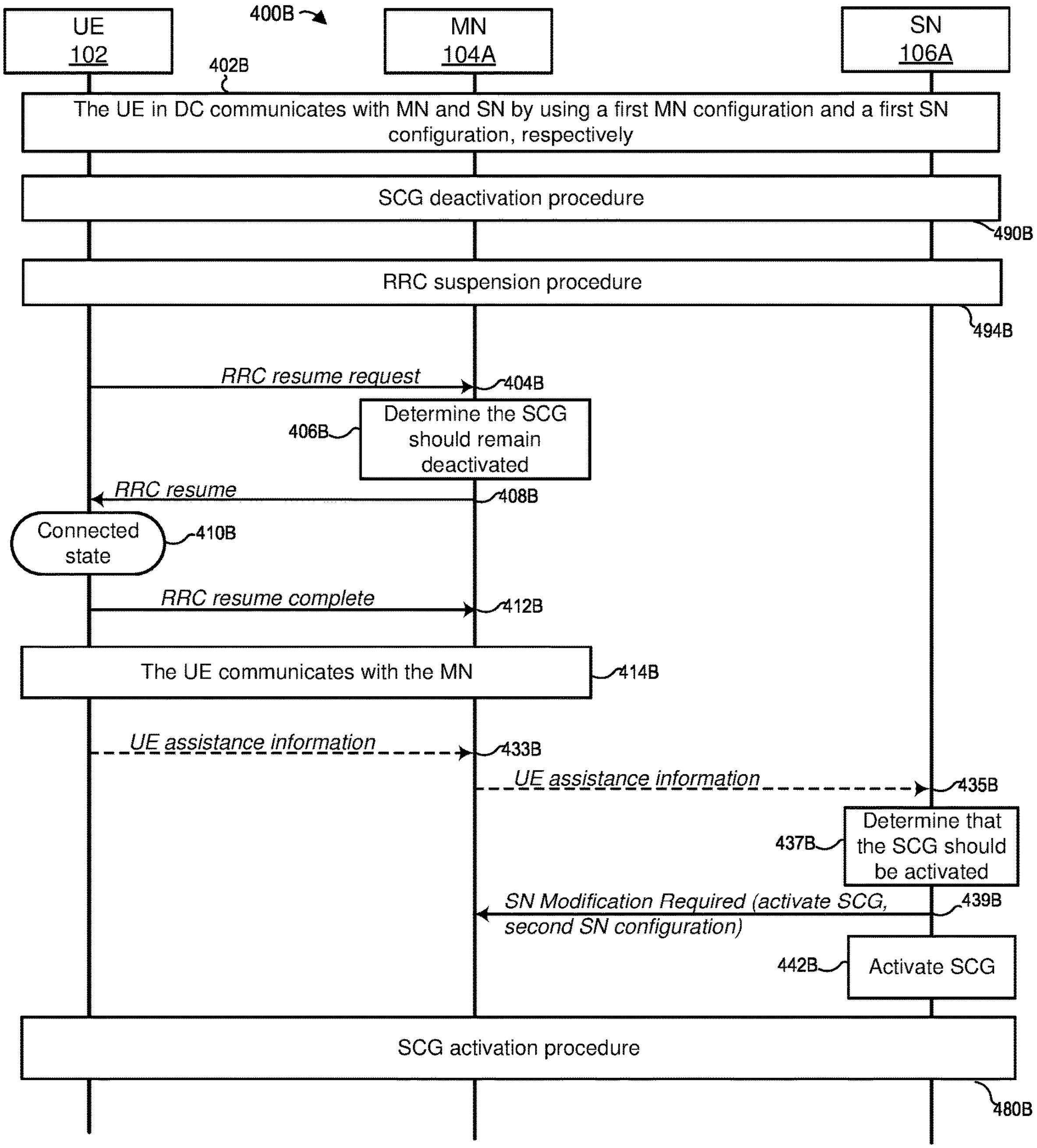
FIG. 4B is an example message sequence similar to FIG. 4A, but in which the SN later determines that the SCG should be activated and notifies the UE using an RRC resume command.
Figure 4C:
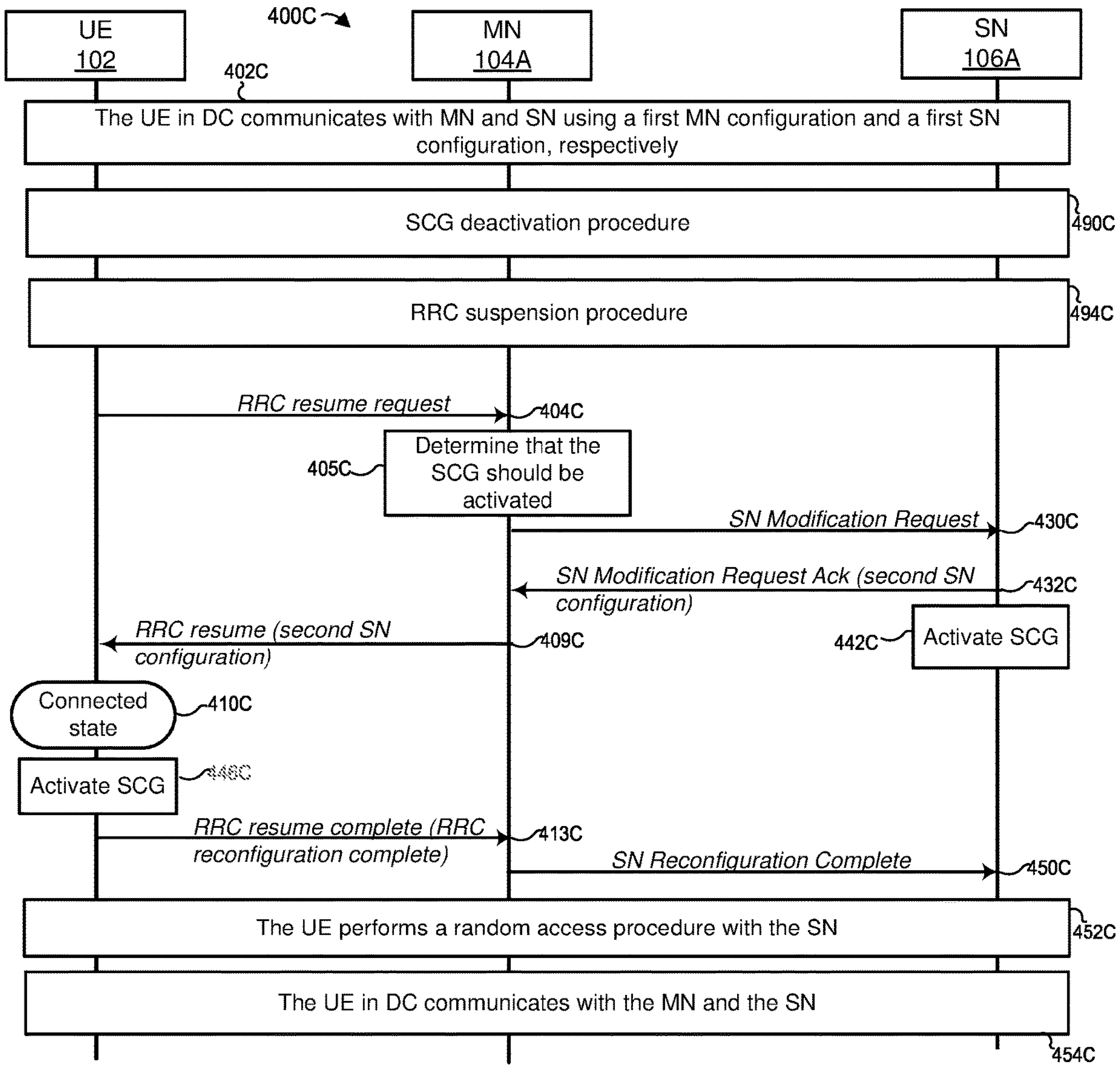
FIG. 4C is an example message sequence similar to FIG. 4B, but in which the MN provides a new SN configuration to the UE when resuming the RRC connection.

FIGS. 4A-4C are example message sequences similar to FIGS. 3A-3E, but in which the UE 102 performs an RRC resume procedure with the MN 104A and an SCG activation procedure with the SN 106A during or after the RRC resume procedure. Accordingly, events in the scenarios depicted in FIGS. 4A-4C and similar to those discussed with respect to FIGS. 3A-3E are labeled with similar reference numbers (e.g., with event 402A being similar to event 302A or 302B, etc.). With the exception of the differences shown in the figures and the differences described below, any of the alternative implementations discussed above with respect to the scenarios 300A-E (e.g., for messaging and processing) may apply to the scenarios 400A-C.

Turning first to FIG. 4A, a scenario 400A is generally similar to the scenario 300A. Accordingly, at the start of the scenario 400A, the UE 102 communicates 402A in DC with the MN 104A in accordance with a first MN configuration, and with the SN 106A in accordance with a first SN configuration, similar to events 302A-E. While the UE 102 in DC communicates with the MN 104A and SN 106A at event 402A, the UE 102, the MN 104A and/or SN 106A perform an SCG deactivation procedure 490A, similar to the SCG deactivation procedure 390A, 391B, 392C, 393D or 390E.

After event 490A, the MN 104A performs 494A an RRC suspension procedure with the UE 102 (which in some cases involves the SN 106A), similar to the RRC suspension procedure 394A-D. The UE 102 suspends the radio connection with the MN 104A as a result of the RRC suspension procedure. After suspending the radio connection, the UE 102 can perform an RRC resume procedure to transition from the inactive or idle state to the connected state, e.g., in response to the decision to initiate a data transmission with the base station 104A, or in response to a Paging message received from the base station 104A. The UE 102 can send 404A an RRC resume request message to the base station 104A via cell 124A, so that the base station 104A can configure the UE 102 to again operate in the connected state and operate as an MN for the UE 102. After or in response to the RRC resume request message, the MN 104A can determine 406A to keep the SCG deactivated for the UE 102 and transmit 408A an RRC resume message to the UE 102. In response to the determination 406A, the MN 104A does not attempt to obtain an SN configuration from the SN 106A. Therefore, the RRC resume message does not include an SN configuration. In response to the RRC resume message, the UE 102 enters 410A a connected state and transmits 412A an RRC resume complete message to the MN 104A. After or while transmitting the RRC resume complete message, the UE 102 communicates 414A with the MN 104A. In some implementations, the MN 104A can include, in the RRC resume message, an indication to the UE 102 to continue deactivating the SCG. Thus, the UE 102 retains the (augmented) first SN configuration (or retains some configuration elements in the (augmented) first SN configuration) and/or retain the SCG deactivated in response to the indication, similar to the description for FIG. 3A.

In some implementations, the MN 104A makes the determination 406A in accordance with a first resume cause in the RRC resume request 404C. For example, the first resume cause can be emergency, highPriorityAccess, mo-Signalling, mo-VoiceCall, mo-VideoCall, mo-SMS, rna-Update, mps-PriorityAccess or mcs-PriorityAccess. In other implementations, the MN 104A makes the determination 406A if the Paging message is for a (IMS) mobile terminating voice or video call. In yet other implementations, the MN 104A receives from the SN 106A an SN message indicating data activity for the UE 102. For example, the SN message can be an Activity Notification message. The MN 104A makes the determination 406A in response to an indication of data activity for the UE 102. In yet other implementations, the MN 104A makes the determination 406A in response to receiving a relatively small volume of data for the UE 102 from the CN 110 or SN 106A. For example, if the data volume the MN 104A receives from the CN 110 or SN 106A is below a certain preconfigured, predetermined, or static threshold, the MN 104A determines the data volume is a small volume and as such insufficient for reactivating the SCG.

If the first resume cause is rna-Update, the MN 104A in some implementations can transmit an RRC suspension message (similar to the RRC suspension message in the RRC suspension procedure 494A) to the UE 102 in response to the RRC resume request instead of the RRC resume message. In response to the RRC suspension message, the UE 102 stays in the inactive state or idle state with a suspended radio connection and does not transmit an RRC response message. In some implementations, the UE 102 retains the SCG as deactivated in response to the RRC suspension message. In other implementations, the MN 104A can indicate the UE 102 to release the SCG in the RRC suspension message, and the UE 102 releases the SCG in response.

In some implementations, the MN 104A can also include an MN configuration (i.e., a third MN configuration) in the RRC resume message the MN 104A transmits at event 408A, in which case, the UE 102 communicates 414A with the MN 104A using the MN configuration. In one implementation, the MN 104A can generate the third MN configuration as a full MN configuration which completely replaces the first MN configuration and/or the second MN configuration the UE 102 may receive at event 490A. Accordingly, the UE 102 can 414A communicate with the MN 104A using the full MN configuration. In another implementation, the MN 104A generates the third MN configuration as a delta MN configuration which augments only a portion of the first MN configuration and/or the second MN configuration. Accordingly, the UE 102 communicates 414A with the MN 104A using the delta MN configuration and the portion of the first MN configuration and/or the second MN configuration that is not augmented by the delta MN configuration. Example implementations of the third MN configuration are similar to the first or second MN configuration.

In other implementations, the MN 104A may not include an MN configuration in the RRC resume message. In this case, the UE 102 communicates 414A with the MN using the first MN configuration and/or the second MN configuration.

After event 414A, the UE 102, MN 104A, and SN 106A may perform the SCG activation procedure 480A to activate the SCG, similar to the SCG activation procedure 380E. The UE 102 and RAN 105 can communicate data over the SCG after activating the SCG. Activating the SCG is faster than the case in which the MN 104A configures the base station 106A as an SN from scratch. In this manner, latency to setup the SCG is reduced.

In some implementations where the MN 104A is a gNB, the RRC resume request message, the RRC resume message, and the RRC resume complete message can be an RRCResumeRequest message, an RRCResume message, and an RRCResumeComplete message. In other implementations where the MN 104A is an eNB or ng-eNB, the RRC resume request message, the RRC resume message, and the RRC resume complete message can be an RRCConnectionResumeRequest message, an RRCConnectionResume message, or an RRCConnectionResumeComplete message.

Referring next to FIG. 4B, a scenario 400B involves an SCG activation procedure after an RRC resume procedure. Events in the scenario 400B similar to those discussed above with respect to the scenario 400A are labeled with similar reference numbers (e.g., with event 402A of FIG. 4A corresponding to event 402B of FIG. 4B). With the exception of the differences shown in FIG. 4B and the differences described below, any of the alternative implementations discussed above with respect to the scenario 400A (e.g., for messaging and processing) may apply to the scenario 400B.

After event 414B, the SN 106A can determine 437B the SN 106A should activate the SCG for communication with the UE 102. In some implementations, the SN 106A can determine that data activity on the SCG exists for the UE 102 and, in response, determine 437B the SN 106A should activate the SCG for the UE 102. In one implementation, if the SN 106A has received data packets to be sent to the UE 102 from the CN 110, the SN 106A can detect data activity exists for the UE 102.

In other implementations, the SN 106A can determine 437B the SN 106A should activate the SCG for the UE 102 based on UE preference that the SN 106A receives from the UE 102 via the MN 104A. For example, the UE 102 sends 433B UE assistance information (e.g., UEAssistanceInformation message) to the MN 104A, indicating the UE 102 (temporarily) prefers dual connectivity or has data to transmit on the SCG. In turn, the MN 104A sends 435B the UE assistance information to the SN 106A. The SN 106A determines 437B the SN 106A should activate the SCG for the UE 102 in response to the UE assistance information received at event 435B.

In yet other implementations, the SN 106A determines 437B the SN 106A should activate the SCG for the UE 102 based on one or more measurement results received from the UE via the MN 104A. If measurement result(s) for cell 126A are above a first threshold and/or measurement result(s) for cell 125A (i.e., the current PSCell) are below a second threshold, the SN 106A can determine the SN 106A should activate the SCG for the UE 102. Thus, the SN 106A can change the PSCell from the cell 125A to the cell 126A by activating 442B the SCG. Alternatively, the SN 106A refrains from activating the SCG even though measurement result(s) for cell 126A are above a first threshold and/or measurement result(s) for cell 125A (i.e., the current PSCell) are below a second threshold.

In response to the determination 437B, the SN 106A sends 439B to the MN 104A an SN Modification Required message that requests the MN 104A to activate the SCG for the UE 102. In response to the request to activate the SCG, the MN 104A performs 480B an RRC SCG activation procedure with the UE 102 and the SN 106A, similar to the RRC SCG activation procedure 370E or 380E. The UE 102 activates the SCG as a result of the RRC SCG activation procedure 480B.

In some implementations, the SN 106A includes an indication (e.g., a field or an information element (IE)) to activate the SCG in the 439B SN Modification Required message to cause the MN 104A to transmit an RRC reconfiguration message to activate the SCG similar to event 344E. The SN 106A activates 442B the SCG after determining 437B to activate the SCG. In some implementations, the MN 104A sends an SN Modification Confirm message similar to event 350E to the SN 106A after receiving an RRC reconfiguration complete message, similar to event 348E, from the UE 102. The SN 106A activates 442B the SCG before or after receiving the SN Modification Confirm message.

Referring next to FIG. 4C, a scenario 400C involves an SCG activation procedure during an RRC resume procedure. Events in the scenario 400C similar to those discussed above with respect to the scenarios 400A-B are labeled with similar reference numbers (e.g., with event 402A of FIG. 4A and event 402B of FIG. 4B corresponding to event 402C of FIG. 4C). With the exception of the differences shown in FIG. 4C and the differences described below, any of the alternative implementations discussed above with respect to the scenarios 400A-B (e.g., for messaging and processing) may apply to the scenario 400C.

After event 490C, the MN 104A performs 494C an RRC suspension procedure with the UE 102 with or without involving the SN 106A, similar to the RRC suspension procedure 394A-D. In response to receiving 404C the RRC resume request message, the MN 104A determines 405C to activate the SCG for the UE 102 rather than maintain the SCG as deactivated as shown in FIGS. 4A and 4B. In some implementations, the MN 104A makes the determination 405C in accordance with a second resume cause in the RRC resume request 404C. For example, the second cause can be mo-Data. In other implementations, the MN 104A makes the determination 405C if the Paging message is not for a (IMS) mobile terminating voice or video call. In yet other implementations, the MN 104A receives from the SN 106A an SN message indicating data activity or activating the SCG for the UE 102. For example, the SN message can be an Activity Notification message or an SN Modification Required message. The MN 104A makes the determination 405C in response to the indication indicating data activity for the UE 102 or the indication indicating activating the SCG. In yet other implementations, the MN 104A makes the determination 406A in response to receiving (a large volume of) data for the UE 102 from the CN 110. For example, if data volume the MN 104A receives from the SN 106A is above a preconfigured, predetermined or static threshold, the MN 104A determines the data volume is a large volume.

In response to the determination 405C, the MN 104A can send 430C an SN Modification Request message to activate the SCG to the SN 106A. In response to receiving the SN Modification Request message, the SN 106A sends 432C an SN Modification Request Acknowledge message including a second SN configuration to the MN 104A. In some implementations, the SN 106A generates the second SN configuration as a complete and self-contained configuration (i.e. a full SN configuration). In other implementations, the SN 106A generates the second configuration as a delta SN configuration. The delta SN configuration includes only a subset of configuration parameters, i.e., only those configuration parameters that the SN 106A is changing relative to the first SN configuration and/or additional SN configuration.

After receiving 432C the SN Modification Request Acknowledge message, and in response to the RRC resume request message, the MN 104A sends 409C an RRC resume message including the second SN configuration to the UE 102. If the second SN configuration is a full SN configuration, the MN 104A includes a release and add indication (e.g., mrdc-ReleaseAndAdd or endc-ReleaseAndAdd) in the RRC resume message. If the second SN configuration is a delta SN configuration, the MN 104A does not include the release and add indication in the RRC resume message. If the MN 104A includes a full MN configuration in the RRC resume message, the MN 104A can include a full configuration indicator in the RRC resume message. In this case, the MN 104A may not include the release and add indication in the RRC resume message if the second SN configuration is a full SN configuration.

In response to the RRC resume message, the UE 102 resumes the suspended radio connection with the MN 104A, transitions 410C to the connected state, and activates 446C the SCG. The UE 102 can transmit 413C an RRC resume complete message, which may include an RRC reconfiguration complete message, to the MN 104A after resuming the suspended radio connection and in response to the RRC resume message. After receiving 413C the RRC resume complete message, the MN 104A can send 450C an SN Reconfiguration Complete message to the SN 106A to indicate to the SN 106A that the UE 102 successfully received or applied the second SN configuration. In one implementation, the MN 104A can include the RRC reconfiguration complete message from the RRC resume complete message in the SN Reconfiguration Complete message. In some implementations, the SN 106A activates 442C the SCG for the UE 102 after receiving the SN Modification Request message 430C, transmitting 432C the SN Modification Request Acknowledge message 430C, or receiving the SN Reconfiguration Complete message 450C.

Subsequently to receiving 409C the second SN configuration or activating 446C the SCG, the UE 102 can perform 452C a random access procedure on the cell 126A and with the SN 106A to connect to the SN 106A, e.g., using one or more random access configurations in the second SN configuration. After the UE 102 successfully completes the random access procedure on the cell 126A, the UE 102 can communicate 454C data (user-plane data and/or control-plane data) in DC with both the MN 104A and the SN 106A through the cell 126A, e.g., by using the first, additional, or second SN configuration. After identifying the UE 102 during the random access procedure, the SN 106A can communicate 454C data (user-plane data or control-plane data) with the UE 102 in accordance with the first SN configuration or second SN configuration the UE 102 received at event 409C. If the RRC resume message includes a release and add indication, the UE 102 communicates 454C with the SN 106A by using the second SN configuration without the first SN configuration. If the RRC resume message does not include the release and add indication, the UE 102 communicates 454C data using the second SN configuration and configuration parameters in the first SN configuration not augmented by the second SN configuration. In some implementations, the SN 106A activates 442C the SCG for the UE 102 after identifying the UE 102 during the random access procedure, which can be a two-step or a four step procedure, and a contention-based or a contention-free procedure, as discussed above. The SN 106A in some cases can allocate the dedicated random access preamble in the second SN configuration.

The MN 104A and the SN 106A can include the at least one interface ID of the UE 102, as discussed above, in the messages transmitted between the MN 104A and the SN 106A. For example, the MN 104A can include the interface ID(s) in the SN Modification Request messages the MN 104A transmits at events 490C and 430C, and in the SN Reconfiguration Complete message the MN 104A transmits at event 450C. The SN 106A can include the interface ID(s) in the SN Modification Request Acknowledge messages the SN 106A transmits at events 490C and 432C. In another example, the SN 106A can include the interface ID(s) in the SN Modification Required message or in the SN Deactivation Notification message at event 490C. The MN 104A can include the interface ID(s) in the SN Modification Request messages the MN 104A transmits at events 430C and in the SN Reconfiguration Complete message the MN 104A transmits 450C. The SN 106A can include the interface ID(s) in the SN Modification Request Acknowledge messages the SN 106A transmits at event 432C.

In some implementations, the MN 104A can include an indication to re-establish lower layers in the SN Modification Request message 430C, and the SN 106A can allocate resources of lower layers to communicate with the UE 102 in response to the indication to re-establish lower layers. The resources may include software, firmware, memory resources, and/or processing power that the SN 106A uses to implement functions of the PHY 202A/202B, MAC 204A/204B, and/or RLC 206A/206B layers for communicating with the UE 102, for example. The SN 106A can allocate processing power from an ASIC, DSP, and/or CPU of the SN 106A for communicating with the UE 102. In some implementations, the MN 104A decides to include the indication to re-establish lower layers for the UE 102 in the SN Modification Request message 430C based on the MN 104A having indicated to the SN 106A to release lower layers in an SN Request message in the RRC suspension procedure 494C, similar to event 326A. In other implementations, the MN 104A decides to include the indication to re-establish lower layers for the UE 102 in the SN Modification Request message 430C based on the MN 104A determining that the UE 102 releases the first SN configuration before, during or in response to transitioning to a connected state (e.g., before initiating an RRC resume procedure, or during or in response to the RRC resume procedure). In some of these latter implementations, the MN 104A determines that the UE 102 releases the first SN configuration based on a first UE capability of the UE 102. The first UE capability may indicate that the UE 102 is not capable of retaining (e.g., not immediately deleting) an SN configuration (in this case, SCG configuration) upon initiating an RRC resume procedure. The MN 104A may receive the first UE capability from the core network 110 (e.g., the AMF 164 or the MME 114) or another base station, or may receive the UE capability in a UECapabilityInformation message from the UE 102 at event 402C. In yet other implementations, the SN 106A is not capable of retaining the first SN configuration while deactivating the SCG with the UE 102 or is not capable of reusing some configurations of the first SN configuration after activating the SCG with the UE 102. For example, the SN 106A can release the first SN configuration in response to the SN Request message in the RRC suspension procedure 494C. In such implementations, the MN 104A includes the indication to re-establish lower layers for the UE 102 in the SN Modification Request message 430C based on the MN 104A determining that the SN 106A releases the first SN configuration or does not reuse some of the first SN configuration, irrespective of whether the UE 102 is capable of retaining the first SN configuration before transitioning to the connected state.

In some implementations, the UE 102 releases the first SN configuration after (e.g., in response to) receiving 409C the RRC resume message. In other implementations, however, the UE 102 may release the first SN configuration at another time (e.g., in response to the RRC suspension message in the RRC suspension procedure instead of retaining the first SN configuration, or upon transmitting 404C the RRC resume request message. In some implementations, the UE 102 retains the radio bearers configured by the MN 104A and/or the SN 106A after receiving the RRC suspension message in the RRC suspension procedure 494C, and the MN 104A and/or the SN 106A can release or modify one or more of the radio bearers in the RRC resume message transmitted at event 409C, causing the UE 102 to release or modify the radio bearer(s) accordingly. For example, the MN 104A can include one or more radio bearer configurations (e.g., RadioBearerConfig information element(s)) in the RRC resume message to release, add or modify one or more radio bearers, causing the UE 102 to release, add, or modify the radio bearer(s) accordingly. The MN 104A can receive the one or more radio bearer configurations from the SN 106A and include the one or more radio bearer configurations in the RRC resume message.

In other implementations, the MN 104A can include an indication that the SN 106A should resume lower layers with the UE 102 in the SN Modification Request message 430C instead of the instruction to re-establish lower layers, similar to event 338E. In some implementations, the MN 104A includes the instruction to resume lower layers for the UE 102 in the SN Modification Request message 430C based on the MN 104A having indicated to the SN 106A to deactivate the SCG in the SCG deactivation procedure 490C (similar to event 310A) or to suspend lower layers in an SN Request message in the RRC suspension procedure 494 (similar to event 326A). In other implementations, the MN 104A determines to include the instruction to resume lower layers for the UE 102 in the SN Modification Request message 430C based on the MN 104A determining that the UE 102 retains the first SN configuration before, during or in response to transitioning to a connected state (e.g., before initiating an RRC resume procedure, or during or in response to the RRC resume procedure). In some of these latter implementations, the MN 104A determines that the UE 102 retains the first SN configuration based on a second UE capability of the UE 102 or based on that the MN 104A does not receive the first UE capability for the UE 102. The second UE capability may indicate that the UE 102 is capable of retaining (e.g., not immediately deleting) an SN configuration (i.e., SCG configuration) upon initiating an RRC resume procedure. The MN 104A may receive the second UE capability from the core network 110 (e.g., the AMF 164 or the MME 114) or another base station, or may receive the second UE capability in a UECapabilityInformation message from the UE 102 at event 402C. In yet other implementations, the SN 106A is capable of retaining the first SN configuration while deactivating the SCG with the UE 102 or is not capable of reusing some configurations of the first SN configuration after activating the SCG with the UE 102. For example, the SN 106A can retain the first SN configuration in response to the SN Request message in the RRC suspension procedure 494C. In such implementations, the MN 104A includes the indication to resume lower layers for the UE 102 in the SN Modification Request message 430C based on the MN 104A determining that the SN 106A retains the first SN configuration or does not reuse some of the first SN configuration, irrespective of whether the UE 102 is capable of retaining the first SN configuration before transitioning to the connected state.

In some implementations, the SN 106A can generate the second SN configuration as a full SN configuration in response to the indication to re-establish lower layers. In yet other implementations, the MN 104A includes a full configuration request (e.g., a Full Configuration IE) in the SN Modification Request message and the SN 106A generates the second SN configuration as a full SN configuration in accordance with the full configuration request, irrespective of the indication to re-establish lower layers or suspend lower layers.

In some implementations, the SN 106A can generate the second SN configuration as a delta SN configuration in response to the indication to resume lower layers. In other implementations, the MN 104A includes a delta configuration request (e.g., a Delta Configuration IE) or excludes the full configuration request in the SN Modification Request message and the SN 106A generates the second SN configuration as a delta SN configuration in accordance with the delta configuration indication or the SN Modification Request message excluding the delta configuration indication.

In some implementations, if the SN 106A generates the second SN configuration as a full SN configuration, the SN 106A may or may not, in the SN Modification Request Acknowledge message, include an indication indicating the second SN configuration is a full SN configuration. If the SN Modification Request Acknowledge message does not include the indication, the MN 104A can determine the second SN configuration is a full SN configuration in accordance with the UE capability or the determination that the SN 106A is not capable of retaining the first SN configuration.

Figure 5A:
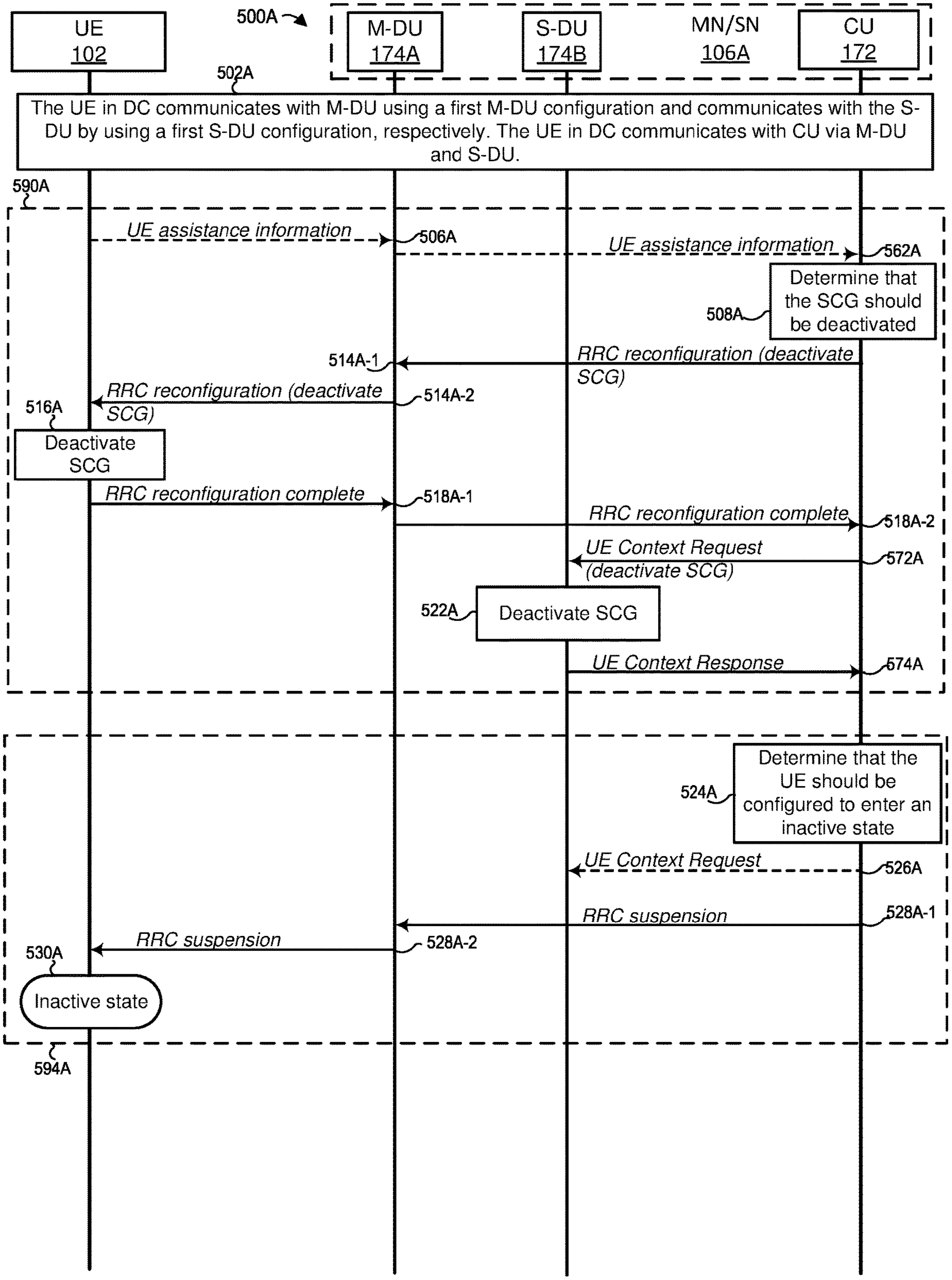
FIG. 5A is an example message sequence similar to FIG. 3A, but in which one distributed unit (DU) of a distributed base station operates as an MN, and another DU operates as the SN.
Figure 5B:
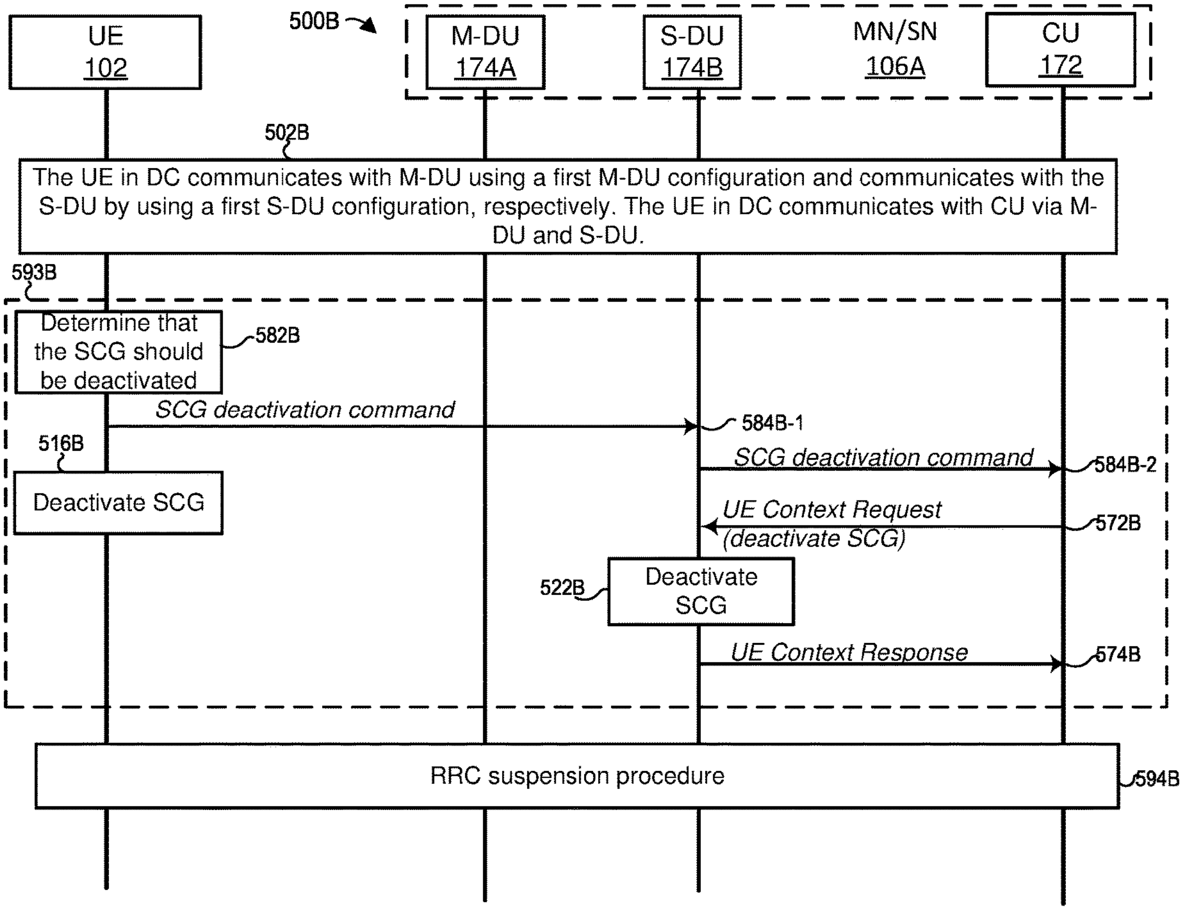
FIG. 5B is an example message sequence similar to FIG. 3D, but in which one distributed unit (DU) of a distributed base station operates as an MN, and another DU operates as the SN.

FIGS. 5A-5B are example message sequences similar to FIGS. 3A-3D, but where portions of a single base station serve as the MN and the SN. Accordingly, events in the scenarios depicted in FIGS. 5A-5B similar to those discussed with respect to FIGS. 3A-3D are labeled with similar reference numbers. With the exception of the differences shown in the figures and the differences described below, any of the alternative implementations discussed above with respect to the scenarios 300A-C and 300D (e.g., for messaging and processing) may apply to the scenarios 500A and 500B, respectively. As one example difference, the MN and the SN in FIGS. 5A-5B do not need to exchange SN Modification Request and SN Modification Request Acknowledge messages, as in FIGS. 3A-3D.

Turning to FIG. 5A, in a scenario 500A, the base station 106A operates as both an MN and an SN, with the MN including a CU (e.g., the CU 172) and a first DU (e.g., a DU 174A of the one or more DUs 174, referred to herein as an M-DU 174A) of the base station 106A, and the SN including the same CU and a second, different DU (e.g., a DU 174B of the one or more DUs 174, referred to herein as an S-DU 174B) of the base station 106A. The scenario 500A is generally similar to the scenarios 300A-C, except that the single base station 106A here includes both the MN and the SN. An RRC message (e.g., described below) sent by the CU to a DU (i.e., the first DU or second DU) can be included in an F1AP message (e.g. DL RRC Message Transfer message or a UE Context Request message) sent by the CU to the DU. The first DU or the second DU can send to the CU an F1AP message (e.g. Initial UL RRC Message Transfer message, UL RRC Message Transfer message or a UE Context Request Acknowledge message) including an RRC message. Accordingly, at the start of the scenario 500A, the UE 102 communicates 502A in DC with the M-DU 174A in accordance with a first M-DU configuration, with the S-DU 174B in accordance with a first S-DU configuration, and with the CU 172 via the M-DU 174A and S-DU 174B with a first CU configuration. The MN 104A then determines 508A to deactivate the SCG for communication with the UE 102, similar to event 308A, 307B or 307C.

In response to the determination 508A, the CU 172 sends 514A-1 to the M-DU 174A an RRC reconfiguration message that that deactivates the SCG for the UE 102, and the M-DU 174A in turn transmits 514A-2 the RRC reconfiguration message to the UE 102, similar to the event 314A. In response to the 514A-2 RRC reconfiguration message, the UE 102 deactivates 516A the SCG and transmits 518A-1 an RRC reconfiguration complete message to the M-DU 174A, similar to the event 316A and 318A respectively. Then the M-DU 174A transmits 518A-2 the RRC reconfiguration complete message to the CU 172, similar to event 318A.

In some implementations, the CU 172 may obtain an additional S-DU configuration from the S-DU 174B by performing a UE Context Modification procedure with the S-DU 174B. The additional S-DU configuration is similar to the additional SN configuration described for FIG. 3A. The CU 172 includes the additional S-DU configuration in the RRC reconfiguration message 514A-1. In some implementations, the S-DU 174B generates the additional S-DU configuration as a delta DU configuration which augments only a portion of the first S-DU configuration. Accordingly, the UE 102 augments only a portion of the first S-DU configuration with the delta DU configuration and retains the portion of the first S-DU configuration that is not augmented by the delta DU configuration. In other implementations, the S-DU 174B generates the additional S-DU configuration as a complete and self-contained configuration (i.e. a full DU configuration). The UE 102 replaces the first S-DU configuration with the additional S-DU configuration. In yet other implementations, the CU 172 does not include a DU configuration in the RRC reconfiguration message 514A-1.

Alternatively, in response to the determination 508A, the CU 172 sends 514A-1 the RRC reconfiguration message to the S-DU 174B, and the S-DU 174B in turn transmits 514A-2 the RRC reconfiguration message to the UE 102. In response to the 514A-2 RRC reconfiguration message, the UE 102 deactivates 516A the SCG and transmits 518A-1 the RRC reconfiguration complete message to the S-DU 174B, similar to the events 315C and 319C respectively. Then the S-DU 174A transmits 518A-2 the RRC reconfiguration complete message to the CU 172, similar to the event 319C.

After or in response to the determination 508A, transmitting 514A-1 the RRC reconfiguration, or receiving 518A-2 the RRC reconfiguration complete message, the CU 172 sends 572A to the M-DU 174A a UE Context Request message deactivating the SCG. In response to the UE Context Request message, the M-DU 174A deactivates 522A the SCG and sends 574A a UE Context Response message to the CU 172. The DU 174 can send 574A the UE Context Response message before or after deactivating the SCG.

In some implementations, the CU 172 can also include a second MN configuration in the RRC reconfiguration message the CU 172 transmits 514A-1, in which case, the UE 102 communicates with the CU 172 and/or M-DU 174A using the second MN configuration after receiving 514A-2 the RRC reconfiguration message. The second MN configuration can include a second CU configuration and/or a second M-DU configuration. In some implementations, the CU 172 can obtain the second M-DU configuration from the M-DU 174A before generating the second MN configuration. In some implementations, the CU 172 generates the second MN configuration as a delta MN configuration which augments only a portion of the first CU configuration and/or the first M-DU configuration. Accordingly, the UE 102 communicates with the CU 172 and/or M-DU 174A using the delta MN configuration and the portion of the first CU configuration and/or first M-DU configuration that is not augmented by the delta MN configuration. In other implementations, the CU 172 and/or M-DU 174A does not include a second MN configuration in the RRC reconfiguration message the CU 172 and/or M-DU 174A transmits 514A-1, 514A-2.

After deactivating the SCG, the CU 172 determines 524A to configure the UE 102 to enter an inactive state or an idle state with a suspended radio connection. In response to the determination 524A, the CU 172 can send 526A to the S-DU 174B a UE Context Request message, which causes the S-DU 174B to release or suspend lower layers for communicating with the UE 102.

In response to the determination 524A, the CU 172 sends 528A-1 an RRC suspension message to the M-DU 174A, and the M-DU 174A in turn sends 528A-2 an RRC suspension message to the UE 102, similar to the event 328A. The UE 102 enters 530A the inactive state in response to the RRC suspension message, similar to the event 330A. In response to the RRC suspension message, the UE 102 suspends the radio connection with the CN 172 and/or the M-DU 174A, retains the first M-DU configuration or a portion of the M-DU configuration, and retains the first CU configuration. The events 502A, 506A, 508A, 514A-1, 514A-1, 516A, 518A-1, 518A-2, 572A, 522A, 574A are collectively referred to in FIG. 5A as an SCG deactivation suspension procedure 590A.

In some implementations, the UE Context Request message can be a UE Context Release Command message. The CU 172 sends 526A to the S-DU 174B the UE Context Release Command message, which causes the S-DU 174B to release lower layers for communicating with the UE 102. In response to the UE Context Release Command message, the S-DU 174B releases lower layer resources for communicating with the UE 102. These resources can include software, firmware, memory resources, and/or processing power that the S-DU 174B uses to implement functions of the PHY 202A/202B, MAC 204A/204B, and/or RLC 206A/206B layers for communicating with the UE. For example, the S-DU 174B can release processing power from the ASIC, DSP, and/or CPU of the S-DU 174B allocated to communicate with the UE 102. In the scenario 500A, the S-DU 174B also or instead releases the first S-DU configuration in response to the UE Context Release Command message. The S-DU 174B sends to the CU 172 a UE Context Release Complete message in response to the UE Context Release Command message 526A.

In other implementations, the UE Context Request message can be a UE Context Modification Request message. The CU 172 can send 526A to the S-DU 174B the UE Context Modification Request message including an indication to suspend lower layers for communicating with the UE 102. In response, the S-DU 174B suspends lower layers, similar to event 326A. After suspending lower layers, the S-DU 174B transmits to the CU 172 a UE Context Modification Response message in response to the UE Context Modification Request message 526A.

Example implementations of the second MN configuration are as described for FIG. 3A. In some implementations, the CU configuration (i.e., the first CU configuration and/or the second CU configuration) can include at least one radio bearer configuration (e.g., RadioBearerConfig, SRB-ToAddMod, or DRB-ToAddMod), at least one measurement configuration (e.g., MeasConfig or CSI-MeasConfig), and/or other configuration(s) (e.g., OtherConfig). In some implementations, the DU configuration (i.e., the first M-DU configuration, the first S-DU configuration and/or the second M-DU configuration) can include a cell group configuration (e.g., CellGroupConfig).

Referring next to FIG. 5B, in a scenario 500B, the base station 106A operates as both an MN and an SN, with the MN including a CU (e.g., the CU 172) and a first DU (e.g., a DU 174A of the one or more DUs 174, referred to herein as an M-DU 174A) of the base station 106A, and the SN including the same CU and a second, different DU (e.g., a DU 174B of the one or more DUs 174, referred to herein as an S-DU 174B) of the base station 106A. The scenario 500B is generally similar to the scenario 500A, but with the CU 172 determining that the UE 102 releases the first S-DU configuration. The scenario 500B is also generally similar to the scenario 300D, with the exception that the base station 106A includes both the MN and the SN.

Accordingly, after the UE 102 determines 582B to deactivate the SCG, the UE 102 transmits 584B-1 an SCG deactivation command to the S-DU 174B, which forwards 584B-2 the SCG deactivation command to the CU 172. In response to or after receiving the SCG deactivation command, the CU 172 can send 572B a UE Context Request message to the S-DU 174B that causes the S-DU 174B to deactivate 522B the SCG. The S-DU 174B can send 574B a UE Context Response message to the CU 172 in response to the UE Context Request. The events 582B, 584B-1, 584B-2, 572B, 516B, 522B, and 574B are collectively referred to in FIG. 5B as an SCG deactivation procedure 593B. After deactivating 522B the SCG, the CU 172 can perform 594B an RRC suspension procedure with the UE 102, similar to the RRC suspension procedure 594A.

Figure 6A:
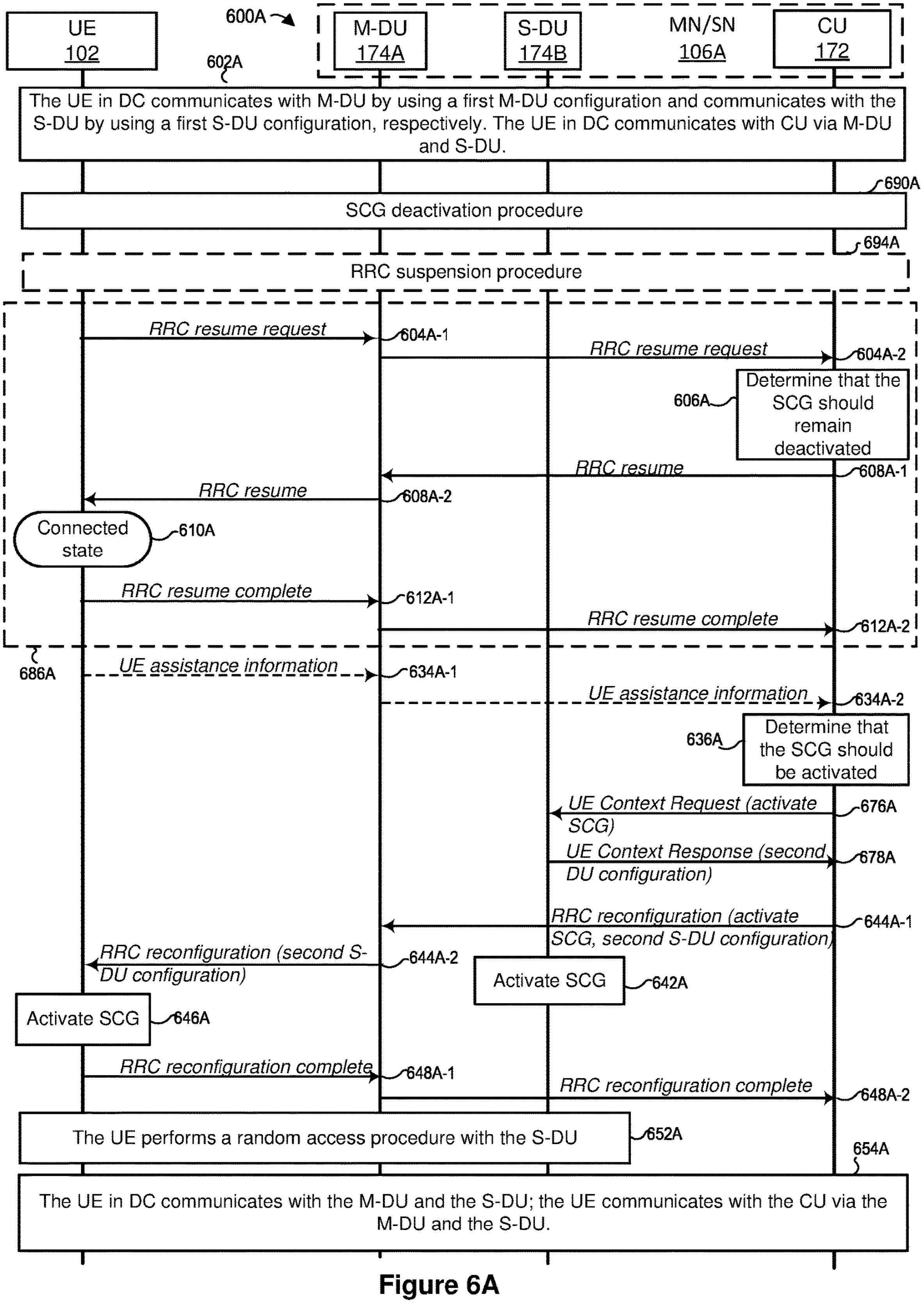
FIG. 6A is an example message sequence similar to FIG. 4B, but in which one distributed unit (DU) of a distributed base station operates as an MN, and another DU operates as the SN.
Figure 6B:
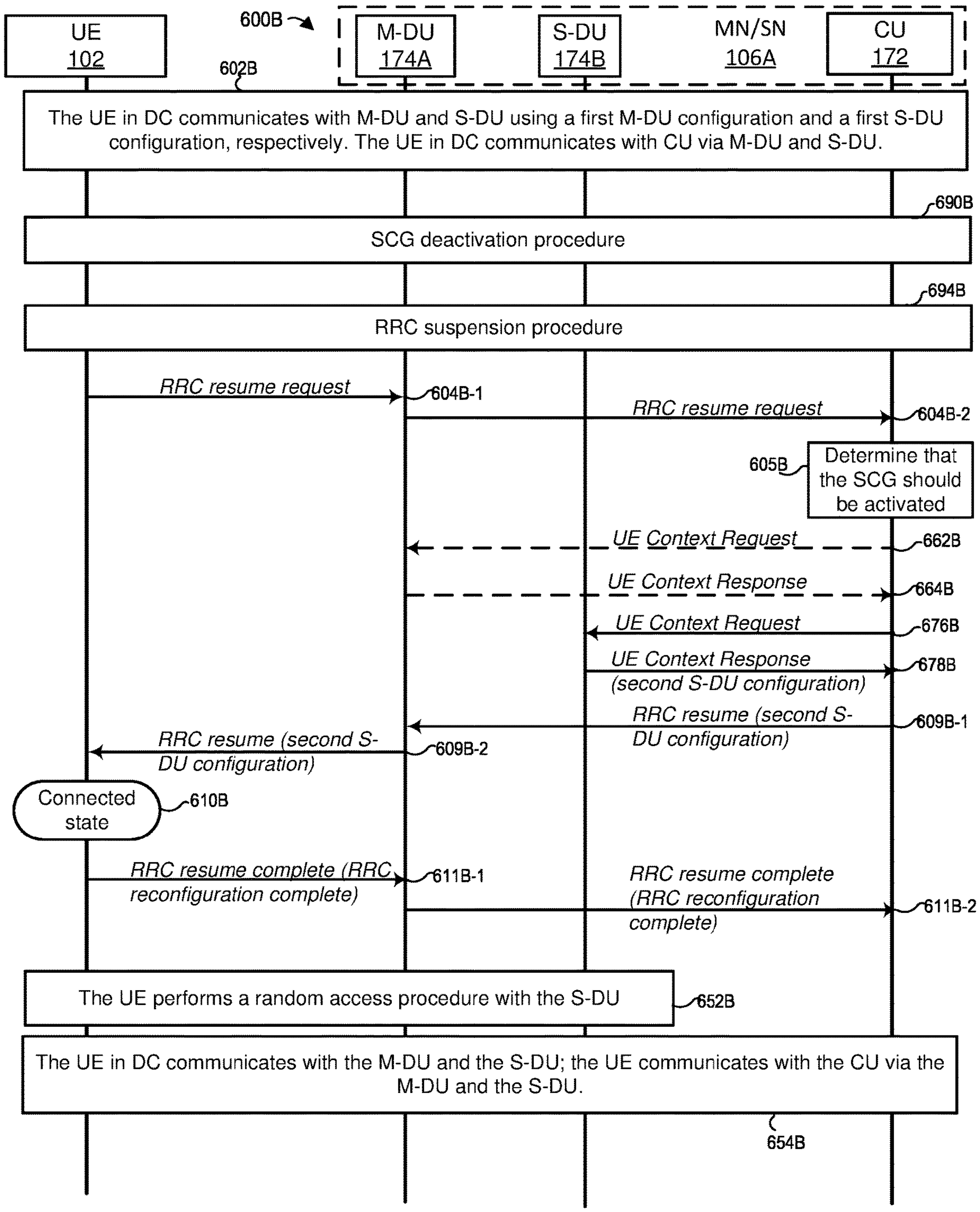
FIG. 6B is an example message sequence similar to FIG. 4C, but in which one distributed unit (DU) of a distributed base station operates as an MN, and another DU operates as the SN.

FIGS. 6A-6B are example message sequences similar to FIGS. 4A-4C, but where components of a single base station serve as the MN and the SN. Accordingly, events in the scenarios depicted in FIGS. 6A-6B similar to those discussed with respect to FIGS. 4A-4C are labeled with similar reference numbers (e.g., event 602A, 602B corresponding to event 402A-C). With the exception of the differences shown in the figures and the differences described below, any of the alternative implementations discussed above with respect to the scenarios 400A-B and 400C (e.g., for messaging and processing) may apply to the scenarios 600A and 600B, respectively. As one example difference, the MN and the SN in FIGS. 6A-6B do not need to exchange SN Modification Request, SN Modification Request Acknowledge, SN Modification Required, and SN Reconfiguration Complete messages, as in FIGS. 4A-4C.

Turning first to FIG. 6A, in a scenario 600A, the base station 106A operates as both an MN and an SN, with the MN including a CU (e.g., the CU 172) and a first DU (e.g., a DU 174A of the one or more DUs 174, referred to herein as an M-DU 174A) of the base station 106A, and the SN including the same CU and a second, different DU (e.g., a DU 174B of the one or more DUs 174, referred to herein as an S-DU 174B) of the base station 106A. The scenario 600A is generally similar to the scenarios 400A-B, with the exception that the single base station 106A includes both the MN and the SN. Accordingly, at the start of the scenario 600A, the UE 102 communicates 602A in DC with the M-DU 174A in accordance with a first M-DU configuration, with the S-DU 174B in accordance with a first S-DU configuration, and with the CU 172 via the M-DU 174A and S-DU 174B with a first CU configuration, similar to events 402A-B and 502A. While the UE 102 in DC communicates with the M-DU 174A and S-DU 174B and communicates with the CU 172 at event 602A, the UE 102, CU 172, M-DU 174A and/or S-DU 174B perform an SCG deactivation procedure 690A, similar to the SCG deactivation procedure 590A or 593B.

After event 690A, the CU 172 can perform 694A an RRC suspension procedure with the UE 102 via the M-DU 174A with or without involving the S-DU 174B, similar to the RRC suspension procedure 594A. In response to the RRC suspension procedure, the UE 102 enters the inactive state or idle state with a suspended radio connection. At a later time, the UE 102 in the inactive state or idle state with a suspended radio connection can perform 686A an RRC resume procedure with the CU 172 via the M-DU 174A. During the RRC resume procedure 686A, the UE 102 transmits 604A-1 an RRC resume request message to M-DU 174A, which in turn transmits 604A-2 the RRC resume request message to the CU 172. After or in response to receiving 604A-2 the RRC resume request message, the CU 172 determines 606A to continue deactivating the SCG and sends 608A-1 an RRC resume message to the M-DU 174A. In turn, the M-DU 174A transmits 608A-2 the RRC resume message to the UE 102. In response to the determination 606A, the CU 172 does not include an SN configuration in the RRC resume message. In response to the RRC resume message, the UE 102 enters 610A the connected state and transmits 612A-1 an RRC resume complete message to the M-DU 174A. In turn, the M-DU 174A transmits 612A-2 the RRC resume complete message to the CU 172.

In some implementations, the CU 172 sends a UE Context Request message (e.g., a UE Context Setup Request message to the M-DU 174A in response to or after receiving the RRC resume request message, and the M-DU 174A sends a UE Context Response message (e.g., a UE Context Setup Response message) including a third M-DU configuration to the CU 172 in response to the UE Context Request message. The CU 172 can include the third M-DU configuration in the RRC resume message, similar to the third MN configuration. After receiving the third M-DU configuration, the UE 102 communicates with the M-DU 174A using the third M-DU configuration.

After the RRC resume procedure, the CU 172 104A can determine 636A to activate the SCG for communication with the UE 102, similar to event 336E. In some implementations, the CU 172 can determine that data activity on the SCG exists for the UE 102 and, in response, determine 636A to activate the SCG for the UE 102. For example, the CU 172 detects data activity exists for the UE 102 based on a message for the UE 102 that the CU 172 receives from the M-DU 174A. In other implementations, the CU 172 makes the determination 636A in response to receiving (a large volume of) data for the UE 102 from the CN 110. For example, if data volume the CU 172 receives from the SN 106A is above a preconfigured, predetermined, or static threshold, the MN 104A determines the data volume is a large volume. In yet other implementations, the CU 172 makes the determination 636A in response to receiving data associated to a specific QoS (flow) or a particular PDU Session (e.g., a first QoS (flow) or a first PDU Session) for the UE 102 from the CN 110. In such implementations, the CU 172 does not make the determination 636A in response to receiving data associated to a second QoS (flow) or a second PDU Session for the UE 102 from the CN 110.

In response to the determination 636A, the CU 172 sends 676A to the S-DU 174B a UE Context Request message (e.g., a UE Context Setup Request message or a UE Context Modification Request message) to activate the SCG for the UE 102. The CU 172 may or may not include an indication to activate the SCG in the UE Context Request message. In response to the UE Context Request message, the S-DU 174B can send a UE Context Response message include a second S-DU configuration to the CU 172. Then the CU 172 sends 644A-1 an RRC reconfiguration message including the second S-DU configuration to the M-DU 174A to activate the SCG. In turn, the M-DU 174A transmits 644A-2 the RRC reconfiguration message to the UE 102. The events 644A-1 and 644A-2 are similar to event 344E. In response to the RRC reconfiguration message the UE receives 644A-2, the UE activates 646A the SCG, and transmits 648A-1 an RRC reconfiguration complete message to the M-DU 174A, similar to the event 346E and 348E respectively. Then the M-DU 174A transmits 648A-2 the RRC reconfiguration complete message to the CU 172, similar to the event 348E.

Subsequently to receiving 644A the RRC reconfiguration message or in response to 644A the RRC reconfiguration message, the UE 102 can perform 652A a random access procedure on cell 126A with the S-DU 174B to activate the SCG with the S-DU 174B, e.g., in accordance with random access configuration(s) in the second S-DU configuration, similar to event 352E. After the UE 102 successfully completes 652A the random access procedure on the cell 126A with the S-DU 174B, the UE 102 can communicate 654A data (user-plane data and/or control-plane data) in DC with both the M-DU 174A and the S-DU 174B through cell 125A and cell 126A respectively. Having identified the UE 102 in the random access procedure, the S-DU 174B can communicate 654A data (user-plane data or control-plane data) with the UE 102 in accordance with configuration parameters in the first S-DU configuration, additional S-DU configuration and/or second S-DU configuration, similar to event 354E.

Referring next to FIG. 6B, the base station 106A in a scenario 600B includes a CU 172, an M-DU 174A, and an S-DU 174B. Unlike the scenario of FIG. 6A, this scenario includes the CU 172 making a determination to activate the SCG prior to the UE 102 entering a connected state. In this respect, the scenario 600B is generally similar to the scenario 400C, but here the MN and the SN are components of the same base station.

After the CU 172 makes the determination 605B to activate the SCG (for reasons similar to those discussed with reference to event 405C above), the CU 172 can retrieve (or setup) the UE context from (or with) the S-DU 174B (events 676B and 678B) and, in some cases, from (or with) the M-DU 174A (events 662B and 664B). The S-DU 174B can provide 678B a second S-DU configuration to the CU 172, and the CU 172 then can send 609B-1 an RRC resume message including the second S-DU configuration to the M-DU 174A, so as to activate the SCG. In turn, the M-DU 174A transmits 609B-2 the RRC resume message including the second S-DU configuration to the UE 102. The events 609B-1 and 609B-2 are generally similar to event 409C of FIG. 4C. In some implementations, the M-DU 174A can provide 664B a third M-DU configuration to the CU 172 and CU 172 can include the third M-DU configuration in the RRC resume message as described for FIG. 6A.

In response to receiving 609B-2 the RRC resume message, the UE 102 enters 610B the connected state and transmits 611B-1 an RRC resume complete message to the M-DU 174A. In turn, the M-DU 174A transmits 611B-2 the RRC resume complete message to the CU 172. After entering 610B the connected state, the UE 102 can perform 652B a random access procedure with the S-DU 174B, similar to the random access procedure 652A. The UE 102 then can communicate 654B in DC with the M-DU 174A and S-DU 174B.

Next, several example methods for managing SCG and MN connection at one or more RAN nodes or a UE are discussed with reference to FIGS. 7A-23. Each of these methods can be implemented using processing hardware such as for example one or more processors configured to execute instructions stored on a non-transitory computer-readable medium. For clarity, the methods that can be implemented in an MN are discussed below with reference to the MN 104A, methods that can be implemented in a UE are discussed below with reference to the UE 102, and methods that can be implemented in a RAN (e.g., one or more network nodes such as the MN 104A or the SN 106A) are discussed below with reference to the RAN 105.

Figure 7A:
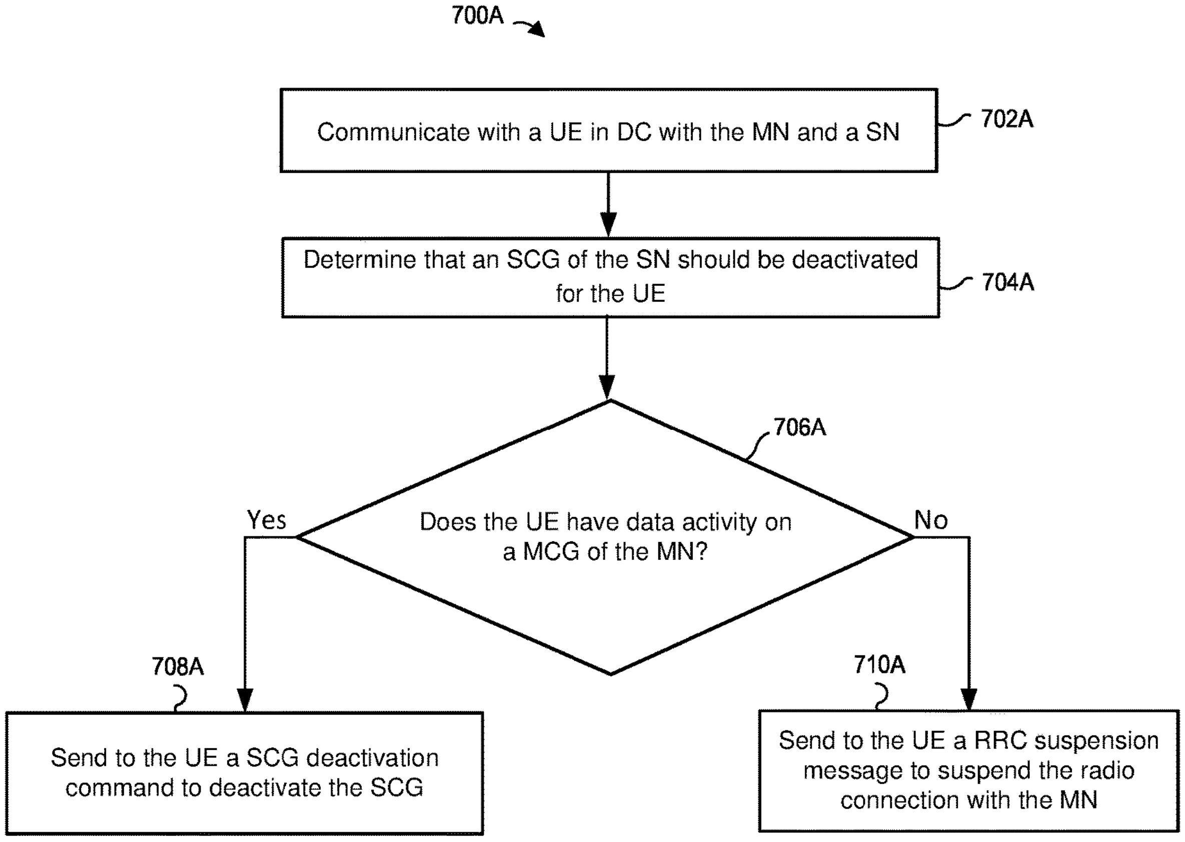
FIG. 7A is a flow diagram of an example method of notifying the UE of SCG deactivation, in which the MN determines whether to transmit an SCG deactivation command or an RRC suspension command to the UE based on whether there is data activity on the MCG.
Figure 7B:
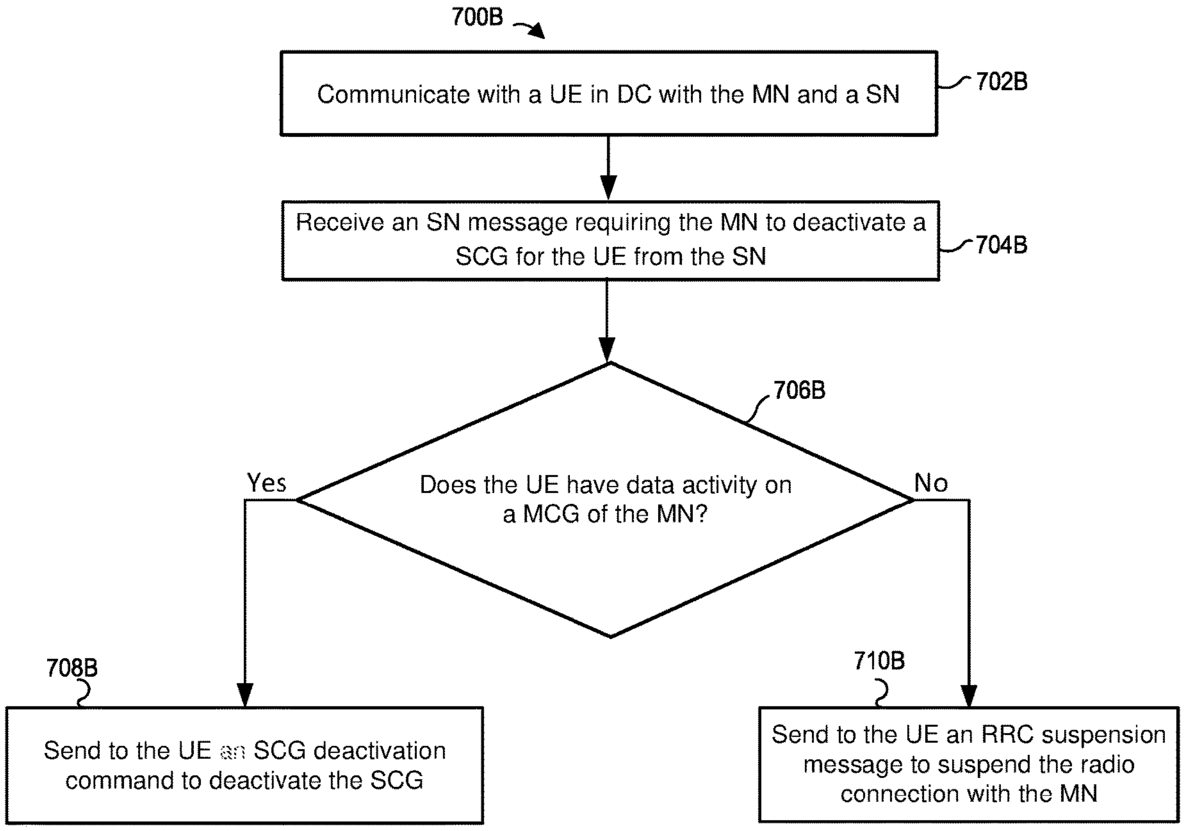
FIG. 7B is a flow diagram of an example method similar to the method of FIG. 7A, but with the MN receiving a notification of SCG deactivation from the SN.

Turning first to FIGS. 7A and 7B, an example method of notifying a UE of SCG deactivation can be implemented at a network node such as a base station or a DU, operating as an MN for a UE communicating in dual connectivity.

The methods 700A and 702B begin at block 702A or 702B, respectively, where an MN communicates with a UE to support DC functionality with the MN and an SN (e.g., events 302A-E, 402A-E, 502A-B, 602A-B). At block 704A, the MN determines that an SCG of the SN should be deactivated for the UE, while the UE and the MN are in communication (e.g., event 308A). The MN can made this determination based on whether data packets arrive from the CN, on whether data packets arrive for a particular QoS or PDU session, on the volume of data addressed to the UE, etc. On the other hand, a block 704B (see FIG. 7B), the MN 104A receives a notification of SCG deactivation from the SN 106A (e.g., event 309B).

Next, at block 706A or 706B, the MN determines whether there is data activity on the MCG of the MN. When the MN determines that the UE has data activity on the MCG, the MN sends to the UE an SCG deactivation command to deactivate the SCG, at block 708A or 708B (e.g., events 314A, 314B, 514A). Otherwise, when the MN determines that the UE does not have data activity on the MCG, the flow proceeds to block 710A or 710B, where the MN sends, to the UE, an RRC suspension message in order to suspend the radio connection with the MN (e.g., events 328A, 528A).

Figure 8:
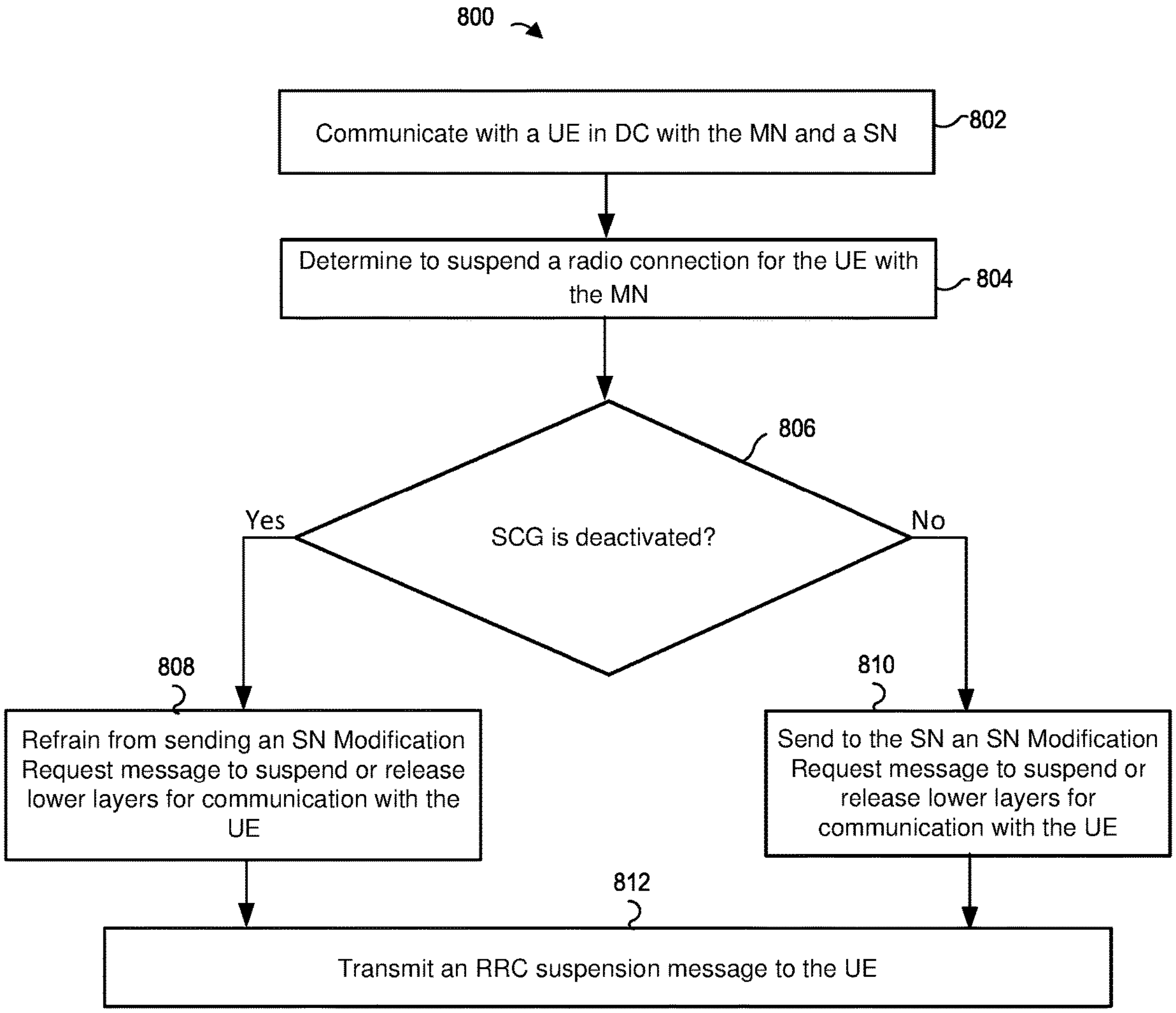
FIG. 8 is a flow diagram of an example method of deactivating the SCG, in which the MN decides whether to send a message to the SN to suspend or release lower layers for communication with the UE based on whether the SCG is currently activated.

Next, FIG. 8 depicts a flow diagram of an example method 800 of deactivating the SCG, according to which the MN determines whether to send a message to the SN to suspend or release lower layers for communication with the UE based on whether the SCG is currently active. At block 802, the MN communicates with a UE to support DC operation (e.g., events 302A-E, 402A-E, 502A-B, 602A-B). Next, at block 804, the MN determines that the MN should suspend a radio connection with the UE 102 (e.g., events 324A, 524A). The MN the determines, at block 806, whether the UE and/or the RAN have deactivated the SCG. If the SCG is active, the MN sends to the SN an SN Modification Request message to suspend or release lower layers for communication with the UE, at block 810. If the SCG is deactivated, the MN at block 808 refrains from sending an SN Modification Request message to the SN 106A. At block 812, the MN transmits 812 an RRC suspension message to the UE.

Figure 9:
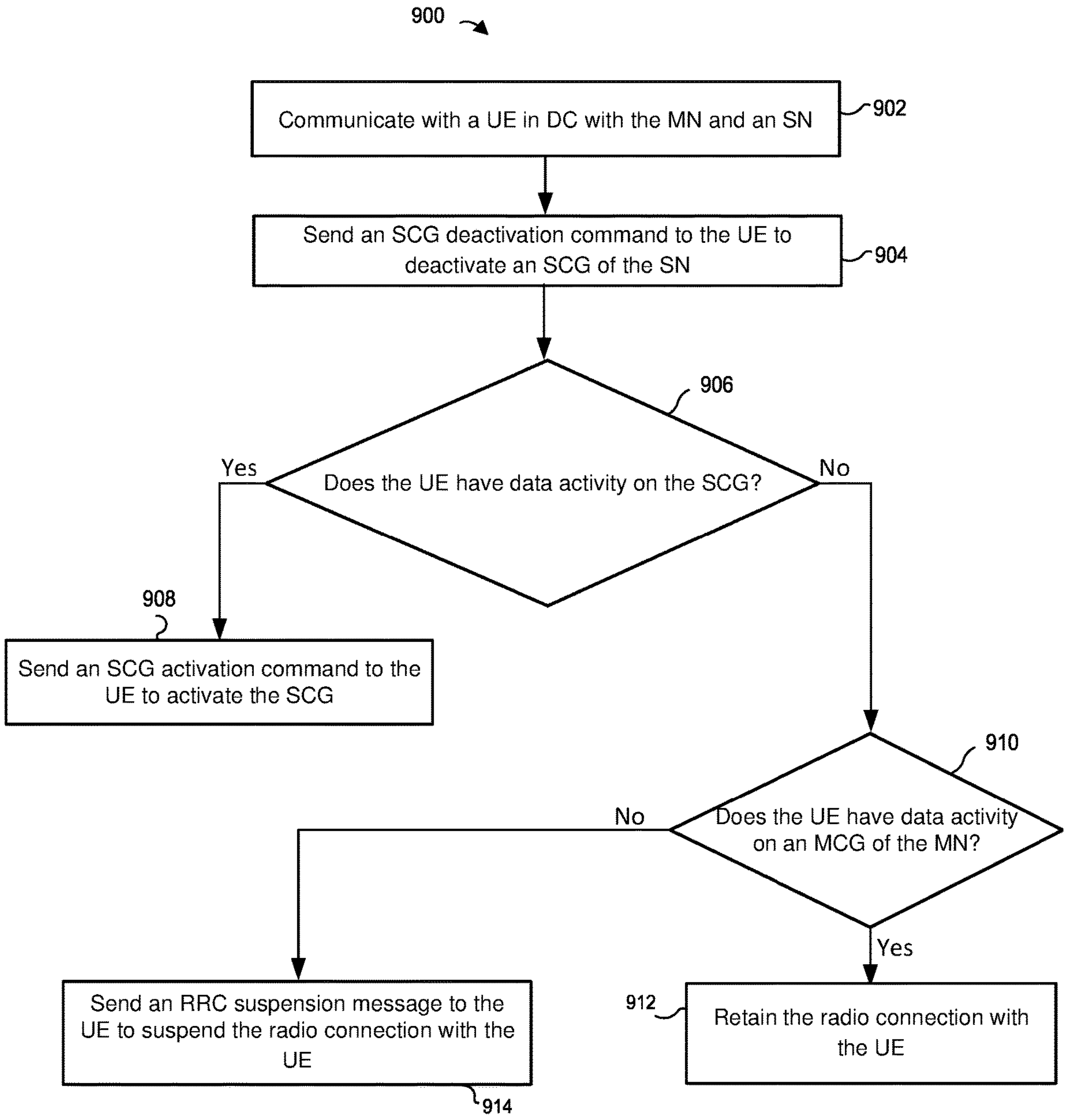
FIG. 9 is a flow diagram of an example method of deactivating or activating the SCG, in which the MN selects a message to send the UE depending on whether the UE is active on either the SCG or MCG.

FIG. 9 illustrates another example method 900 of deactivating or activating the SCG. According to the method 900, a MN selects a message to send the UE in view of whether a UE is active on the SCG as well as the MCG. The method 900 begins at block 902, where the MN communicates with the UE to support DC operation (e.g., events 302A-E, 402A-E, 502A-B, 602A-B). At block 904, the MN, while communicating with the UE, sends an SCG deactivation command to the UE to deactivate an SCG of the SN (e.g., events 314A, 314B, 514A). Subsequently, at block 906, the MN determines whether the UE has data activity on the SCG (based on a message from SN, a message from the UE, data packets from the CN, etc.).

If the MN determines that there is data activity on the SCG, the flow proceeds to block 908, where the MN sends an SCG activation command to the UE to activate the SCG (e.g., events 344E, 409C, 644A, 609B). However, if the MN determines that there is no data activity on the SCG, the flow proceeds to block 910, where the MN determines whether the UE has data activity on the MCG (e.g., based on data packets arriving from the CN for the UE, the QoS of the data packets, the volume of data).

When the MN detects data activity on the MCG, the MN retains the radio connection with the UE 102, at block 912. Otherwise, when the MN determines that there is no data activity on the MCG, the MN sends an RRC suspension message to the UE to suspend the radio connection between the MN and the UE, at block 914 (e.g., events 328A, 528A).

Figure 10:
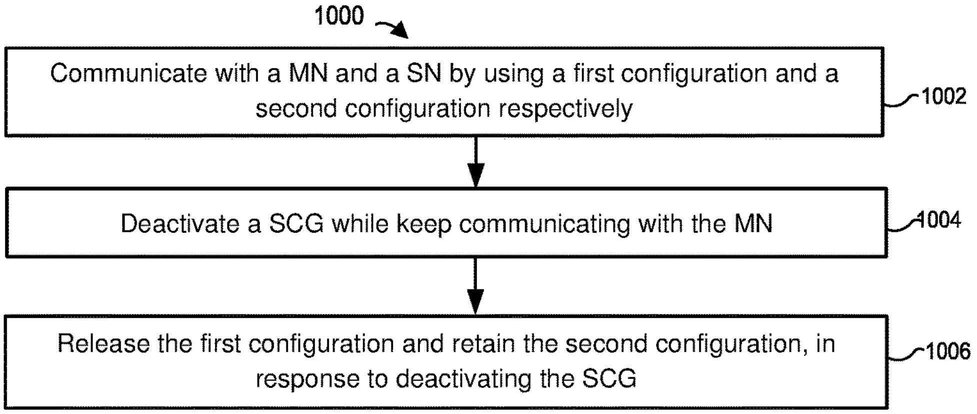
FIG. 10 is a flow diagram of an example method of deactivating or activating the SCG, in which the UE releases the configuration for communication with the MN.

Now referring to FIG. 10, an example method 1000 of deactivating or activating the SCG can be implemented in a UE. The method 1000 begins at block 1002, where the UE communicates with an MN and an SN using a first configuration ("the first MN configuration") and a second configuration ("the first SN configuration"), respectively (e.g., events 302A-E, 402A-E, 502A-B, 602A-B).

In some implementations, the first MN configuration pertains to the MCG and includes one or more parameters for at least one serving cell of the MN, and the first SN configuration can include one or more parameters for at least one serving cell of the SN. At block 1004, the UE deactivates 1004 the SCG while continuing to communicate with the MN (e.g., events 316A, 316B, 516A). At block 1006, the UE releases 1006 the first configuration and retains the second configuration.

Figure 11:
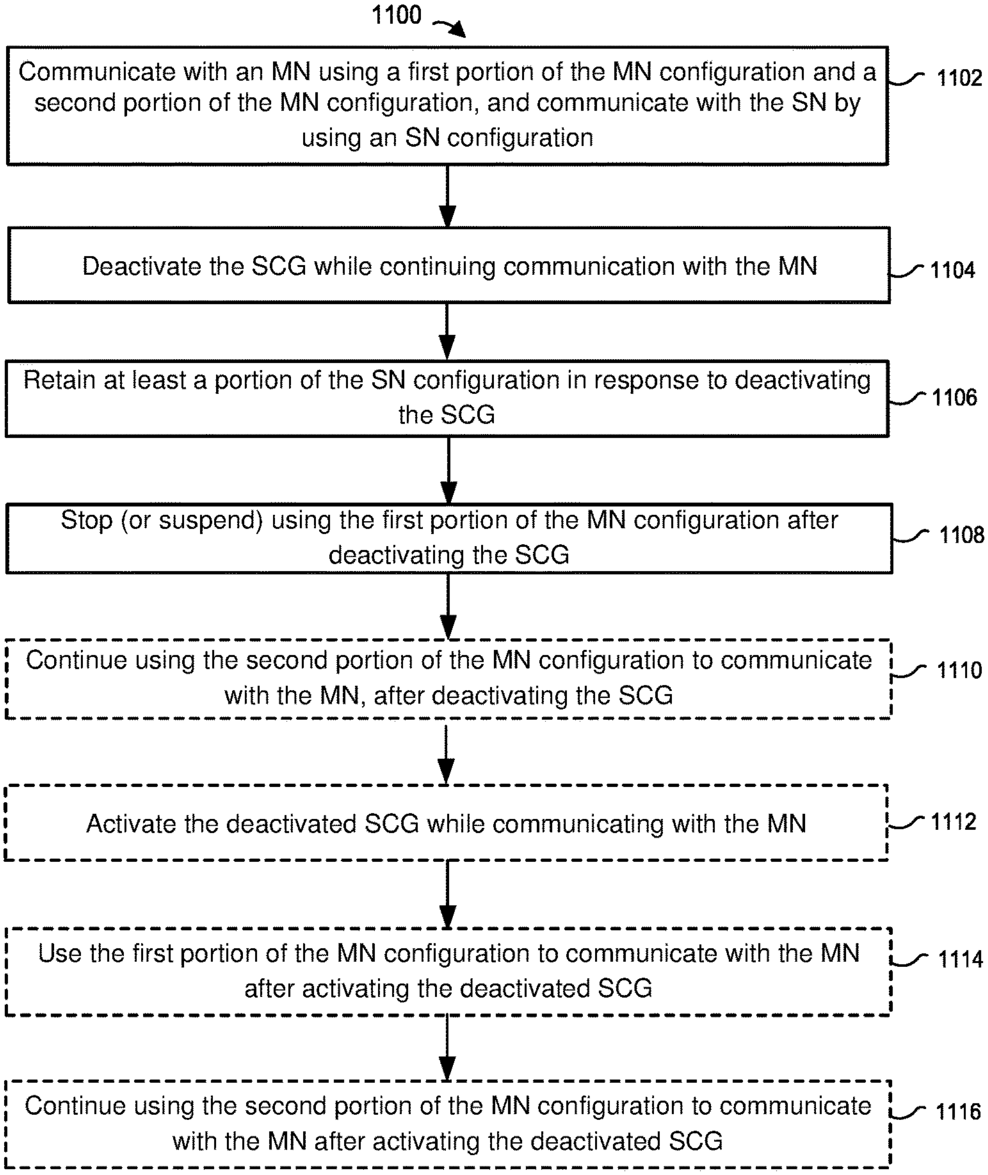
FIG. 11 is a flow diagram of an example method similar to FIG. 10, but in which the UE communicates with the MN using a first and second configuration and with the SN using a third configuration, and reactivates the deactivated SCG before applying the first configuration to the MN.

Next, FIG. 11 depicts a flow diagram of an example method 1100 similar to the method 1000 of FIG. 10, but here the UE initially communicates with the MN using a first and second configuration (or first and second portions of the MN configuration) and with the SN using a third configuration (or the SN configuration), and activates (or reactivates) the deactivated SCG before applying the first configuration to the MN.

More particularly, at block 1102, the UE communicates with an MN using the first and second portions of the MN configuration, and with an SN using the SN configuration. At block 1104, the UE deactivates an SCG while continuing communication with the MN. The UE however retains, at block 1106, at least a portion of the SN configuration. At block 1108, the UE stops using the first portion of the MN configuration. In some implementations, the UE at block 1106 only suspends the use of the first portion of the MN configuration, without discarding the first portion. In other implementations, the UE at block 1106 releases (or discards) the first portion.

In some implementations, the UE continues using the second portion of the MN configuration to communicate with the MN, at block 1110, after the deactivation of the SCG at block 1104. The UE 102 then can activate (or re-activate) the previously deactivated SCG while continuing to communicate with the MN, at block 1112 (e.g., events 346E, 646A). At block 1114, the UE can use the first portion of the MN configuration to communicate with the MN. Alternatively, the UE does not use the first portion of the MN configuration to communicate with the MN after (re)activating the deactivated SCG. At block 1116, the UE continues using the second portion of the MN configuration to communicate with the MN. In some implementations, the UE can use the at least a portion of SN configuration to communicate with the SN after activating the deactivated SCG. In other implementations, the UE can use the SN configuration to communicate with the SN after activating the deactivated SCG.

Figure 12A:
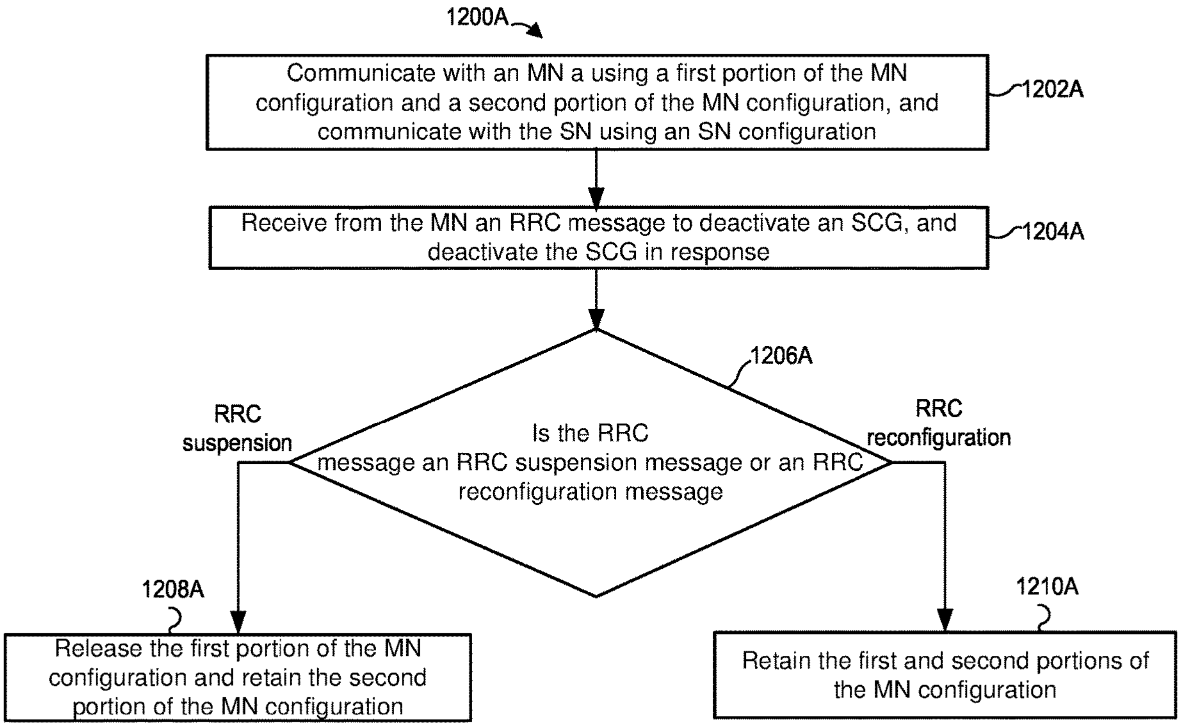
FIG. 12A is a flow diagram of an example method in which the UE receives an RRC message that indicates SCG deactivation, and determines whether to retain some or all of the MN configuration depending on whether the message indicates RRC suspension or RRC reconfiguration.

FIG. 12A is a flow diagram of an example method 1200A according to which the UE receives an RRC message that indicates SCG deactivation and determines whether to retain some or all of the MN configuration depending on whether the message indicates RRC suspension or RRC reconfiguration. In particular, at block 1202A, the UE communicates with an MN using a first portion of the MN configuration and a second portion of the MN configuration, and communicates with an SN using an SN configuration (e.g., events 302A-E, 402A-E, 502A-B, 602A-B).

At block 1204A, the UE receives an RRC message to deactivate an SCG from the MN and deactivates the SCG in response (e.g., events 314A, 316A, 314B, 316B, 514A, 516A, 328A, 528A). The UE determines, at block 1206A, whether the received RRC message relates to RRC suspension or reconfiguration. In response to determining that the RRC message is an RRC suspension message, the UE releases the first portion of the MN configuration and retains the second portion of the MN configuration, at block 1208A. Otherwise, if the UE determines that the RRC message is an RRC reconfiguration message, the UE retains both portions of the MN configuration, at block 1210A.

Figure 12B:
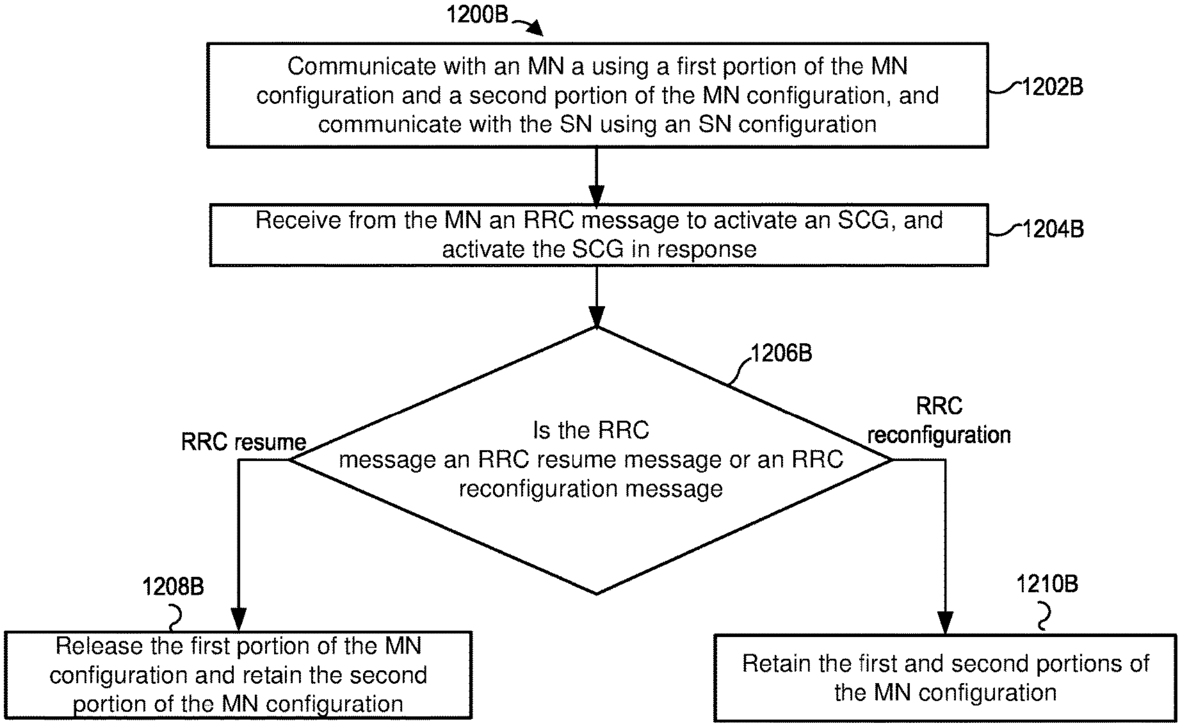
FIG. 12B is a flow diagram of an example method in which the UE receives an RRC message that indicates SCG reactivation, and determines whether to retain some or all of the MN configuration depending on whether the message indicates RRC resumption or RRC reconfiguration.

FIG. 12B is a flow diagram of an example method 1200B according to which the UE receives an RRC message that indicates SCG reactivation, and determines whether to retain some or all of the MN configuration depending on whether the message relates to resuming an RRC connection or RRC reconfiguration.

At block 1202B, the UE communicates with an MN using a first portion of the MN configuration and a second portion of the MN configuration (e.g., events 302A-E, 402A-E, 502A-B, 602A-B). At block 1204B, the UE receives an RRC message to activate a SCG from the MN and (re-)activates the SCG in response (e.g., events 344E, 346E, 409C, 446C, 644A, 646A, 609B). At block 1206B, the UE determines whether the received RRC message relates to resuming an RRC connection or RRC reconfiguration. In response to determining that the RRC message is an RRC resume message, the UE releases the first portion of the MN configuration and retains the second portion of the MN configuration, at block 1208B. Otherwise, if the UE determines that the RRC message is an RRC reconfiguration message, the UE retains both portions of the MN configuration, at block 1210B.

Figure 12C:
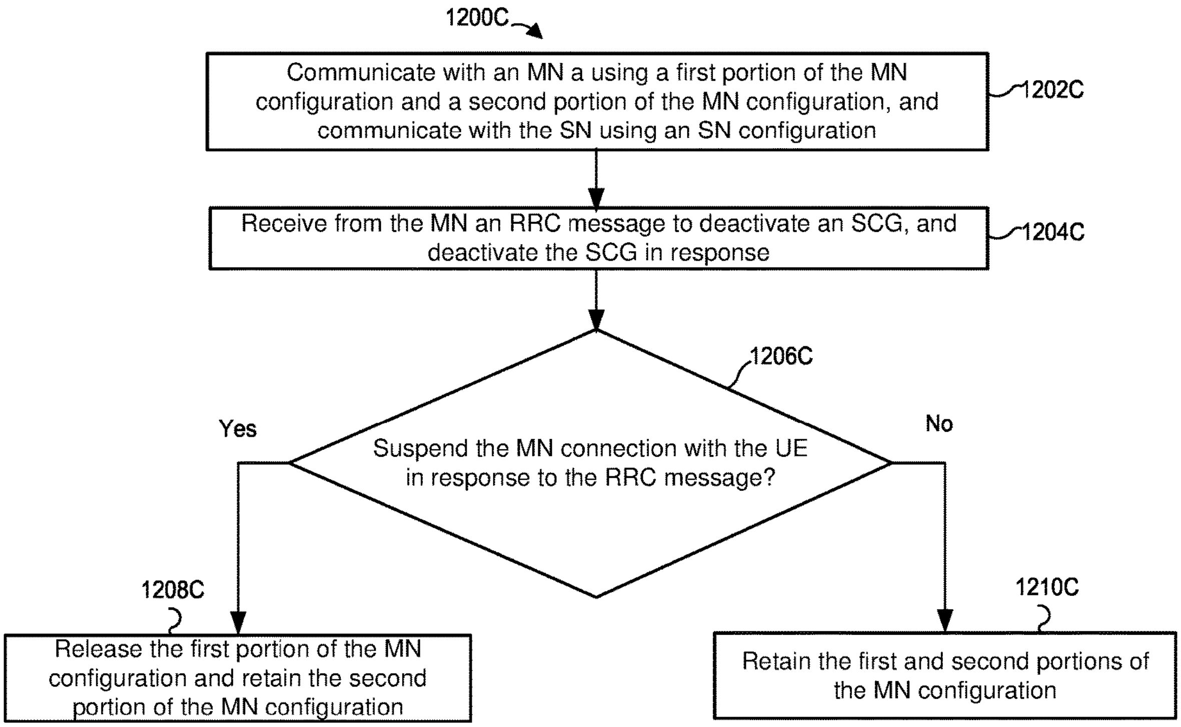
FIG. 12C is a flow diagram of an example method in which the UE receives an RRC message that indicates SCG deactivation, and determines whether to retain some or all of the MN configuration depending on whether the UE also suspends the radio connection between the UE and the MN.

FIG. 12C illustrates a flow diagram of another example method 1200C according to which the UE receives an RRC message that indicates SCG deactivation. According to the method 1200C, the UE determines whether to retain some or all of the MN configuration depending on whether the message indicates that the UE should suspend the MN connection.

At block 1202C, the UE communicates with an MN using a first portion of the MN configuration and a second portion of the MN configuration (e.g., events 302A-E, 402A-E, 502A-B, 602A-B). At block 1204C, the UE receives, from the MN, an RRC message to deactivate a SCG and deactivates the SCG in response (e.g., events 314A, 316A, 314B, 316B, 514A, 516A, 328A, 528A). At block 1206C, the UE determines whether the received RRC message requires that the UE suspends the MN connection, in which case the flow proceeds to block 1208C, or does not require that the UE suspends the MN connection, in which case the flow proceeds to block 1210C. The UE releases the first portion of the MN configuration and retains the second portion of the MN configuration at block 1208C. On the other hand, at block 1210C, the UE retains both portions of the MN configuration.

Figure 13A:
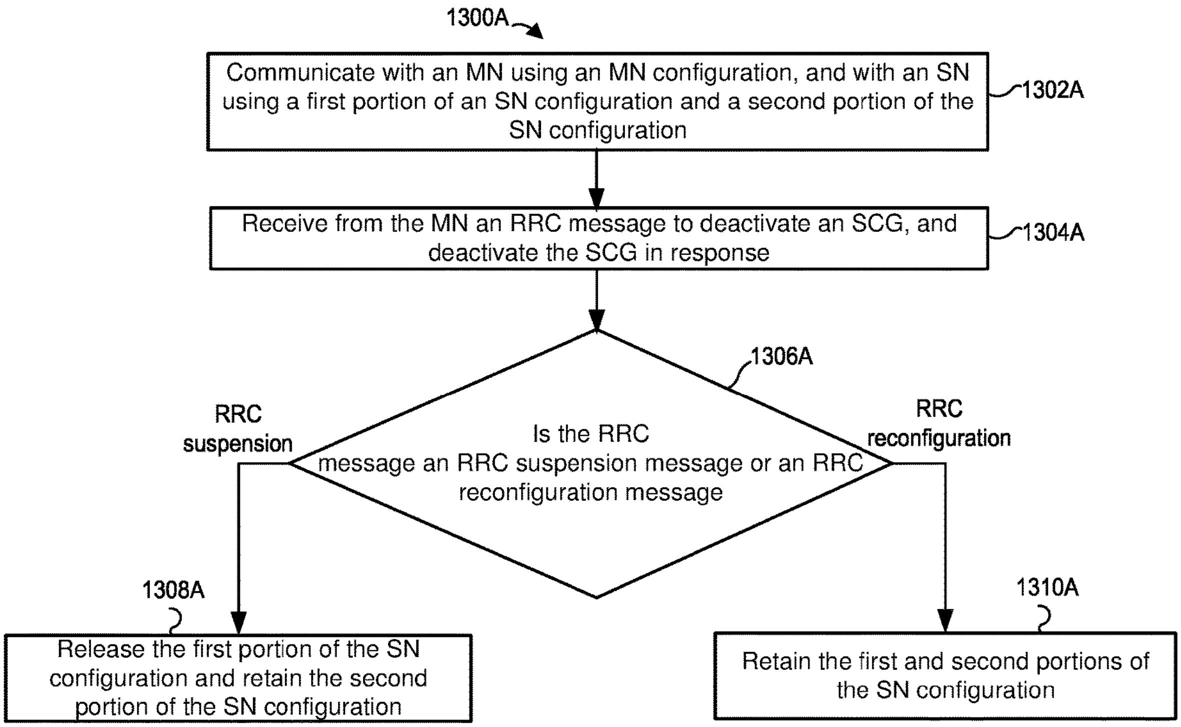
FIG. 13A is a flow diagram of an example method in which the UE receives an RRC message that indicates SCG deactivation, and determines whether to retain some or all of the SN configuration depending on whether the message indicates RRC suspension or RRC reconfiguration.

Now referring to FIG. 13A, the UE according to an example method 1300A receives an RRC message that indicates SCG deactivation and determines whether to retain some or all of the SN configuration, depending on whether the message relates to RRC suspension or RRC reconfiguration. More specifically, at block 1302A, the UE communicates with an MN using an MN configuration, and communicates with an SN using a first portion of an SN configuration and a second portion of the SN configuration (e.g., events 302A-E, 402A-E, 502A-B, 602A-B).

At block 1304A, the UE receives an RRC message to deactivate a SCG from the MN and deactivates the SCG in response (e.g., events 314A, 316A, 314B, 316B, 514A, 516A, 328A, 528A). The UE determines, at block 1306A, whether the received RRC message relates to RRC suspension or reconfiguration. In response to determining that the RRC message is an RRC suspension message, the UE releases the first portion of the SN configuration and retains the second portion of the SN configuration, at block 1308A. Otherwise, if the UE determines that the RRC message is an RRC reconfiguration message, the UE retains both portions of the SN configuration, at block 1310A.

Figure 13B:
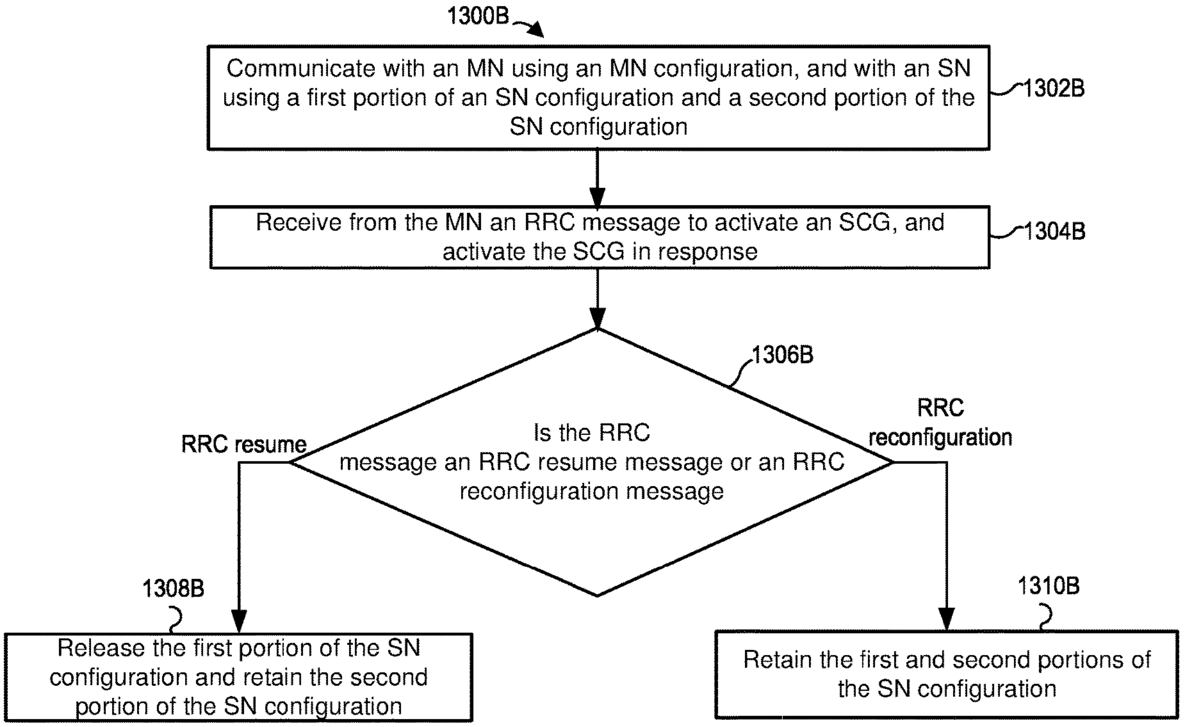
FIG. 13B is a flow diagram of an example method in which the UE receives an RRC message that indicates SCG reactivation, and determines whether to retain some or all of the SN configuration depending on whether the message indicates RRC resumption or RRC reconfiguration.

FIG. 13B is a flow diagram of an example method 1300B according to which the UE receives an RRC message that indicates SCG reactivation, and determines whether to retain some or all of the SN configuration depending on whether the message relates to resuming an RRC connection or RRC reconfiguration. At block 1302B, the UE communicates with an MN using an MN configuration, and communicates with an SN using a first portion of an SN configuration and a second portion of the SN configuration (e.g., events 302A-E, 402A-E, 502A-B, 602A-B).

At block 1304B, the UE receives an RRC message to activate an SCG from the MN and (re-)activates the SCG in response (e.g., events 344E, 346E, 409C, 446C, 644A, 646A, 609B). At block 1306B, the UE determines whether the received RRC message relates to resuming an RRC connection or RRC reconfiguration. In response to determining that the RRC message is an RRC resume message, the UE releases the first portion of the SN configuration and retains the second portion of the SN configuration, at block 1308B. Otherwise, if the UE determines that the RRC message is an RRC reconfiguration message, the UE retains both portions of the MN configuration, at block 1310B.

Figure 13C:
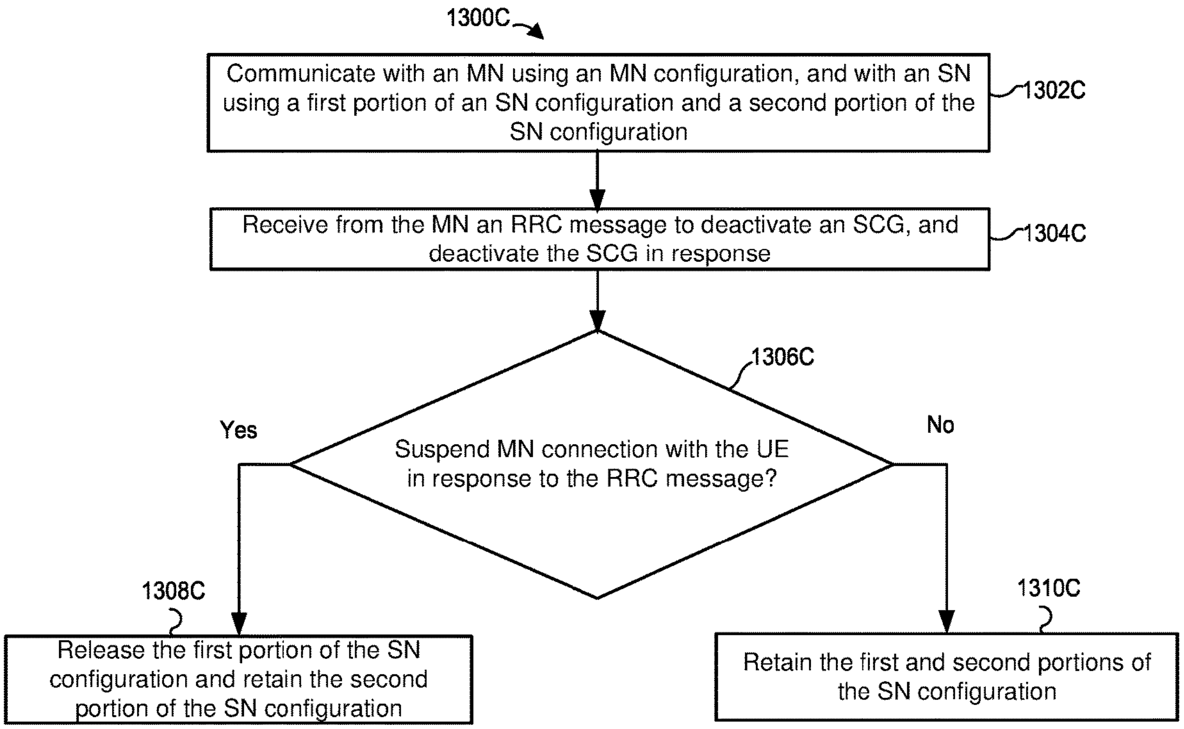
FIG. 13C is a flow diagram of an example method in which the UE receives an RRC message that indicates SCG deactivation, and determines whether to retain some or all of the SN configuration depending on whether the UE also suspends the radio connection between the UE and the MN.

FIG. 13C illustrates a flow diagram of another example method 1300C according to which the UE receives an RRC message that indicates SCG deactivation. According to the method 1300C, the UE determines whether to retain some or all of the SN configuration depending on whether the message indicates that the UE should suspend the MN connection.

At block 1302C, the UE communicates with an MN using an MN configuration, and communicates with an SN using a first portion of an SN configuration and a second portion of the SN configuration (e.g., events 302A-E, 402A-E, 502A-B, 602A-B). At block 1304C, the UE receives, from the MN, an RRC message to deactivate an SCG and deactivates the SCG in response (e.g., events 314A, 316A, 314B, 316B, 514A, 516A, 328A, 528A). At block 1306C, the UE determines whether the received RRC message requires that the UE suspends the MN connection, in which case the flow proceeds to block 1308C, or does not require that the UE suspends the MN connection, in which case the flow proceeds to block 1310C. The UE releases the first portion of the SN configuration and retains the second portion of the SN configuration at block 1308C. On the other hand, at block 1310C, the UE retains both portions of the SN configuration.

Figure 14A:
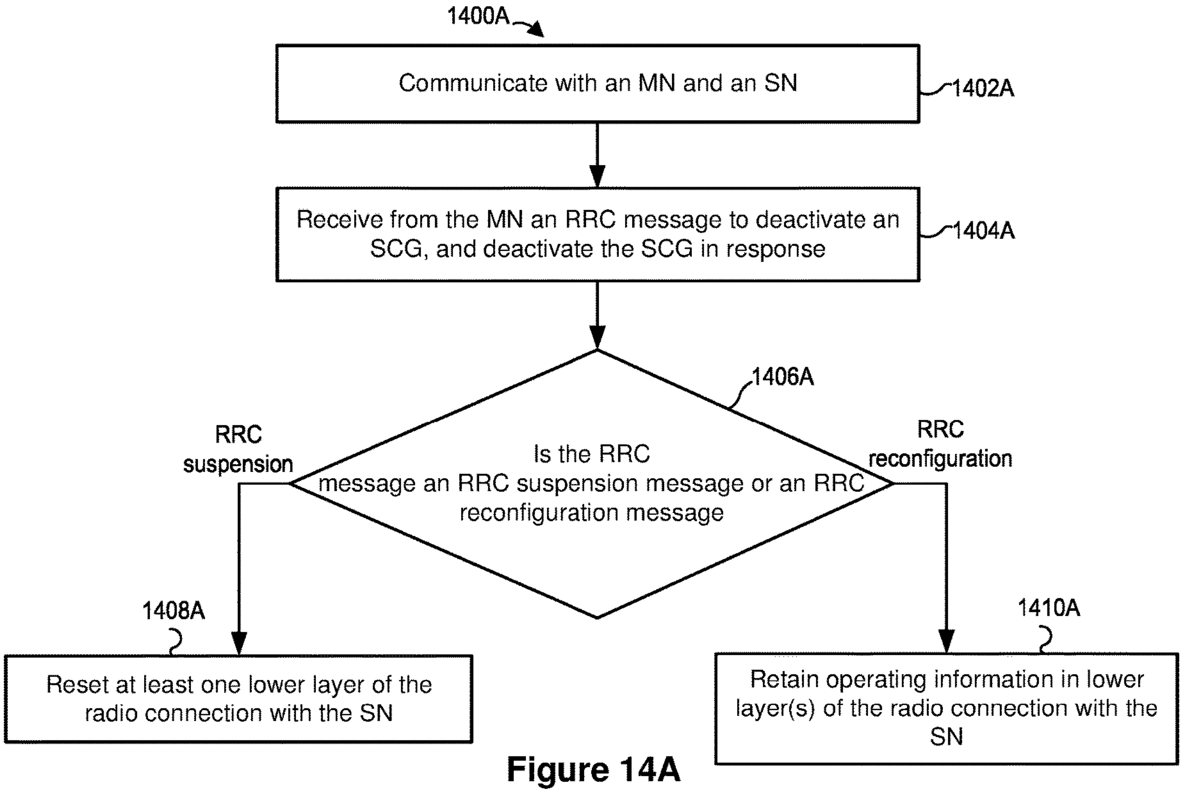
FIG. 14A is a flow diagram of an example method in which the UE receives an RRC message that indicates SCG deactivation, and determines whether the UE should reset or retain the operating information used in at least one lower layer of the radio connection with the SN depending on whether the message indicates RRC suspension or RRC reconfiguration.

Next, FIG. 14A illustrates a flow diagram of an example method 1400A according to which the UE receives an RRC message that indicates SCG deactivation, and determines whether the UE should reset or retain the operating information used in at least one lower layer of the radio connection with the SN depending on whether the message relates to RRC suspension or RRC reconfiguration. At block 1402A, the UE communicates with an MN and an SN (e.g., events 302A-E, 402A-E, 502A-B, 602A-B). Next, at block 1404A, the UE receives an RRC message to deactivate an SCG from the MN and deactivates the SCG in response (e.g., events 314A, 316A, 314B, 316B, 514A, 516A, 328A, 528A).

At block 1406A, the UE determines whether the RRC message relates to RRC suspension or RRC reconfiguration. When the UE determines that the RRC message is an RRC suspension message, the flow proceeds to block 1408A, where the UE resets at least one lower layer for communication with the SN. Otherwise, when the UE determines that the RRC message is an RRC reconfiguration message, the flow proceeds to block 1410A, where the UE retains operating information used in at least one lower layer for communication with the SN.

Figure 14B:
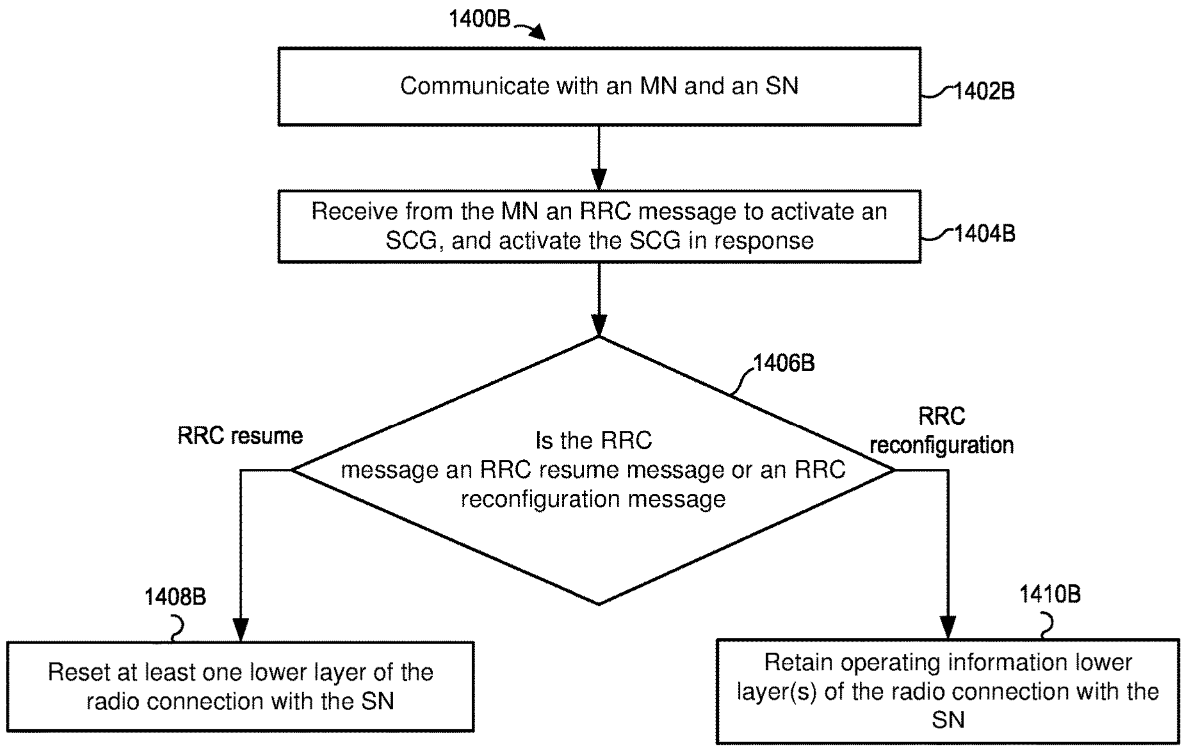
FIG. 14B is a flow diagram of an example method in which the UE receives an RRC message that indicates SCG reactivation, and determines whether the UE should reset or retain the operating information used in at least one lower layer of the radio connection with the SN depending on whether the message indicates RRC resumption or RRC reconfiguration.

FIG. 14B illustrates a flow diagram of another example method 1400B, according to which the UE receives an RRC message that indicates SCG reactivation, and determines whether the UE should reset or retain the operating information used in at least one lower layer of the radio connection with the SN depending on whether the message indicates RRC resumption or RRC reconfiguration. In particular, the UE at block 1402B communicates with an MN and an SN (e.g., events 302A-E, 402A-E, 502A-B, 602A-B), and at block 1404B the UE receives an RRC message to activate an SCG from the MN indicating that the UE should (re-) activate an SCG and activates the SCG in response (e.g., events 344E, 346E, 409C, 446C, 644A, 646A, 609B).

At block 1406B, the UE determines whether the received RRC message relates to resuming an RRC connection or RRC reconfiguration. In response to determining that the RRC message is an RRC resume message, the UE resets at least one lower layer for communication with the SN, at block 1408B. Otherwise, if the UE determines that the RRC message is an RRC reconfiguration message, the UE retains operating information used in at least one lower layer for communication with the SN, at block 1410B.

Figure 14C:
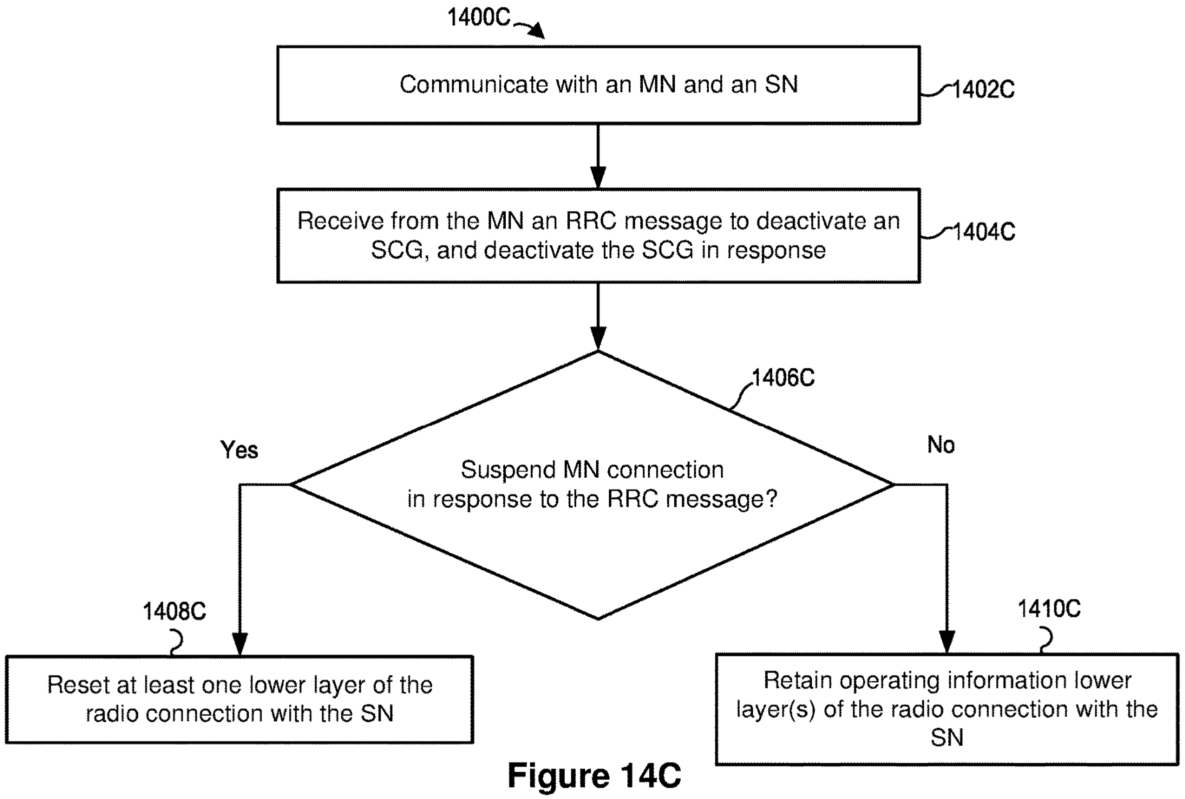
FIG. 14C is a flow diagram of an example method in which the UE receives an RRC message that indicates SCG deactivation, and determines whether the UE should reset or retain the operating information used in at least one lower layer of the radio connection with the SN depending on whether the UE also suspends the radio connection between the UE and the MN.

FIG. 14C is a flow diagram of an example method 1400C according to which the UE receives an RRC message that indicates SCG deactivation and determines whether the UE should reset or retain the operating information used in at least one lower layer of the radio connection with the SN depending on whether the received RRC message indicates that the UE should suspend the MN connection.

At block 1402C, the UE communicates with an MN and an SN (e.g., events 302A-E, 402A-E, 502A-B, 602A-B). At block 1404C, the UE receives, from the MN, an RRC message to deactivate an SCG and deactivates the SCG in response (e.g., events 314A, 316A, 314B, 316B, 514A, 516A, 328A, 528A). At block 1406C, the UE determines whether the received RRC message requires that the UE suspends the MN connection, in which case the flow proceeds to block 1408C, or does not require that the UE suspends the MN connection, in which case the flow proceeds to block 1410C. At block 1408C, the UE resets at least one lower layer for communication with the SN. At block 1410C, the UE retains operating information used in at least one lower layer for communication with the SN.

Figure 15A:
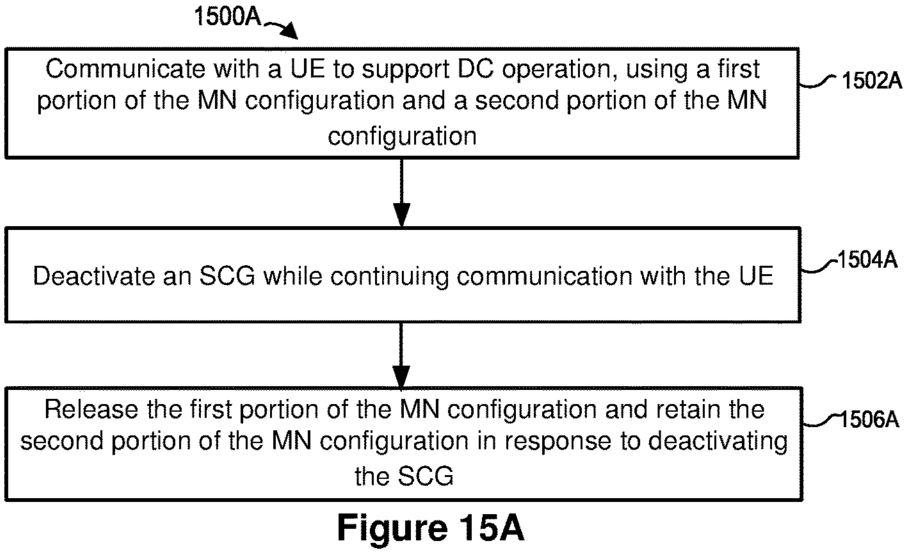
FIG. 15A is a flow diagram of an example method for managing MN configuration when an SCG for a UE is deactivated, which can be implemented in an MN.

Now referring to FIG. 15A, an example method 1500A for managing MN configuration, when an SCG for a UE is deactivated, can be implemented in an MN. At block 1502A, the MN communicates with a UE to support DC operation, using a first portion of the MN configuration and a second portion of the MN configuration (e.g., events 302A-E, 402A-E, 502A-B, 602A-B). At block 1504A, the MN deactivates the SCG while continuing communication with the UE (e.g., events 310A, 322A-D, 522A, 572A). Then, at block 1506A, the MN releases the first portion of the MN configuration and retains the second portion of the MN configuration.

Figure 15B:
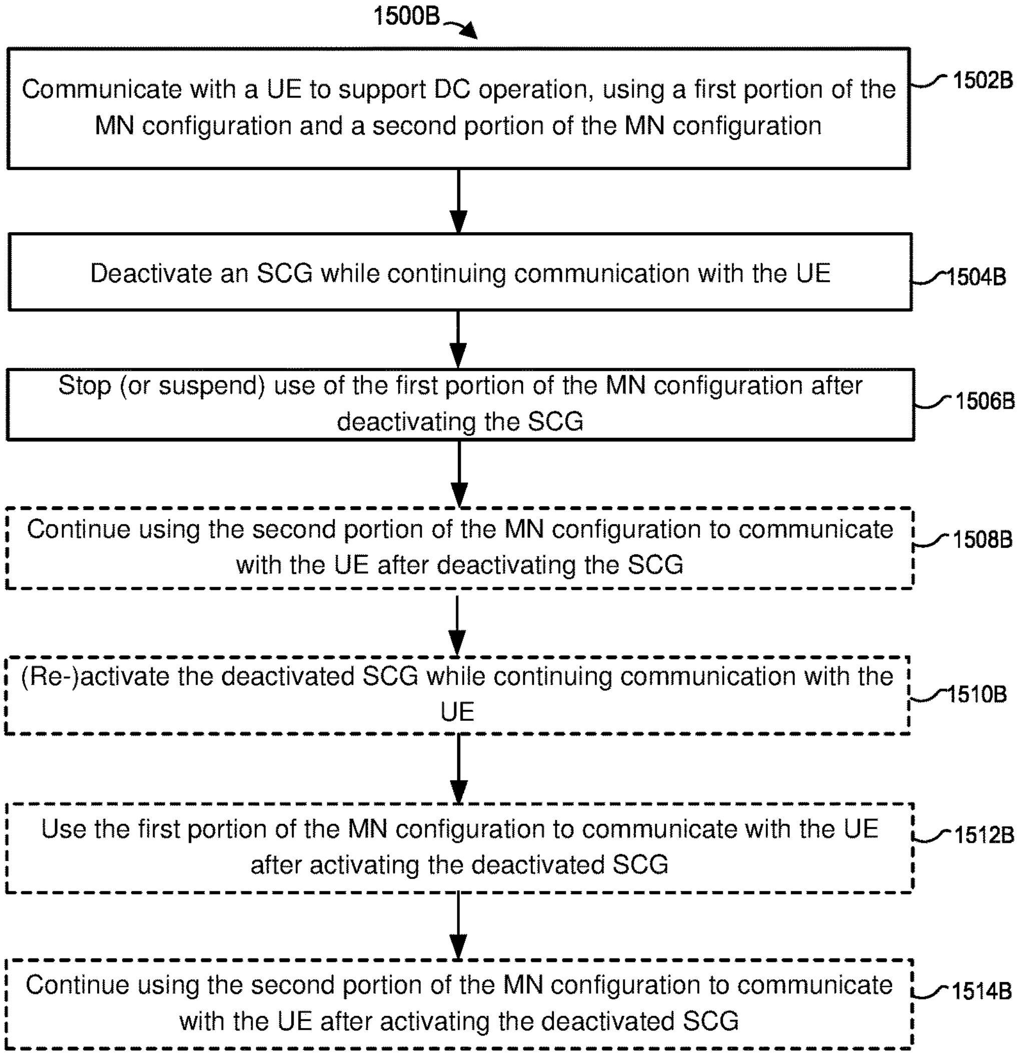
FIG. 15B is a flow diagram of an example method for managing MN configuration when an SCG for a UE is deactivated and subsequently reactivated, which can be implemented in an MN.

FIG. 15B is a flow diagram of a method 1500B in an MN of managing MN configuration when an SCG for a UE is deactivated and subsequently (re)activated. The method 1500B starts at block 1502B, where the MN communicates with a UE to support DC operation, using a first portion of the MN configuration and a second portion of the MN configuration (e.g., events 302A-E, 402A-E, 502A-B, 602A-B). At block 1504B, the MN deactivates the SCG while continuing communication with the UE (e.g., events 310A, 322A-D, 522A, 572A).

Next, at block 1506B, the MN stops using the first portion of the MN configuration. In some implementations, the MN suspends the first portion of the MN configuration rather than discarding the first portion completely. In other implementations, the MN at block 1506 releases (or discards) the first portion. In some implementations, the flow proceeds to block 1508B, where the MN continues using the second portion of the MN configuration. Then, at block 1510B, MN can (re-)activate the deactivated SCG while continuing to communicate with the UE (e.g., events 336E, 338E, 636A, 676A). At block 1512B, the MN can use the first portion of the MN configuration after (re)activating the deactivated SCG and, at block 1514B, communicate with the UE while continuing to use the second portion of the MN configuration after (re)activating the deactivated SCG. Alternatively, the MN does not use the first portion of the MN configuration to communicate with the UE after (re)activating the deactivated SCG.

Figure 16A:
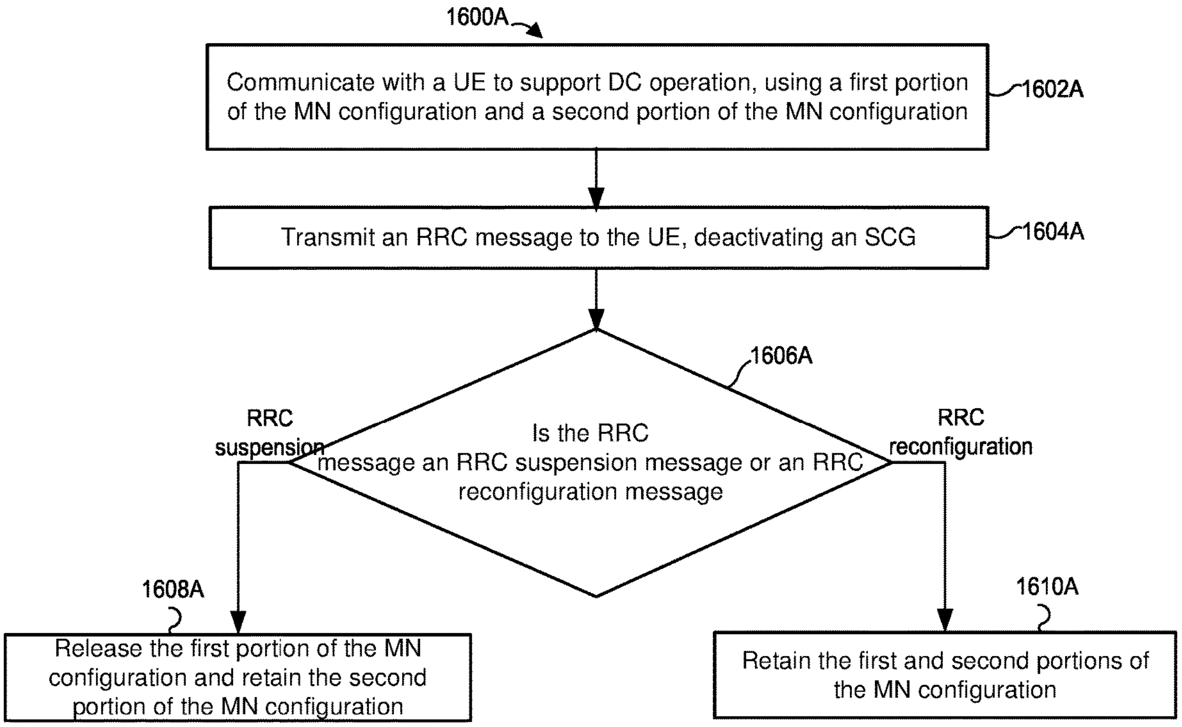
FIG. 16A is a flow diagram of an example method in which the MN transmits an RRC message that indicates SCG deactivation, and determines whether to retain some or all of the MN configuration depending on whether the message indicates RRC suspension or RRC reconfiguration.

FIG. 16A is a flow diagram of an example method 1600A according to which the MN transmits, to a UE, an RRC message that indicates SCG deactivation and determines whether to retain some or all of the MN configuration depending on whether the message indicates RRC suspension or RRC reconfiguration. At block 1602A, the MN communicates with the UE using a first portion of the MN configuration and a second portion of the MN (e.g., events 302A-E, 402A-E, 502A-B, 602A-B). Next, at block 1604A, the MN transmits an RRC message to the UE, to indicate SCG deactivation (e.g., events 314A, 314B, 514A, 328A, 528A). At block 1606A, the MN determines whether the transmitted RRC message relates to RRC suspension or reconfiguration. In response to determining that the RRC message is an RRC suspension message, at block 1608A, the MN releases the first portion of the MN configuration and retains the second portion of the MN configuration. Otherwise, if the MN determines that the RRC message is an RRC reconfiguration message, the MN retains both portions of the MN configuration, at block 1610A.

Figure 16B:
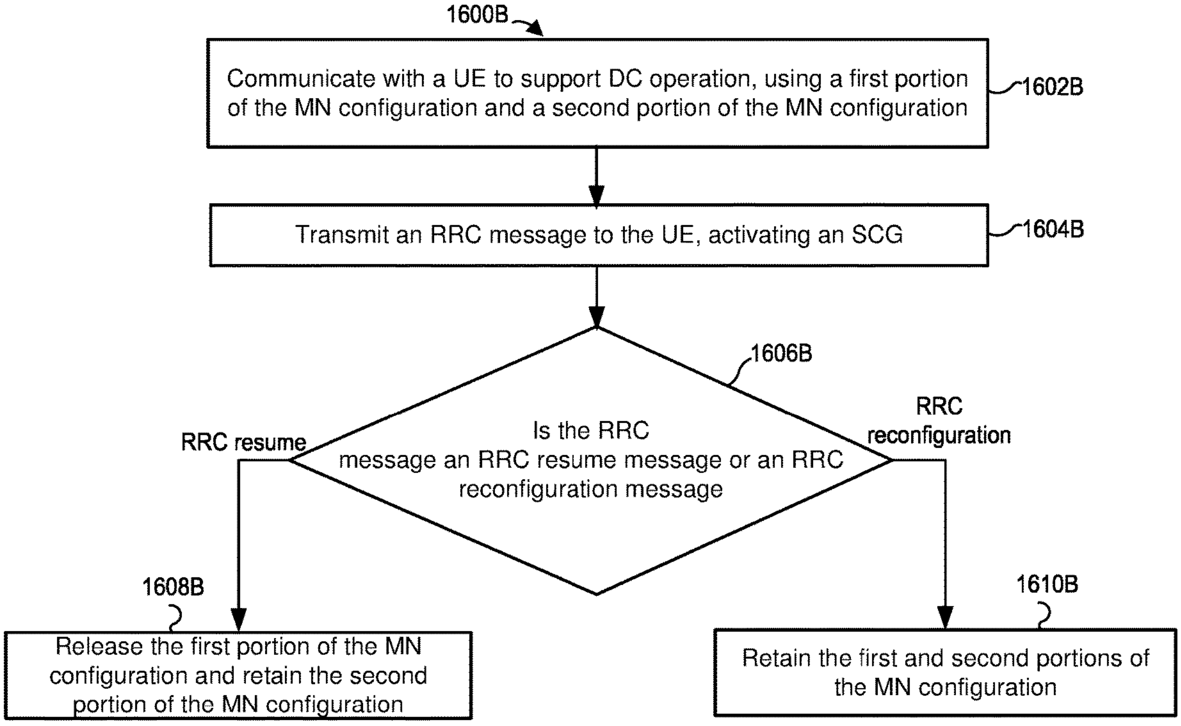
FIG. 16B is a flow diagram of an example method in which the MN transmits an RRC message that indicates SCG reactivation, and determines whether to retain some or all of the MN configuration depending on whether the message indicates RRC resumption or RRC reconfiguration.

FIG. 16B is a flow diagram of an example method 1600B according to which the MN transmits an RRC message that indicates SCG (re)activation, and determines whether to retain some or all of the MN configuration depending on whether the message relates to resuming an RRC connection or RRC reconfiguration. At block 1602B, the MN communicates with a UE using a first portion of the MN configuration and a second portion of the MN configuration (e.g., events 302A-E, 402A-E, 502A-B, 602A-B). At block 1604B, the MN transmits an RRC message to the UE, so as to (re-)activate the deactivated SCG (e.g., events 344E, 409C, 644A, 609B). At block 1606B, the MN determines whether the received RRC message relates to resuming an RRC connection or RRC reconfiguration. In response to determining that the RRC message is an RRC resume message, the MN releases the first portion of the MN configuration and retains the second portion of the MN configuration, at block 1608B. Otherwise, if the MN determines that the RRC message is an RRC reconfiguration message, the MN retains both portions of the MN configuration, at block 1610B.

Figure 16C:
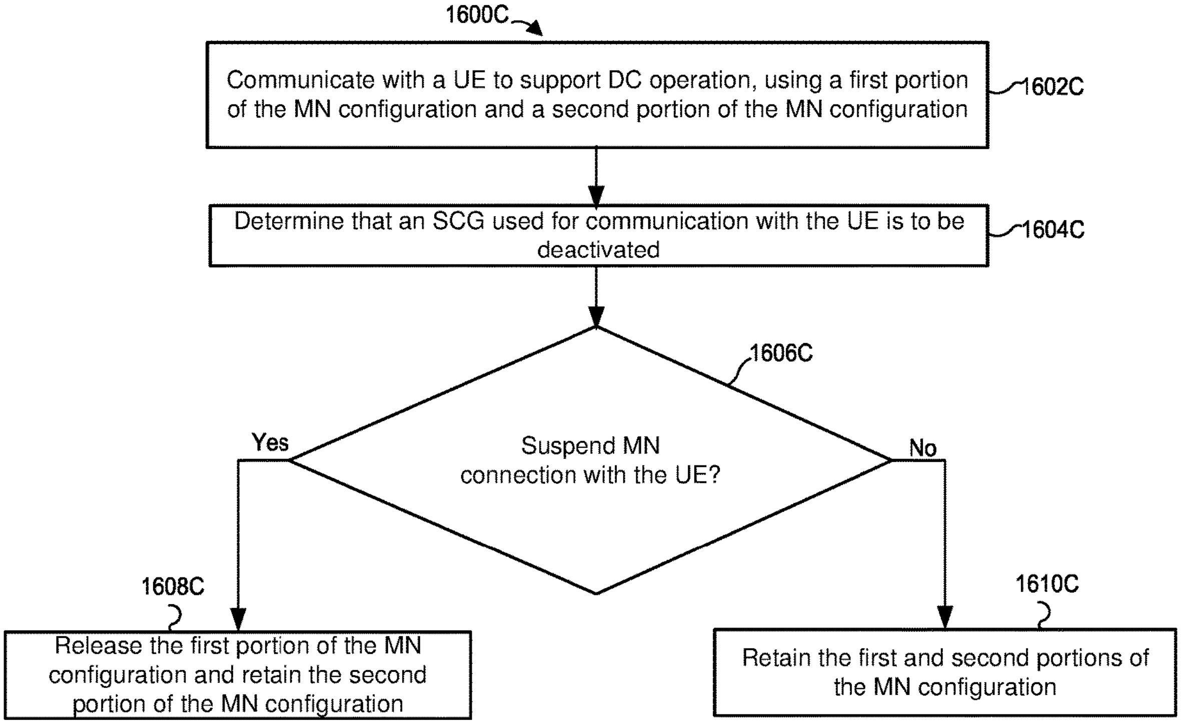
FIG. 16C is a flow diagram of an example method in which the MN determines that the SCG is deactivated, and determines whether to retain some or all of the MN configuration depending on whether the radio connection between the UE and the MN also is suspended.

FIG. 16C illustrates a flow diagram of another example method 1600C according to which the MN transmits an RRC message that indicates SCG deactivation and determines whether to retain some or all of the MN configuration depending on whether the message indicates that the UE 102 should suspend the MN connection. The method 1600C begins at block 1602C, where the MN communicates with a UE using a first portion of the MN configuration and a second portion of the MN configuration (e.g., events 302A-E, 402A-E, 502A-B, 602A-B). At block 1604C, the MN determines to deactivate an SCG for the UE 102 (e.g., events 308A, 508A). At block 1606C, the MN determines whether to suspend the MN connection with the UE, in which case the flow proceeds to block 1608C, or not suspend the MN connection, in which case the flow proceeds to block 1610C. The MN releases the first portion of the MN configuration and retains the second portion of the MN configuration at block 1608C. On the other hand, at block 1610C, the MN retains both portions of the MN configuration.

Figure 17A:
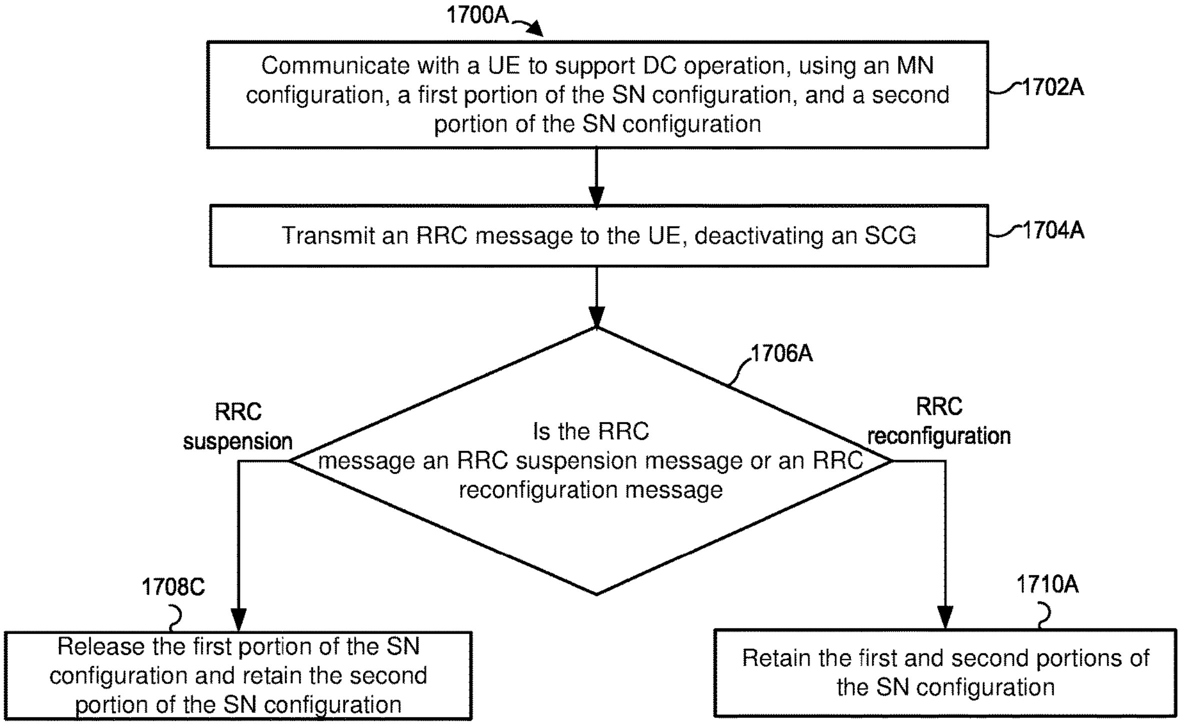
FIG. 17A is a flow diagram of an example method in which the RAN transmits an RRC message that indicates SCG deactivation, and determines whether to retain some or all of the SN configuration depending on whether the message indicates RRC suspension or RRC reconfiguration.
Figure 17B:
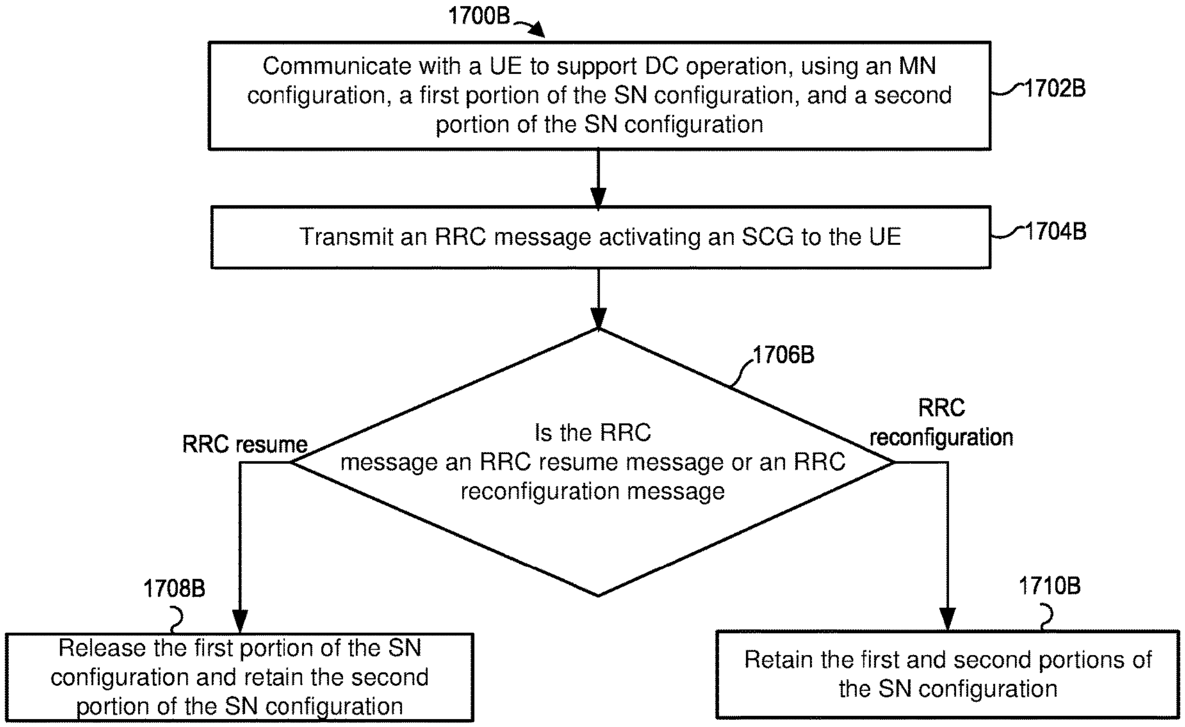
FIG. 17B is a flow diagram of an example method in which the RAN transmits an RRC message that indicates SCG reactivation, and determines whether to retain some or all of the SN configuration depending on whether the message indicates RRC resumption or RRC reconfiguration.
Figure 17C:
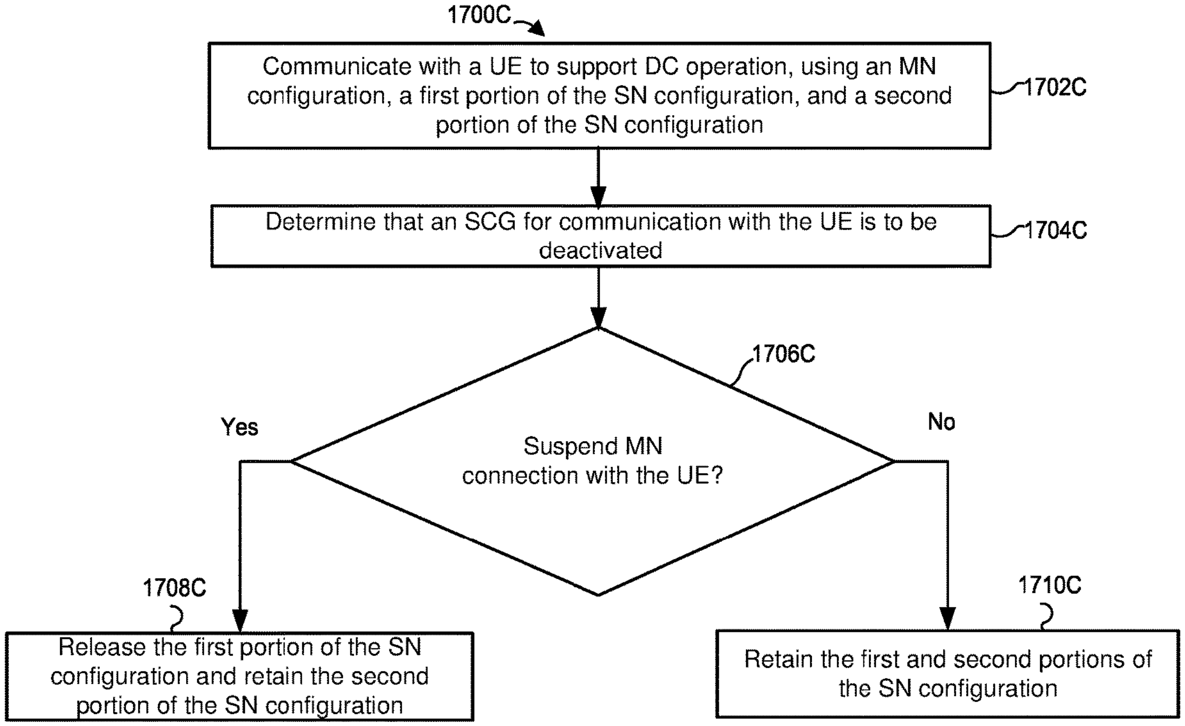
FIG. 17C is a flow diagram of an example method in which the RAN determines that the SCG is deactivated, and determines whether to retain some or all of the MN configuration depending on whether the radio connection between the UE and the MN also is suspended.

Next, FIGS. 17A-C illustrate example methods 1700A-C for releasing and/or retaining portions of the SN configuration, which can be implemented in the RAN 105 for example.

The method 1700A begins at block 1702A, where the RAN communicates with a UE using an MN configuration, a first portion of the SN configuration, and a second portion of the SN configuration (e.g., events 302A-E, 402A-E, 502A-B, 602A-B). At block 1704A, the RAN transmits an RRC message to the UE, to deactivate an SCG (e.g., events 314A, 314B, 315C, 514A, 328A, 528A). Next, at block 1706A, the RAN determines whether the RRC message indicates RRC suspension, in which case the flow proceeds to block 1708A, or RRC reconfiguration, in which case the flow proceeds to block 1710A. At block 1708A, the RAN releases the first portion of the SN configuration and retains the second portion of the SN configuration. At block 1710A, the RAN retains both portions of the SN configuration.

The method 1700B begins at block 1702B, where the RAN communicates with a UE using an MN configuration, a first portion of the SN configuration, and a second portion of the SN configuration (e.g., events 302A-E, 402A-E, 502A-B, 602A-B). At block 1704B, the RAN transmits an RRC message to the UE, so as to (re-)activate the deactivated SCG (e.g., events 344E, 409C, 644A, 609B). Next, at block 1706B, the RAN determines whether the RRC message relates to resuming an RRC connection, in which case the flow proceeds to block 1708B, or RRC reconfiguration, in which case the flow proceeds to block 1710B. At block 1708B, the RAN releases the first portion of the SN configuration and retains the second portion of the SN configuration. At block 1710B, the RAN retains both portions of the SN configuration.

The method 1700C begins at block 1702C, where the RAN communicates with a UE using an MN configuration, a first portion of the SN configuration, and a second portion of the SN configuration. At block 1704C, the RAN determines that the MN and/or the SN should deactivate the SCG for the UE. Next, at block 1706C, the RAN determines whether the RAN should suspend the MN connection with the UE, in which case the flow proceeds to block 1708C, or not suspend the MN connection, in which case the flow proceeds to block 1710C. At block 1708C, the RAN releases the first portion of the SN configuration and retains the second portion of the SN configuration. At block 1710C, the RAN retains both portions of the SN configuration.

Figure 18A:
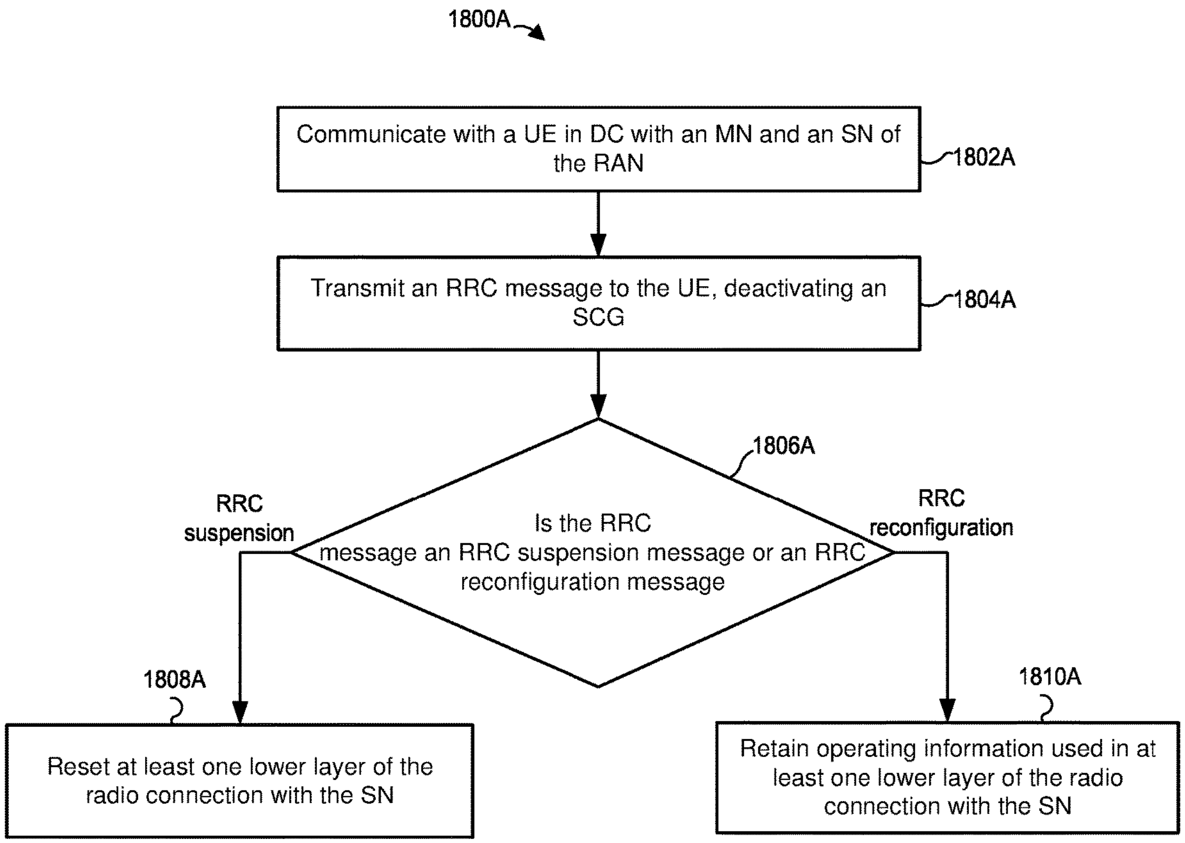
FIG. 18A is a flow diagram of an example method in which the RAN transmits an RRC message that indicates SCG deactivation, and determines whether the RAN should reset or retain the operating information used in at least one lower layer of the radio connection with the SN depending on whether the message indicates RRC suspension or RRC reconfiguration.
Figure 18B:
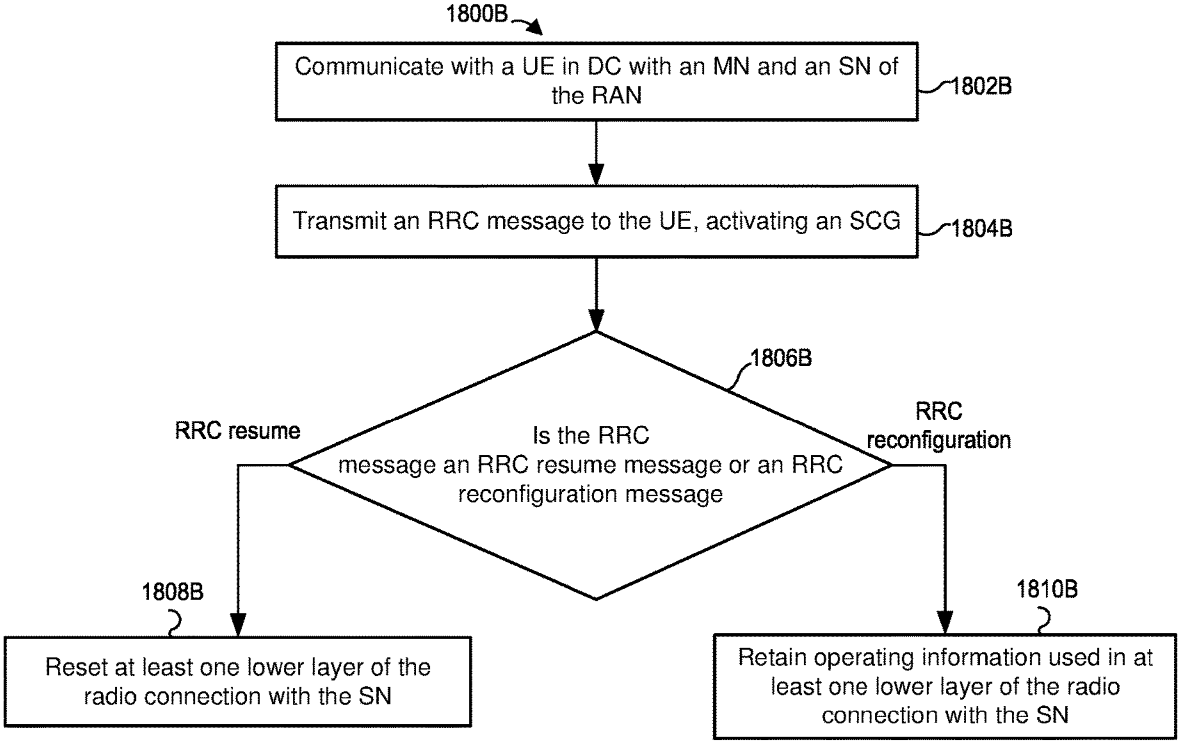
FIG. 18B is a flow diagram of an example method in which the RAN transmits an RRC message that indicates SCG reactivation, and determines whether the RAN should reset or retain the operating information used in at least one lower layer of the radio connection with the SN depending on whether the message indicates RRC resumption or RRC reconfiguration.
Figure 18C:
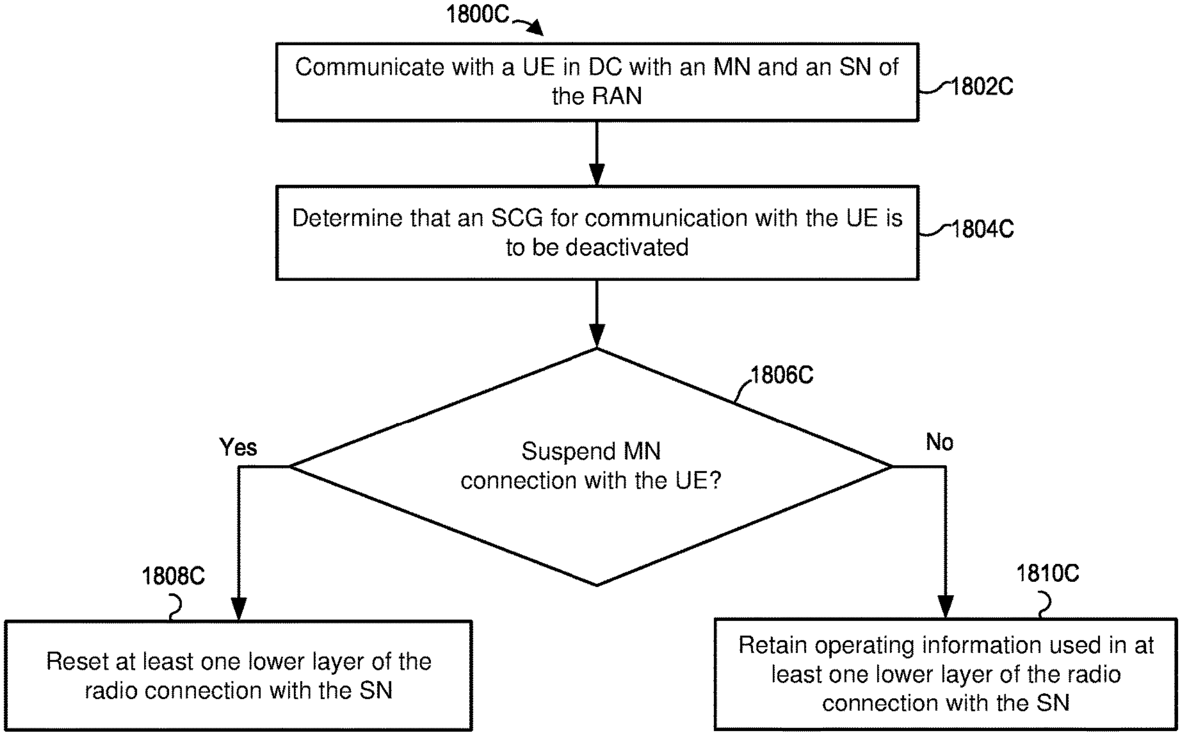
FIG. 18C is a flow diagram of an example method in which the RAN transmits an RRC message that indicates SCG deactivation, and determines whether the RAN should reset or retain the operating information used in at least one lower layer of the radio connection with the SN depending on whether the radio connection between the UE and the MN also is suspended.

Next, FIGS. 18A-C illustrate example methods 1700A-C for resetting and/or retaining the operating information used in at least one lower layer of the radio connection between a UE and an SN.

The method 1800A begins at block 1802A, where the RAN communicates with a UE in DC (e.g., events 302A-E, 402A-E, 502A-B, 602A-B). At block 1804A, the RAN transmits an RRC message to the UE, to deactivate an SCG (e.g., events 314A, 314B, 315C, 514A, 328A, 528A). Next, at block 1806A, the RAN determines whether the RRC message indicates RRC suspension, in which case the flow proceeds to block 1808A, or RRC reconfiguration, in which case the flow proceeds to block 1810A. At block 1808A, the RAN resets at least one lower layer of the radio connection between the SN and the UE. At block 1810A, the RAN retains the operating information of the lower layers of the radio connection between a UE and an SN.

The method 1800B begins at block 1800B, where the RAN communicates with a UE in DC. At block 1804B, the RAN transmits an RRC message to the UE, so as to (re-)activate the deactivated SCG (e.g., events 344E, 409C, 644A, 609B). Next, at block 1806B, the RAN determines whether the RRC message relates to resuming an RRC connection, in which case the flow proceeds to block 1808B, or RRC reconfiguration, in which case the flow proceeds to block 1810B. At block 1808B, the RAN resets at least one lower layer of the radio connection between the SN and the UE. At block 1810B, the RAN retains the operating information of the lower layers of the radio connection between a UE and an SN.

The method 1800C begins at block 1800C, where the RAN communicates with a UE in DC. At block 1804C, the RAN determines that the MN and/or the SN should deactivate SCG for the UE. Next, at block 1806C, the RAN determines whether the RAN should suspend the MN connection with the UE, in which case the flow proceeds to block 1808C, or not suspend the MN connection, in which case the flow proceeds to block 1810C. At block 1808C, the RAN resets at least one lower layer of the radio connection between the SN and the UE. At block 1810C, the RAN retains the operating information of the lower layers of the radio connection between a UE and an SN.

Figure 19:
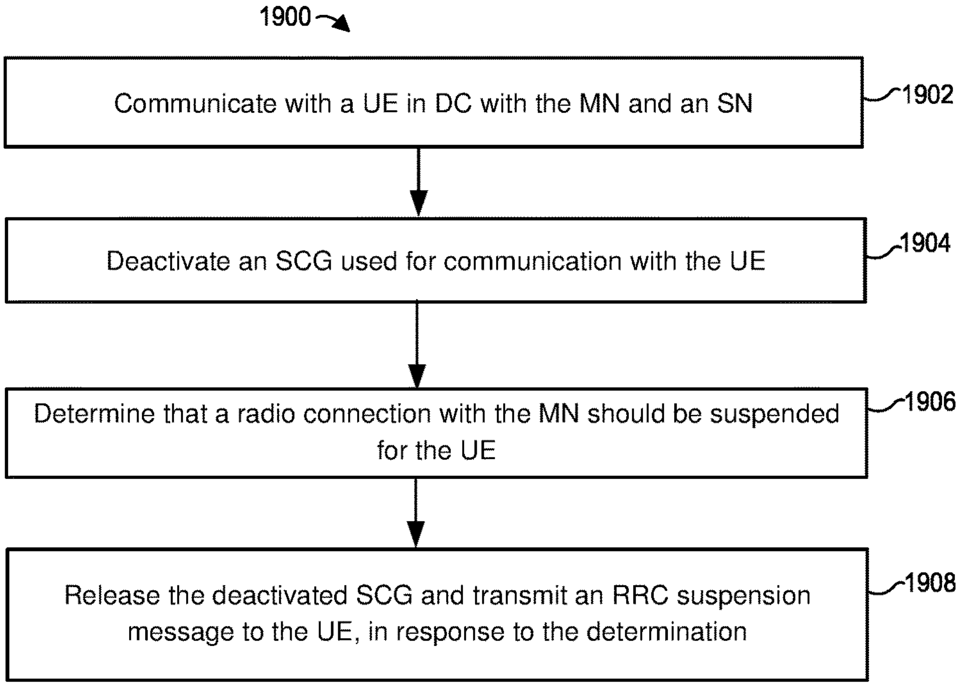
FIG. 19 is a flow diagram of an example method of deactivating or activating the SCG in FIG. 3A-6B, in which the RAN transmits a message to the UE to suspend a radio connection with the MN and releases the deactivated SCG.

Next, FIG. 19 illustrates a flow diagram of an example method 1900 of deactivating or activating the SCG, which can be implemented in the RAN. The method 1900 begins at block 1902, where the RAN communicates with a UE to support DC operation (e.g., events 302A-E, 402A-E, 502A-B, 602A-B). At block 1904, the RAN deactivates the SCG for the UE (e.g., events 322A-D, 522A-B). The, at block 1906, the RAN determines that the MN should suspend the radio connection between the MN and the UE (e.g., events 324A, 524A). At block 1908, the RAN releases the deactivated SCG and transmits an RRC suspension message to the UE.

Figure 20:
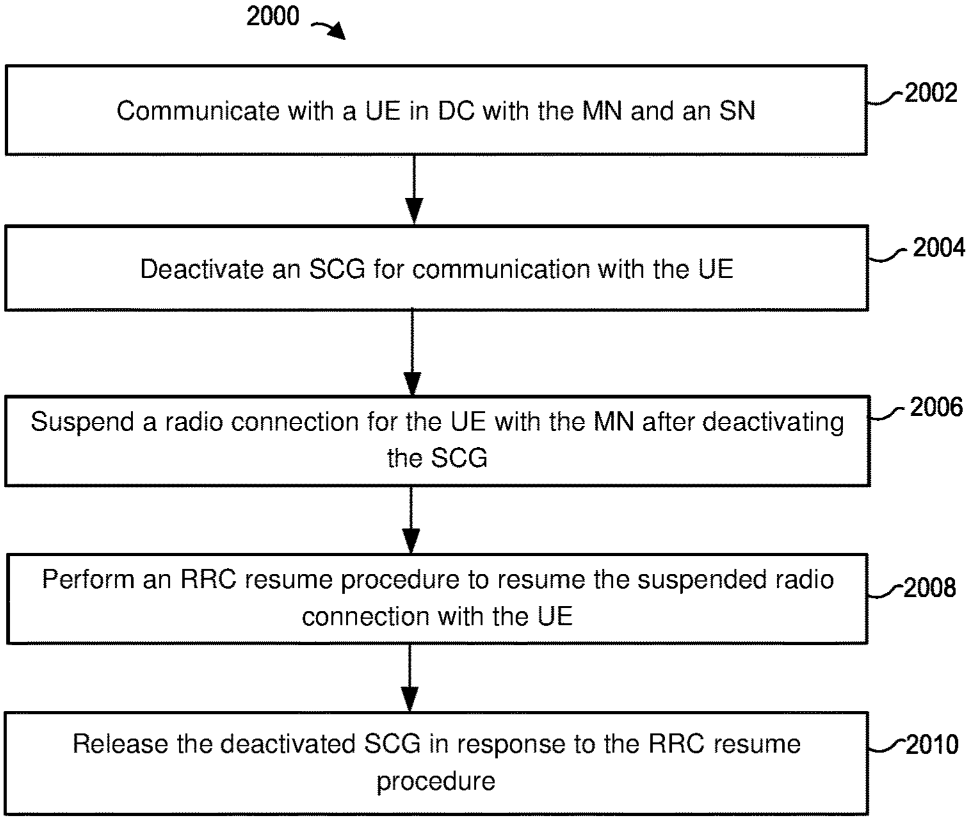
FIG. 20 is a flow diagram of an example method similar to FIG. 19, but in which the RAN resumes suspended radio connections with the UE before releasing the deactivated SCG.

FIG. 20 depicts a flow diagram of another example method 2000, according to which the RAN resumes suspended radio connections with the UE before releasing the deactivated SCG. The method 2000 begins at block 2002, where the RAN communicates with a UE to support DC (e.g., events 302A-E, 402A-E, 502A-B, 602A-B). At block 2004, the RAN deactivates the SCG for the UE (e.g., events 322A-D, 522A-B). Next, at block 2006, the RAN suspends a radio connection between the MN and the UE (e.g., events 326A, 328A, 526A, 528A). The RAN then performs an RRC resume procedure to resume the suspended radio connection between the MN and the UE, at block 2008 (events 404, 408, 412). At block 2010, the RAN releases the deactivated SCG.

Figure 21A:
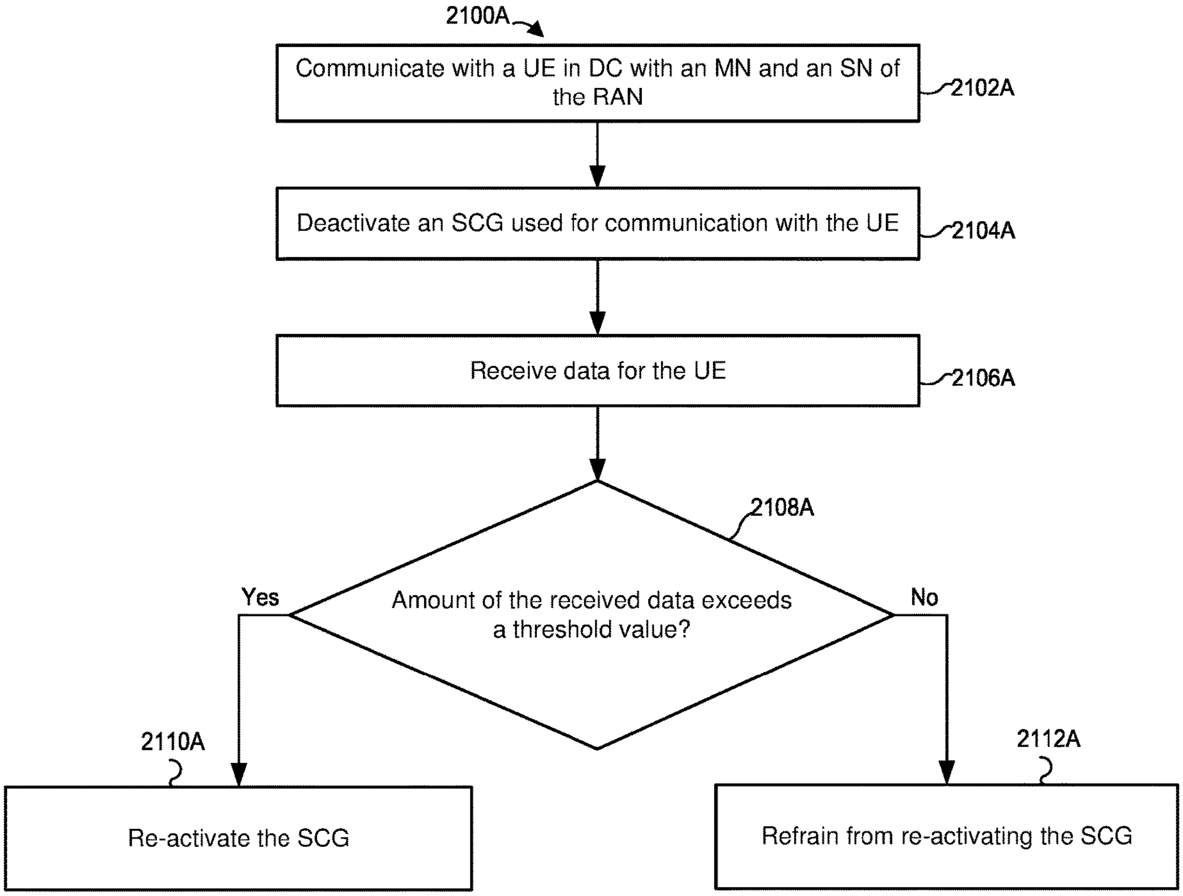
FIG. 21A is a flow diagram of an example method according to which the RAN determines whether a deactivated SCG should reactivated for a UE depending on the amount of received data.

Next, FIG. 21A illustrates a flow diagram of an example method 2100A according to which the RAN determines whether a deactivated SCG should be reactivated for a UE depending on the amount of received data. At block 2102A, the RAN communicates with a UE to support DC operation (e.g., events 302A-E, 402A-E, 502A-B, 602A-B). At block 2104A, while in communication with the UE, the RAN deactivates an SCG (e.g., events 322A-D, 522A-B). At block 2106A, the RAN receives data for the UE from a CN, for example. At block 2108A, the RAN determines whether the amount of received data exceeds a certain threshold value. The flow proceeds to block 2110A when the amount exceeds the threshold value, and proceeds to block 2112A when the amount does not exceed the threshold value. At block 2110A, the RAN initiates (re-)activation of the deactivated SCG (e.g., event 380E, 437B, 439B, 442B, 480B, 405C, 430C, 432C 442C, 409C, 636A, 676A, 678A, 644A, 642A, 605B, 676B, 678B, 609B). At block 2112A, on the other hand, the RAN refrains from activating the deactivated SCG. Thus, according to the method 2100A, the RAN determines whether the MN and/or the SN should (re-) activate the deactivated SCG based on whether there is sufficient data activity on the SCG.

Figure 21B:
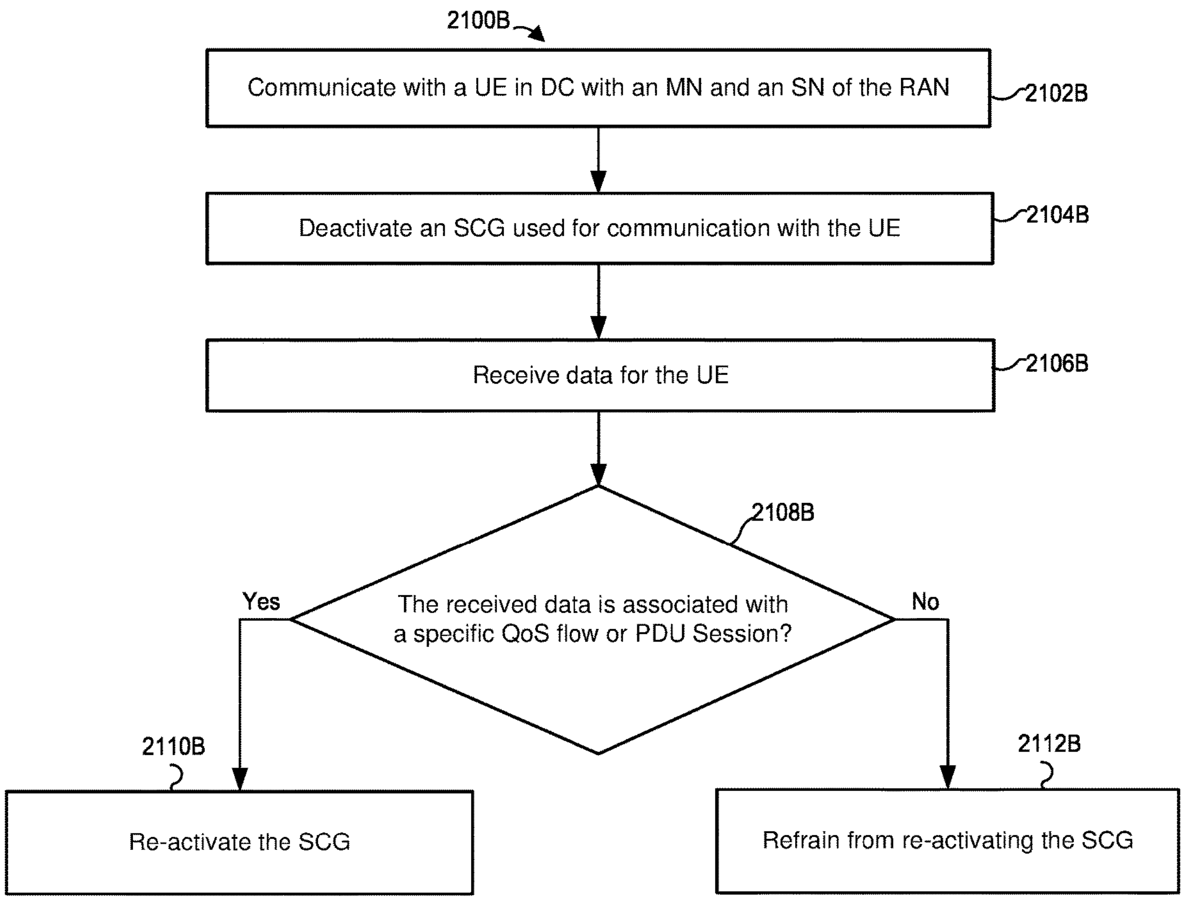
FIG. 21B is a flow diagram of an example method according to which the RAN determines whether a deactivated SCG should reactivated for a UE depending on whether data associated with a particular quality of service or PDU session is received.

FIG. 21B illustrates a flow diagram of an example method 2100B according to which the RAN determines whether a deactivated SCG should be reactivated for a UE depending on the QoS or PDU session with which data for the UE is associated. At block 2102B, the RAN communicates with a UE to support DC operation (e.g., events 302A-E, 402A-E, 502A-B, 602A-B). At block 2104B, while in communication with the UE, the RAN 105 deactivates an SCG (e.g., events 322A-D, 522A-B). At block 2106B, the RAN receives data for the UE from a CN, for example. At block 2108B, the RAN determines whether the received data is associated with a certain QoS flow or a PDU session. The flow proceeds to block 2110B when the receives is associated with the QoS flow or the PDU sessions, and proceeds to block 2112B otherwise. At block 2110B, the RAN initiates (re-)activation of the deactivated SCG (e.g., event 380E, 437B, 439B, 442B, 480B, 405C, 430C, 432C 442C, 409C, 636A, 676A, 678A, 644A, 642A, 605B, 676B, 678B, 609B). At block 2112B, on the other hand, the RAN refrains from activating the SCG. Thus, according to the method 2100B, the RAN determines whether the MN and/or the SN should (re-) activate the deactivated SCG based on the type of data addressed to the UE.

Figure 21C:
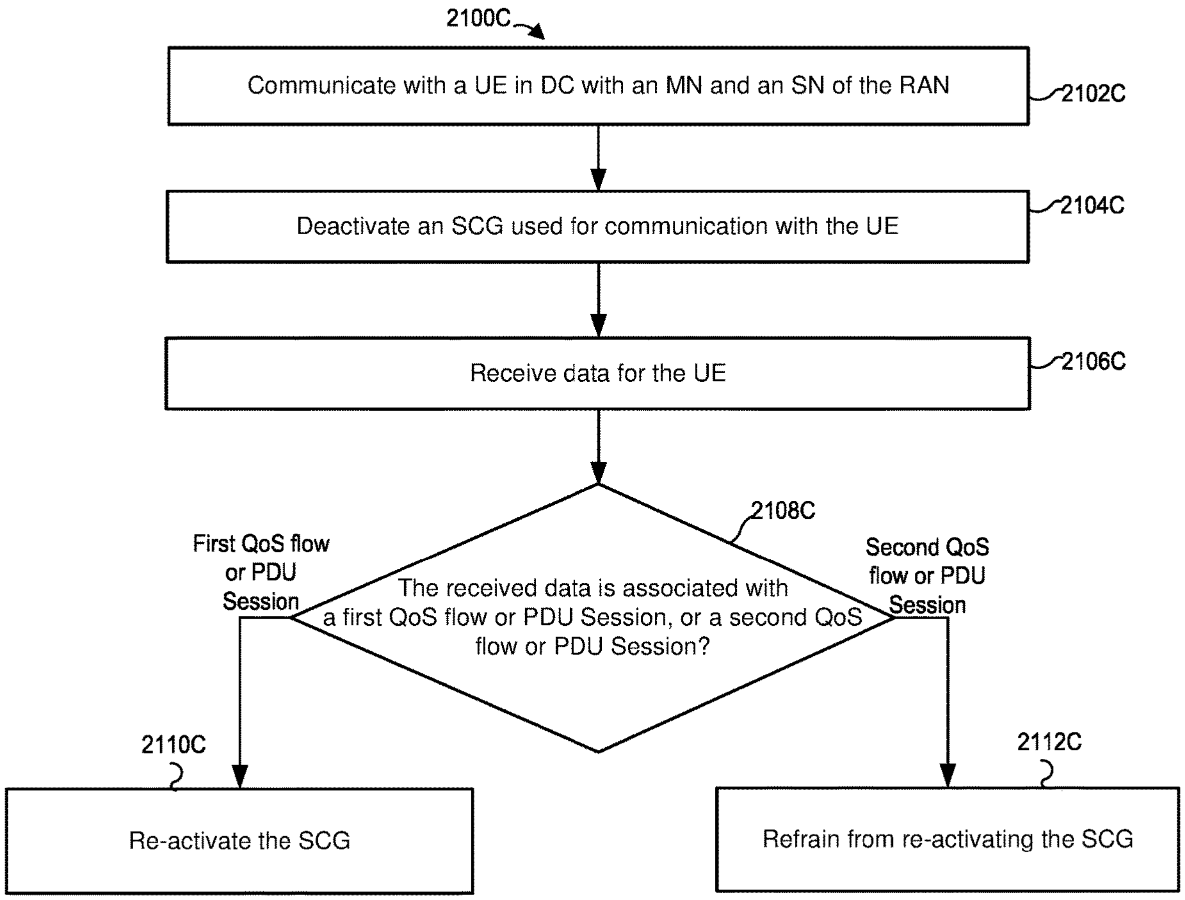
FIG. 21C is a flow diagram of an example method according to which the RAN determines whether a deactivated SCG should reactivated for a UE depending on whether received data associated with a first or second quality of service or PDU session.

FIG. 21C illustrates a flow diagram of an example method 2100C that is generally similar to the method 2100B, and according to which RAN also determines whether the MN and/or the SN should (re-)activate the deactivated SCG based on the type of data addressed to the UE. Except for block 2108C, the blocks in FIG. 21C are similar to those in FIG. 21B. At block 2108C, the RAN determines that the flow should proceed to block 2110C when the received data is associated with a certain QoS flow or PDU session, and determines that the flow should proceed to block 2112C when the received data is associated with another QoS flow or PDU session.

Figure 22:
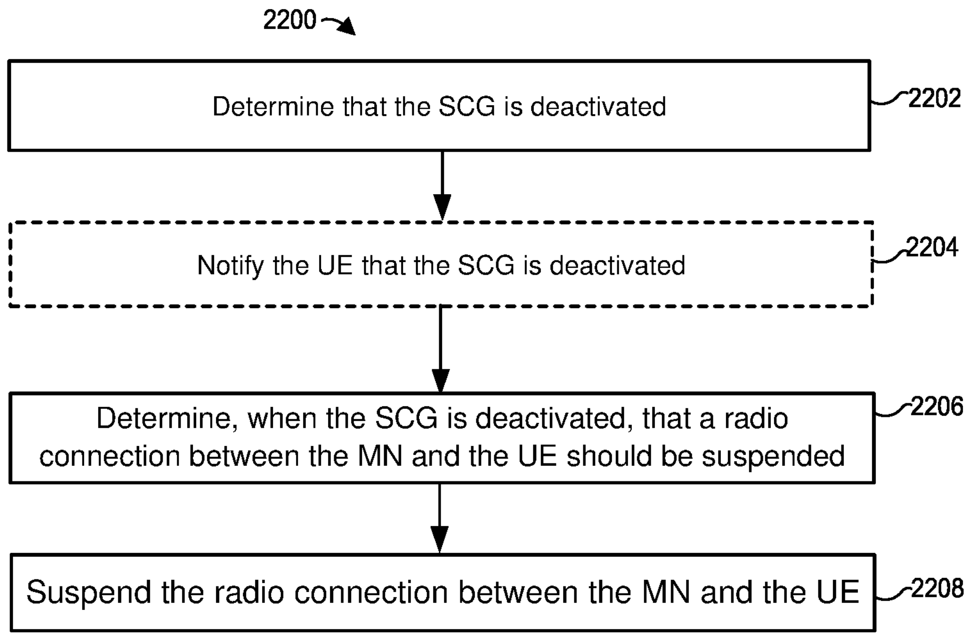
FIG. 22 is a flow diagram of an example for managing deactivation of an SCG and suspension of a UE to an idle state, which can be implemented in an MN.

For further clarity, FIG. 22 illustrates a flow diagram of an example method 2200 for managing deactivation and activation of an SCG, which can be implemented in a MN or RAN including the MN and a SN. At block 2202, the MN or RAN determines that the RAN and/or a UE should deactivate the SCG (e.g., event 308A of FIG. 3A, event 309B of FIG. 3B, event 309C of FIG. 3C, procedure 490A of FIG. 4A, procedure 490B of FIG. 4B, procedure 490C of FIG. 4C, event 508A of FIG. 5A, events 584B-1 and 584B-2 of FIG. 5B, procedure 690A of FIG. 6A, procedure 690B of FIG. 6B).

Optionally, at block 2204, the MN or RAN notifies the UE 102 that the SCG is deactivated (e.g., event 314A of FIG. 3A, event 314B of FIG. 3B, event 315C of FIG. 3C, event 514A-2 of FIG. 5A).

Next, at block 2206, the MN or RAN determines that a radio connection between the MN and the UE should be suspended (e.g., event 324A of FIG. 3A, procedure 394B of FIG. 3B, procedure 394C of FIG. 3C, procedure 494A of FIG. 4A, procedure 494B of FIG. 4B, procedure 494C of FIG. 4C, event 524A of FIG. 5A, procedure 594B of FIG. 5B, procedure 694A of FIG. 6A, procedure 694B of FIG. 6B).

In response to the determination at block 2206, the MN or RAN suspends the radio connection between the MN and the UE, at block 2208 (e.g., event 328A of FIG. 3A, procedure 394B of FIG. 3B, procedure 394C of FIG. 3C, procedure 494A of FIG. 4A, procedure 494C of FIG. 4C, events 528A-1 and 528A-2 of FIG. 5A, procedure 594B of FIG. 5B, procedure 694A of FIG. 6A, procedure 694B of FIG. 6B).

Figure 23:
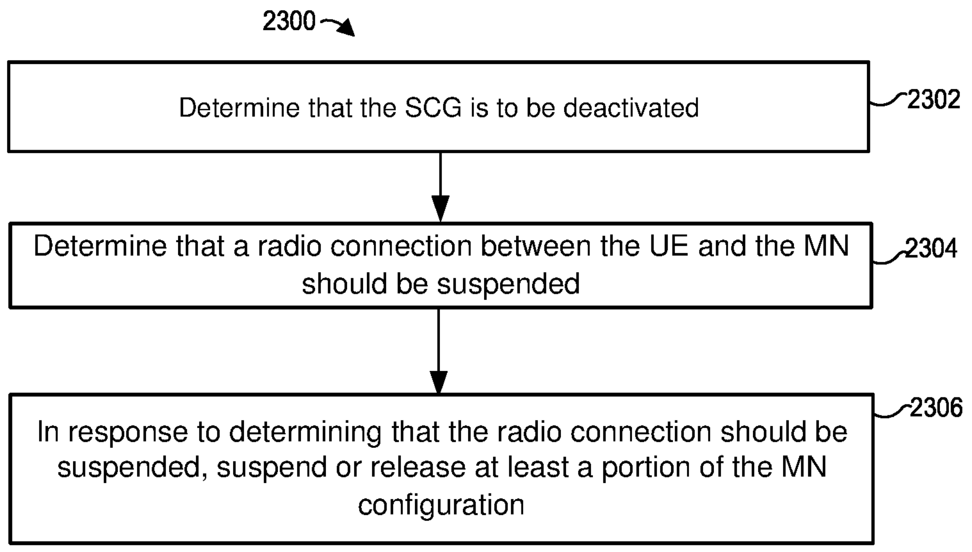
FIG. 23 is a flow diagram of an example for managing deactivation of an SCG and suspension of a UE to an idle state, which can be implemented in a UE.

Finally, FIG. 23 illustrates a flow diagram of an example method 2300 for managing deactivation and activation of an SCG, which can be implemented in a UE. At block 2302, the UE determines that the RAN and/or the UE should deactivate the SCG (e.g., events 314A and 316A of FIG. 3A, events 314B and 316B of FIG. 3B, events 315C and 316C of FIG. 3C, procedure 490A of FIG. 4A, procedure 490B of FIG. 4B, procedure 490C of FIG. 4C, events 514A-2 and 516A of FIG. 5A, event 582B of FIG. 5B, procedure 690A of FIG. 6A, procedure 690B of FIG. 6B).

The UE determines at block 2304 that the RAN and/or the UE should suspend the radio connection between the UE and the MN (e.g., event 328A of FIG. 3A, procedure 394B of FIG. 3B, procedure 394C of FIG. 3C, procedure 494A of FIG. 4A, procedure 494B of FIG. 4B, procedure 494C of FIG. 4C, event 528A-2 of FIG. 5A, procedure 594B of FIG. 5B, procedure 694A of FIG. 6A, procedure 694B of FIG. 6B).

At block 2306, the UE suspends at least a portion of the MN configuration and/or releases at least a portion of the MN configuration (e.g., event 330A of FIG. 3A, procedure 394B of FIG. 3B, procedure 394C of FIG. 3C, procedure 494A of FIG. 4A, procedure 494B of FIG. 4B, procedure 494C of FIG. 4C, procedure 594B of FIG. 5B, event 530A of FIG. 5A, procedure 594B of FIG. 5B, procedure 694A of FIG. 6A, procedure 694B of FIG. 6B).

The following list of examples reflects a variety of the embodiments explicitly contemplated by the present disclosure:

Example 1. A method in a network node, operating as a master node (MN) for a user equipment (UE) communicating in dual connectivity (DC) with the MN and a secondary node (SN), for managing deactivation of a secondary cell group (SCG), the method comprising: determining, by processing hardware of the network node, that the SCG is deactivated for the UE; determining, by the processing hardware and when the SCG is deactivated, that a radio connection between the MN and the UE should be suspended; and suspending, by the processing hardware, the radio connection between the UE and the MN.

Example 2. The method of example 1, wherein determining that the radio connection should be suspended includes detecting data inactivity on the radio connection.

Example 3. The method of example 2, wherein detecting data inactivity includes: starting, by the processing hardware, an inactivity timer for the radio connection in response to receiving a notice of inactivity.

Example 4. The method of any of the preceding examples, wherein determining that the SCG is deactivated includes receiving, from the UE, an indication that the UE presently prefers single connectivity.

Example 5. The method of any of the preceding examples, wherein determining that the SCG is deactivated includes receiving, from the SN, an indication of data inactivity on the SCG.

Example 6. The method of any of examples 1-3, wherein determining that the SCG is deactivated includes receiving, from the SN, a request to deactivate the SCG.

Example 7. The method of any of examples 1-3, wherein determining that the SCG is deactivated includes receiving, from the SN, a notification that the SN deactivated the SCG.

Example 8. The method of any of the preceding examples, further comprising, in response to determining that the SCG is deactivated: releasing a first portion of an MN configuration for the UE and retaining, at the MN, a second portion of the MN configuration for the UE.

Example 9. The method of any of the preceding examples, wherein suspending the radio connection includes: transmitting, by the processing hardware to the UE, a suspend command associated with a protocol for controlling radio resources, the suspend command including an indication that the SCG is deactivated.

Example 10. The method of any of examples 1-7, further comprising, in response to determining that the SCG is deactivated: retaining, at the MN, an MN configuration for the UE.

Example 11. The method of any of example 10, further comprising: transmitting, by the processing hardware to the UE, a reconfiguration command associated with a protocol for controlling radio resources, the reconfiguration command including an indication that the SCG is deactivated.

Example 12. The method of any of the preceding examples, wherein suspending the radio connection includes: transmitting, by the processing hardware to the UE, a message indicating that the UE should transition to an inactive state of a protocol for controlling radio resources.

Example 13. The method of any of examples 1-11, wherein suspending the radio connection includes: transmitting, by the processing hardware to the UE, a message indicating that the UE should transition to an idle state of a protocol for controlling radio resources and retain at least a portion of an MN configuration associated with the protocol.

Example 14. The method of any of the preceding examples, further comprising, in response to determining that the radio connection between the MN and the UE should be suspended: transmitting, by the processing hardware to the SN, an indication that the SN is to release one or more lower layers of a radio connection between the UE and the SN, while retaining one or more upper layers of the radio connection between the UE and the SN.

Example 15. The method of any examples 1-13, further comprising, in response to determining that the radio connection between the MN and the UE should be suspended: transmitting, by the processing hardware to the SN, an indication that the SN is to suspend one or more lower layers of a radio connection between the UE and the SN, while retaining one or more upper layers of the radio connection.

Example 16. The method of any of examples 1-13, further comprising, in response to determining that the UE should transition to the inactive state: transmitting, by the processing hardware to the SN, an indication that the SN is to release all layers of a radio connection between the UE and the SN.

Example 17. The method of any of examples 14-16, wherein: (i) the determining that that the SCG is deactivated for the UE and (ii) the determining that the radio connection between the MN and the UE should be suspended, occur in a first instance; the method further comprising, in a second instance: determining, by the processing hardware and when the SCG is active, that the radio connection between the MN and the UE should be suspended, and refraining from transmitting, by the processing hardware to the SN, a request to release or suspend one or more layers of the radio connection between the UE and the SN.

Example 18. The method of any of the preceding examples, further comprising, subsequently to suspending the radio connection between the UE and the MN: determining, when the SCG is deactivated and the radio connection between the MN and the UE is suspended, to resume the radio connection; and determining whether the SCG should be re-activated in view of the determining to resume the radio connection.

Example 19. The method of example 18, wherein determining whether the SCG should be re-activated includes: receiving, from the SN, an indication of pending data activity on the SCG.

Example 20. The method of example 18, wherein determining whether the SCG should be re-activated includes: receiving, from the UE, a request to resume the radio connection.

Example 21. The method of example 20, wherein: the request indicates a cause for resuming a radio connection between the UE and the MN; the method further comprising: determining that the SCG should be re-activated when the cause indicates a phone call.

Example 22. The method of example 18, wherein determining whether the SCG should be re-activated includes: receiving, from a core network, data addressed to the UE; and determining whether the SCG should be re-activated based on at least one of: (i) an amount of the data, (ii) a quality of service (QoS) of the data, or (iii) a protocol data unit (PDU) session with which the data is associated.

Example 23. The method of example 18, further comprising, in response to determining that the SCG should not be re-activated: transmitting, by the processing hardware to the UE, a command to resume the radio connection between the MN and the UE, and omitting an SN configuration from the command.

Example 24. The method of example 18, further comprising, in response to determining that the SCG should be re-activated: transmitting, by the processing hardware to the UE, a command to resume the radio connection between the MN and the UE, including transmitting an SN configuration.

Example 25. The method any of the preceding examples, wherein: the determining that the radio connection should be suspended and the suspending of the radio connection occurs in a first instance; the method further comprising: in a second instance, in response to detecting data activity on the radio connection, transmitting an SCG deactivation command to the UE.

Example 26. The method any of the preceding examples, wherein: the MN is implemented in a first distributed unit (DU) of a distributed base station; and the SN is implemented in a second DU of the distributed base station.

Example 27. The method of any of the preceding examples, further comprising: notifying, by the processing hardware, the UE that the SCG is deactivated.

Example 28. A network node operating in a radio access network (RAN), the network node comprising processing hardware and configured to implement a method of any of the preceding examples.

Example 29. A method in a user equipment (UE) communicating in dual connectivity (DC) with a master node (MN) in accordance with an MN configuration and a secondary node (SN) in accordance with an SN configuration, for managing deactivation of a secondary cell group (SCG), the method comprising: deactivating, by processing hardware, the SCG; determining, by the processing hardware and when the SCG is deactivated, that a radio connection between the UE and the MN should be suspended; and in response to determining that the radio connection should be suspended, suspending or releasing at least a portion of the MN configuration.

Example 30. The method of example 29, wherein deactivating the SCG includes: receiving, from the MN, a message associated with a protocol for controlling radio resources, the message including an indication that the SCG is to be deactivated.

Example 31. The method of example 29, further comprising: subsequently to deactivating the SCG, receiving, from the MN, a second message associated with the protocol for controlling radio resources, the second message including an indication that the SCG is to be re-activated.

Example 32. The method of example 30 or 31, further comprising: in response to determining that the message is a suspension command or a resume command, releasing a first portion of the MN configuration and retaining a second portion of the MN configuration.

Example 33. The method of example 30 or 31, further comprising: in response to determining that the message is a reconfiguration command, retaining the entire MN configuration.

Example 34. The method of example 30 or 31, further comprising: in response to determining that the message is a suspension command or a resume command, releasing a first portion of the SN configuration and retaining a second portion of the SN configuration.

Example 35. The method of example 30, further comprising: in response to determining that the message is a reconfiguration command, retaining the entire SN configuration.

Example 36. The method of example 30 or 31, further comprising: in response to determining that the message is a suspension or a resume command, resetting one or more lower layers of a radio connection between the UE and the SN.

Example 37. The method of example 30 or 31, further comprising: in response to determining that the message is a reconfiguration command, retaining information associated with one or more lower layers of a radio connection between the UE and the SN.

Example 38. The method of example 30, further comprising: in response to determining that the message causes the UE to suspend the radio connection between the UE and the MN, resetting one or more lower layers of a radio connection between the UE and the SN.

Example 39. The method of example 30, further comprising: in response to determining that the message does not cause the UE to suspend the radio connection between the UE and the MN, retaining information associated with one or more lower layers of a radio connection between the UE and the SN.

Example 40. The method of any of examples 29-39, further comprising: determining, by the processing hardware, that the UE presently prefers single connectivity; transmitting, to the MN, an indication that the UE prefers single connectivity.

Example 41. The method of any of examples 29-39, further comprising: determining, by the processing hardware, that the UE presently prefers single connectivity transmitting, to the SN, an indication that the UE prefers single connectivity.

Example 42. The method of any of examples 40 or 41, further comprising: receiving, from the MN or the SN and in response to the indication that the UE prefers single connectivity, a command to deactivate the SCG.

Example 43. A user equipment (UE) comprising processing hardware and configured to implement a method of any of examples 29-42.

The following additional considerations apply to the foregoing discussion.

In some implementations, "message" is used and can be replaced by "information element (IE)". In some implementations, "IE" is used and can be replaced by "field". In some implementations, "configuration" can be replaced by "configurations" or the configuration parameters included in the MN or SN configuration described above. For example, "SN configuration" can be replaced by "SN configurations". The SN configuration can be replaced by a cell group configuration and/or radio bearer configuration. In some implementations, "deactivating an SCG" can be replaced by "suspending an SCG" and "activating an SCG" can be replaced by "resuming an SCG". In some implementations, "lower layer" can be replaced by "protocol layer".

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can include dedicated circuitry or logic that is permanently configured (e.g., as a special-purpose processor, such as a field programmable gate array (FPGA) or an application-specific integrated circuit (ASIC), a digital signal processor (DSP)) to perform certain operations. A hardware module may also include programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional and alternative structural and functional designs for resuming MR-DC between a UE and a RAN through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

What is claimed is:

1. A method in a network node, operating as a master node (MN) for a user equipment (UE) communicating in dual connectivity (DC) with the MN and a secondary node (SN), for managing deactivation of a secondary cell group (SCG), the method comprising:

transmitting, from the MN, a first request to the SN to deactivate the SCG;

receiving, at the MN, a first message from the SN in response to the transmitting the first request to the SN;

transmitting, from the MN, a second message to the UE to deactivate the SCG;

transmitting, from the MN, a second request to the SN to activate the SCG;

receiving, at the MN, a third message from the SN in response to the transmitting the second request to the SN, the third message:

in a first instance, including a random access configuration for the UE to perform a random access procedure, and in a second instance when a corresponding time alignment timer is running, indicating to refrain from performing the random access procedure; and transmitting, from the MN, a fourth message to the UE including the random access configuration.

2. The method of claim 1, wherein transmitting the second message includes:

transmitting, from the MN, a reconfiguration message to the UE to deactivate the SCG; and in response to the transmitting the reconfiguration message to the UE receiving, from the UE, an indication that the SCG is deactivated.

3. The method of claim 1, wherein the transmitting the second request to the SN to reactivate the SCG is in response to receiving, from the SN, an indication of pending data activity on the SCG.

4. The method of claim 1, wherein the transmitting the second request to the SN to reactivate the SCG is in response to receiving, from the UE, a request to resume the radio connection.

5. The method of claim 1, wherein the transmitting the first request to the SN to deactivate the SCG is in response to receiving, from the UE, an indication that the UE presently prefers single connectivity.

6. The method of claim 1, wherein the transmitting the second request to the SN to reactivate the SCG is in response to:

receiving, from a core network, data addressed to the UE; and determining whether the SCG should be re-activated based on at least one of:

(i) an amount of the data, (ii) a quality of service (QoS) of the data, or (iii) a protocol data unit (PDU) session with which the data is associated.

7. The method of claim 1, wherein the transmitting the first request to the SN to deactivate the SCG is in response to receiving, from the SN, an indication of data inactivity on the SCG.

8. The method of claim 1, wherein the transmitting the first request to the SN to deactivate the SCG is in response to receiving, from the SN, a notification that SN modification is required.

9. The method of claim 1, wherein the first message from the SN includes an indication that the SCG is deactivated.

10. A method in a network node, operating as a secondary node (SN) for a user equipment (UE) communicating in dual connectivity (DC) with the SN and a master node (MN), for managing deactivation of a secondary cell group (SCG), the method comprising:

receiving, at the SN, a first request from the MN to deactivate the SCG;

transmitting, from the SN, a first message to the MN in response to the receiving the first request from the MN;

deactivating, by the SN, the SCG;

receiving, at the SN, a second request from the MN to activate the SCG;

transmitting, from the SN, a third message to the MN in response to the receiving the second request, the third message:

in a first instance, including a random access configuration for the UE to perform a random access procedure, and in a second instance when a corresponding time alignment timer is running, indicating to refrain from performing the random access procedure; and activating, by the SN, the SCG.

11. The method of claim 10, wherein the first message includes an SN configuration for the UE.

12. The method of claim 11, wherein the deactivating the SCG includes:

deactivating, by the SN and the UE, the SCG in accordance with the SN configuration.

13. A network node, operating as a master node (MN) for a user equipment (UE) communicating in dual connectivity (DC) with the MN and a secondary node (SN) and configured to manage deactivation of a secondary cell group (SCG), the network node comprising:

a transceiver; and processing hardware configured to:

transmit, from the MN, a first request to the SN to deactivate the SCG;

receive, at the MN, a first message from the SN in response to the transmitting the request to the SN;

transmit, from the MN, a second message to the UE to deactivate the SCG;

transmit, from the MN, a second request to the SN to activate the SCG;

receive, at the MN, a third message from the SN in response to the transmitting the second request to the SN, the third message:

in a first instance, including a random access configuration for the UE to perform a random access procedure, and in a second instance when a corresponding time alignment timer is running, indicating to refrain from performing the random access procedure; and transmit, from the MN, a fourth message to the UE including the random access configuration.

14. The network node of claim 13, wherein, to transmit the second message, the processing hardware is further configured to:

transmit, from the MN, a reconfiguration message to the UE to deactivate the SCG; and in response to the transmitting the reconfiguration message to the UE receive, from the UE, an indication that the SCG is deactivated.

15. The method of claim 13, wherein the transmitting the second request to the SN to reactivate the SCG is in response to receiving, from the SN, an indication of pending data activity on the SCG.

16. The network node of claim 13, wherein the transmitting the second request to the SN to reactivate the SCG is in response to receiving, from the UE, a request to resume the radio connection.

17. The network node of claim 13, wherein the transmitting the second request to the SN to reactivate the SCG is in response to:

receiving, from a core network, data addressed to the UE; and determining whether the SCG should be re-activated based on at least one of:

(i) an amount of the data, (ii) a quality of service (QoS) of the data, or (iii) a protocol data unit (PDU) session with which the data is associated.

* * * * *